United States Patent
Jung et al.

(10) Patent No.: US 10,841,818 B2
(45) Date of Patent: Nov. 17, 2020

(54) METHOD, APPARATUS, AND SYSTEM FOR TERMINAL FOR MEASUREMENT CONFIGURATION OF DIFFERENT REFERENCE SIGNALS AND CELL MEASUREMENT REPORT MECHANISM

(71) Applicant: Samsung Electronics Co., Ltd., Suwon-si, Gyeonggi-do (KR)

(72) Inventors: Byounghoon Jung, Suwon-si (KR); Anil Agiwal, Suwon-si (KR); Jungsoo Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 13 days.

(21) Appl. No.: 15/934,428

(22) Filed: Mar. 23, 2018

(65) Prior Publication Data

US 2018/0279145 A1 Sep. 27, 2018

(30) Foreign Application Priority Data

Mar. 23, 2017 (KR) ................. 10-2017-0037178
May 4, 2017 (KR) ................. 10-2017-0057039
(Continued)

(51) Int. Cl.
*H04W 24/08* (2009.01)
*H04W 36/00* (2009.01)
(Continued)

(52) U.S. Cl.
CPC .......... *H04W 24/08* (2013.01); *H04L 5/0048* (2013.01); *H04L 5/0051* (2013.01);
(Continued)

(58) Field of Classification Search
CPC .................................................. H04W 24/08
See application file for complete search history.

(56) References Cited

U.S. PATENT DOCUMENTS 9,106,386 B2   8/2015   Etemad et al.
9,544,794 B2   1/2017   Kim et al.
(Continued)

FOREIGN PATENT DOCUMENTS

EP   2557834 A1   2/2013
EP   2991413 A1   3/2016
EP   3091793 A1   11/2016

OTHER PUBLICATIONS

LG Electronics, "Discussion on RRM measurement in NR", 3GPP Draft; R1-1702443, 3rd Generation Partnership Project (3GPP), Mobile Competence Centre; 650, Route Des Lucioles; F-06921 Sophia-Antipolis Cedex, France, vol. RAN WG1, Athens, Greece, Feb. 13, 2017-Feb. 17, 2017, Feb. 12, 2017, XP051209597, Retrieved from the Internet: URL: http://www.3gpp.org/ftp/Meetings_3GPP_SYNC/RAN1/Docs/ [retrieved on Feb. 12, 2017].
(Continued)

*Primary Examiner* — Samina F Choudhry
(74) *Attorney, Agent, or Firm* — Jefferson IP Law, LLP

(57) ABSTRACT

A communication technique that combines a 5th generation (5G) communication system for supporting a data rate that is higher than that of a beyond 4th generation (4G) system with Internet of things (IoT) technology, and a system thereof are provided. The disclosure may be applied to intelligent services based on 5G communication technology and IoT related technology, such as smart home, smart building, smart city, smart car or connected car, health care, digital education, retail, security and safety related services. The disclosure relates to a next-generation wireless communication system, and more particularly, to a method for allocating and transmitting different reference signals to a terminal, and a system, a method, and an apparatus for performing cell measurement and mobility management using the transmitted different reference signals in a beam-
(Continued)

forming-based system including one or more base stations and one or more terminals.

16 Claims, 24 Drawing Sheets

(30) Foreign Application Priority Data

Jun. 15, 2017 (KR) ........................ 10-2017-0076015
Nov. 15, 2017 (KR) ........................ 10-2017-0152553

(51) Int. Cl.
*H04L 5/00* (2006.01)
*H04L 29/08* (2006.01)
*H04B 7/06* (2006.01)

(52) U.S. Cl.
CPC ... *H04W 36/0083* (2013.01); *H04W 36/0085* (2018.08); *H04B 7/0695* (2013.01); *H04L 5/0023* (2013.01); *H04L 67/12* (2013.01)

(56) References Cited

U.S. PATENT DOCUMENTS

| | | | | |
|---|---|---|---|---|
| 2010/0014481 A1* | 1/2010 | Ko | ........................ | H04L 5/0007 370/330 |
| 2012/0120903 A1 | 5/2012 | Kim et al. | | |
| 2013/0077518 A1 | 3/2013 | Abe et al. | | |
| 2013/0196675 A1 | 8/2013 | Xiao et al. | | |
| 2013/0242933 A1* | 9/2013 | Fujimoto | ............ | H04W 72/085 370/329 |
| 2015/0124731 A1* | 5/2015 | Tsuboi | ................. | H04L 5/0048 370/329 |
| 2015/0358094 A1* | 12/2015 | Yi | ........................ | H04B 17/318 370/252 |
| 2016/0337952 A1* | 11/2016 | Li | ........................ | H04W 48/16 |
| 2017/0064571 A1* | 3/2017 | Kusashima | ............ | H04W 24/10 |
| 2017/0070312 A1* | 3/2017 | Yi | ........................ | H04J 11/0069 |
| 2017/0078062 A1* | 3/2017 | Park | ........................ | H04L 5/0048 |
| 2018/0198585 A1* | 7/2018 | Lin | ........................ | H04L 5/0048 |

OTHER PUBLICATIONS

Nokia et al., "DL Signals for Mobility Measurements in NR and Mobility schemes", 3GPP Draft; R1-1703097, 3rd Generation Partnership Project (3GPP), Mobile Competence Centre; 650, Route Des Lucioles ; F-06921 Sophia-Antipolis Cedex; France, vol. RAN WG1, Athens, Greece, Feb. 13, 2017-Feb. 17, 2017, Feb. 12, 2017, XP051210235, Retrieved from the Internet: URL: http://www.3gpp.org/ftp/Meetings_3GPP_SYNC/RAN1/Docs/ [retrieved on Feb. 12, 2017].

Gatt, "Further Consideration on RRM Measurement", 3GPP Draft; R2-1700983, 3rd Generation Partnership Project (3GPP), Mobile Competence Centre; 650, Route Des Lucioles; F-06921 Sophia-Antipolis Cedex; France, vol. RAN WG2, Athens, Greece, Feb. 13, 2017-Feb. 17, 2017, Feb. 12, 2017, XP051211749, Retrieved from the Internet: URL: http://www.3gpp.org/ftp/Meetings_3GPP_SYNC/RAN2/Docs/ [retrieved on Feb. 12, 2017].

NTT Docomo et al., "Discussion on NR RRM measurement based on CSI-RS for L3 mobility", 3GPP Draft R1-1708445_Discussion on NR RRM Measurement Based on CSI-RS for L3 Mobility_Final, 3rd Generation Partnership Project (3GPP), Mobile Competence Centre; 650, Route Des Lucioles; F-06921 S, vol. RAN WG1, Hangzhou, P.R. China, May 15, 2017-May 19, 2017, May 14, 2017, XP051273637, Retrieved from the Internet: URL:http://www.3gpp.org/ftp/Meetings_3GPP_SYNC/RAN1/Docs/.

Extended European Search Report dated Jan. 17, 2020, issued in European Patent Application No. 18771522.2.

LG Electronics, "Discussion on QCL for NR", 3GPP Draft, R1-1700487, 3rd Generation Partnership Project (3GPP), vol. Ran WG1, Spokane, USA, Jan. 16, 2017-Jan. 20, 2017, Jan. 10, 2017, XP051202909, Retrieved from the Internet: URL: http://www.3gpp.org/flp/tsg_ranWG1_RL1/TSGR1_AH/NR_AH_1701/Docs/ [retrieved on Jan. 10, 2017].

European Office Action dated Aug. 25, 2020, issued in European Patent Application No. 18771522.2.

* cited by examiner

METHOD, APPARATUS, AND SYSTEM FOR TERMINAL FOR MEASUREMENT CONFIGURATION OF DIFFERENT REFERENCE SIGNALS AND CELL MEASUREMENT REPORT MECHANISM

CROSS-REFERENCE TO RELATED APPLICATION(S)

This application is based on and claims priority under 35 U.S.C. § 119(a) of a Korean patent application number 10-2017-0037178, filed on Mar. 23, 2017, in the Korean Intellectual Property Office, of a Korean patent application number 10-2017-0057039, filed on May 4, 2017, in the Korean Intellectual Property Office, of a Korean Patent Application number 10-2017-0076015, filed on Jun. 15, 2017, in the Korean Intellectual Property Office, and of a Korean patent application number 10-2017-0152553, filed on Nov. 15, 2017, in the Korean Intellectual Property Office, the entire disclosure of each of which is incorporated by reference.

TECHNICAL FIELD

The disclosure relates to a next-generation wireless communication system. More particularly, the disclosure relates to a method for allocating and transmitting different reference signals to a terminal, and a system, a method, and an apparatus for performing cell measurement and mobility management using the transmitted different reference signals in a beamforming-based system including one or more base stations and one or more terminals.

BACKGROUND

In order to meet the demand for wireless data traffic that is on an increasing trend after commercialization of 4th generation (4G) communication systems, efforts have been made to develop improved 5th generation (5G) or pre-5G communication system. For this reason, the 5G or pre-5G communication system is also called a beyond 4G network communication system or a post LTE system.

In order to achieve high data rate being considered in the disclosure, implementation of a 5G communication system in an ultrahigh frequency (mmWave) band (e.g., like 60 GHz band) has been considered. In order to mitigate a path loss of radio waves and to increase a transfer distance of the radio waves in the ultrahigh frequency band, technologies of beamforming, massive multiple-input and multiple-output (MIMO), full dimension MIMO (FD-MIMO), array antennas, analog beamforming, and large scale antennas for the 5G communication system have been discussed. Further, for system network improvement in the 5G communication system, technology developments have been made for an evolved small cell, advanced small cell, cloud radio access network (cloud RAN), ultra-dense network, device to device communication (D2D), wireless backhaul, moving network, cooperative communication, coordinated multi-points (CoMP), and reception interference cancellation. In addition, in the 5G system, hybrid frequency-shift keying (FSK) and quadrature amplitude modulation (QAM) modulation (FQAM) and sliding window superposition coding (SWSC), which correspond to advanced coding modulation (ACM) systems, and filter bank multicarrier (FBMC), non-orthogonal multiple access (NOMA), and sparse code multiple access (SCMA), which correspond to advanced connection technologies, have been developed.

On the other hand, the Internet, which is a human centered connectivity network where humans generate and consume information, is now evolving to the Internet of things (IoT) where distributed entities, such as things, exchange and process information. The Internet of everything (IoE), which is a combination of the IoT technology and big data processing technology through connection with a cloud server, has emerged. As technology elements, such as sensing technology, wired/wireless communication and network infrastructure, service interface technology, and security technology, have been demanded for IoT implementation, a sensor network for machine-to-machine connection, machine-to-machine (M2M) communication, machine type communication (MTC), and so forth have been recently researched. Such an IoT environment may provide intelligent Internet technology (IT) services that create a new value to human life by collecting and analyzing data generated among connected things. The IoT may be applied to a variety of fields including smart home, smart building, smart city, smart car or connected cars, smart grid, health care, smart appliances and advanced medical services through convergence and combination between the existing information technology (IT) and various industries.

Accordingly, various attempts have been made to apply the 5G communication system to IoT networks. For example, technologies of sensor network, M2M communication, and MTC have been implemented by techniques for beamforming, MIMO, and array antennas, which correspond to the 5G communication technology. As the big data processing technology as described above, application of a cloud RAN would be an example of convergence between the 5G technology and the IoT technology.

In a communication system, a terminal requires initial cell selection and cell reselection in an idle mode for selecting the best base station for an access. Further, for a handover for a terminal to move to a better cell in a connected mode, it is required to perform radio resource management (RRM) measurement. In order to determine cells as described above and compare performances between the cells, each terminal is able to observe and calculate a measured value representing each cell or a value derived through measurement.

For this, in a shared frequency band using omni-beams in the existing LTE, different base stations reserve orthogonal resources and transmit cell-specific reference signals using the resources, and terminals measure the reference signals to know received signal strengths (RSRP) of the respective cells.

Further, in the next-generation communication system considering beamforming, various methods have been studied in the related art, in which different base stations alternately transmit cell and beam specific reference signals on different resources using different beams, and a terminal derives one representative value corresponding to the corresponding cell using measurement values for plural beams transmitted from the one cell.

Although reference signal transmission using one beam or reference signal transmission using plural beams has been studied in the related art, a case where respective base stations transmit two or more kinds of reference signals generated through different signal generation rules using two or more kinds of beams having different beam areas, coverages, and transmission periods has not been studied in the related art.

Therefore, a need exists for a method for allocating and transmitting different reference signals to a terminal, and a method for performing cell measurement and mobility management using the different reference signals transmitted to the terminal in a beamforming-based system including one or more base stations and one or more terminals.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure provides a method for allocating and transmitting different reference signals to a terminal, and a method for performing cell measurement and mobility management using the different reference signals transmitted to the terminal in a beamforming-based system including one or more base stations and one or more terminals.

In accordance with an aspect of the disclosure, a method by a base station is provided. The method includes determining configuration information on at least one reference signal related to measurement of a serving cell and an adjacent cell for a handover, and transmitting the determined configuration information to a terminal, wherein the determined configuration information includes first information on a cell to which the at least one reference signal is transmitted and second information on respective resources to which the at least one reference signal is transmitted in the cell.

In accordance with another aspect of the disclosure, a method by a terminal is provided. The method includes receiving configuration information of at least one reference signal related to a serving cell and an adjacent cell, performing measurement for a handover based on the configuration information, and reporting the result of the measurement to a base station, wherein the configuration information includes first information on a cell to which the at least one reference signal is transmitted and second information on respective resources to which the at least one reference signal is transmitted in the cell.

In accordance with another aspect of the disclosure, a base station is provided. The base station includes a transceiver, and a controller configured to determine configuration information on at least one reference signal related to measurement of a serving cell and an adjacent cell for a handover and control the transceiver to transmit the determined configuration information to a terminal, wherein the determined configuration information includes first information on a cell to which the at least one reference signal is transmitted and second information on respective resources to which the at least one reference signal is transmitted in the cell.

In accordance with another aspect of the disclosure, a terminal is provided. The terminal includes a transceiver configured to receive configuration information of at least one reference signal related to a serving cell and an adjacent cell, and a controller configured to perform measurement for a handover based on the configuration information, and control the transceiver to report the result of the measurement to a base station, wherein the configuration information includes first information on a cell to which the at least one reference signal is transmitted and second information on respective resources to which the at least one reference signal is transmitted in the cell.

According to the aspect of the disclosure, in the beamforming-based system including one or more base stations and one or more terminals, the base station can allocate the different reference signals to the terminal, and the terminal can perform the cell measurement and mobility management using the allocated different reference signals.

Further, the terminal recognizes common information, such as time, frequency, and direction between the different reference signals, and thus can minimize unnecessary operations, for example, repetition of alternate transmission/reception of beams and selection of the beams through received signal measurement, in selecting transmitted and received beams between the base station and the terminal. Accordingly, power consumption and time delay of the terminal can be reduced.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
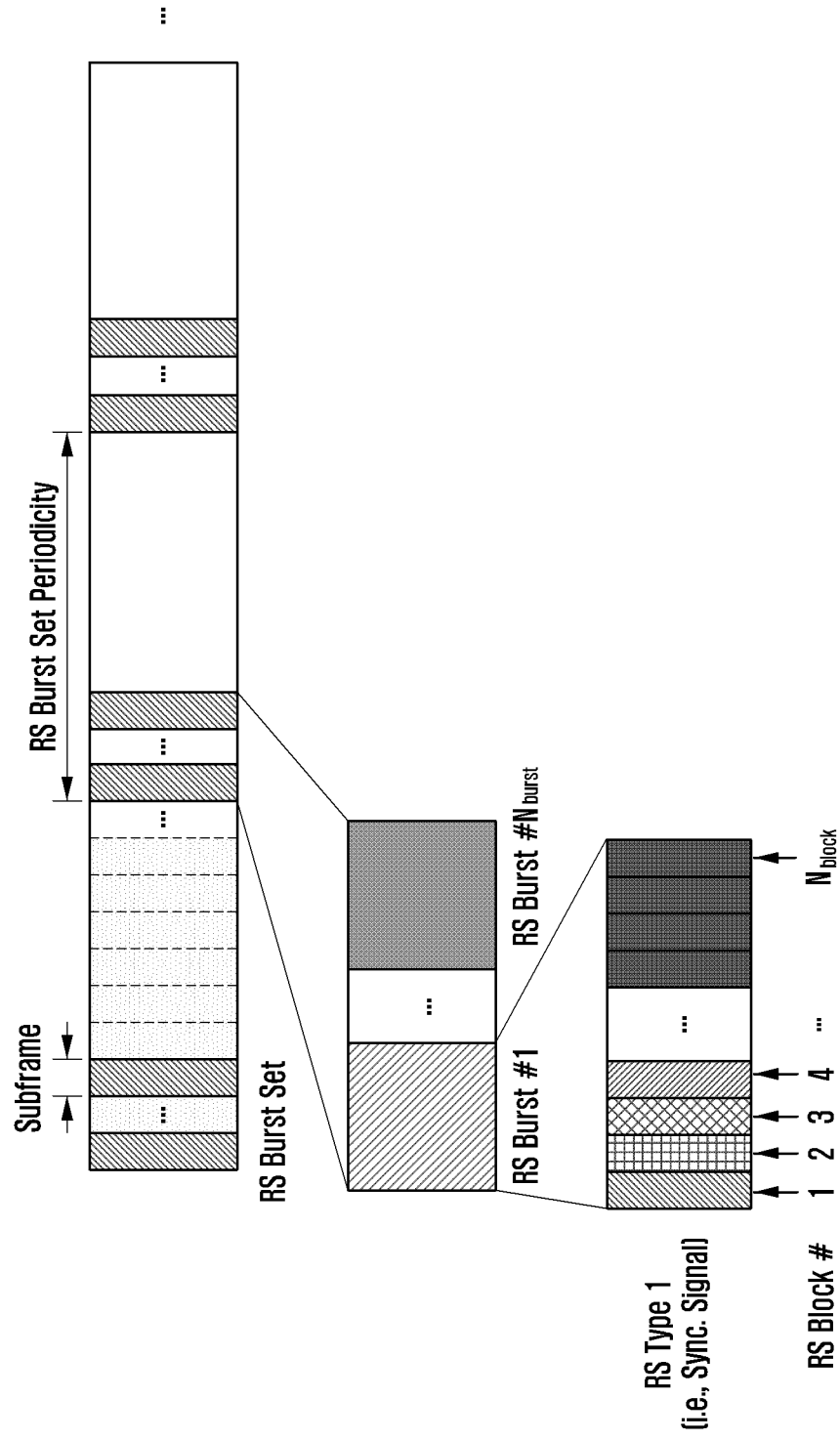
FIG. 1 illustrates a reference signal being transmitted according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The aspects and features of the disclosure and methods for achieving the aspects and features will be apparent by referring to the embodiments to be described with reference to the accompanying drawings. However, the disclosure is not limited to the embodiments disclosed hereinafter, but can be implemented in diverse forms. The matters defined in the description, such as the detailed construction and elements, are nothing but specific details provided to assist those of ordinary skill in the art in a comprehensive understanding of the disclosure, and the disclosure is only defined within the scope of the appended claims. In the entire description of the disclosure, the same drawing reference numerals are used for the same elements across various figures.

The disclosure relates to a next-generation wireless communication system, and more particularly, to a method for allocating and transmitting different reference signals to a terminal, and a system, a method, and an apparatus for performing cell measurement and mobility management using the transmitted different reference signals in a beamforming-based system including one or more base stations and one or more terminals.

Further, the disclosure relates to a procedure for beam measurement according to a condition and beam measurement report according to a condition in a wireless system in which a base station and a terminal using multiple antennas exist.

The disclosure designs information, a transmission method, and a procedure in which a serving base station or an adjacent base station transmits to a terminal reference signal configuration information for a beam measurement subject (terminal) to observe and measure a reference signal transmitted from the serving base station and the adjacent base station in a system and an environment using beamforming, in particular, beamforming using multiple antennas, in a wireless communication system in which the base station and the terminal using the multiple antennas exist.

Further, the disclosure designs information, a transmission method, and a procedure in which a serving base station or an adjacent base station transmits to a terminal additional second reference signal configuration information for a beam measurement subject (terminal) to observe and measure an additional second reference signal in addition to a first reference signal basically observed and measured if the additional second reference signal exists in addition to existence of the first reference signal transmitted from the serving base station and the adjacent base station in a system and an environment using beamforming, in particular, beamforming using multiple antennas, in a wireless communication system in which the base station and the terminal using the multiple antennas exist.

Existing Technology: Legacy LTE CSI-RS Configuration

The structure and elements of CSI-RS config. in the existing LTE standards are as follows.

```
CSI-RS-Config-r10 ::=     SEQUENCE {
  csi-RS-r10              CHOICE {
    release               NULL,
    setup                 SEQUENCE {
      antennaPortsCount-r10  ENUMERATED {an1, an2, an4, an8},
      resourceConfig-r10     INTEGER (0..31),
      subframeConfig-r10     INTEGER (0..154),
      p-C-r10                INTEGER (-8..15)
    }
  }                                              OPTIONAL,
  -- Need ON
  zeroTxPowerCSI-RS-r10   ZeroTxPowerCSI-RS-Conf-r12
  OPTIONAL       -- Need ON
}
```

Antenna ports [TS36.211, Ch. 6.10.5]
    # of antenna ports for RS Tx.
Resource [TS36.211, Ch. 6.10.5.2-1]
    Mapping RS to RE
Subframe [TS36.211, Ch. 6.10.5.3-1]
    RS Periodicity
    Subframe offset
p-C [TS36.213, Ch. 7.2.5]
    UE assumption on reference physical downlink shared channel (PDSCH) transmitted power for CSI feedback Existing Technology: Legacy LTE CSI-RS Based Discovery RS (DRS) Configuration The structure and elements of CSI-RS based DRS config. in the existing LTE standards are as follows.

```
MeasCSI-RS-Config-r12 ::=    SEQUENCE {
    measCSI-RS-Id-r12           MeasCSI-RS-Id-r12,
    physCellId-r12              INTEGER (0..503),
    scramblingIdentity-r12      INTEGER (0..503),
    resourceConfig-r12          INTEGER (0..31),
    subframeOffset-r12          INTEGER (0..4),
    csi-RS-IndividualOffset-r12 Q-OffsetRange,
    ...
}
```

Physical cell ID
    UE assumed cell of RS/SS corresponds to
Scrambling ID
    Pseudo random sequence generator param.
Resource (=same as RS-Config.)
Subframe offset
RS—Individual offset
    Individual offset to a specific RS resource
Considering RS Type and Architecture A terminal may measure reference signals transmitted through a beam sweeping configuration for base stations to alternately transmit beams using different antenna configurations. The reference signals being considered are a synchronization signal and a channel state information reference signal (CSI-RS), but may not be necessarily limited thereto.

FIG. 1 illustrates a reference signal being transmitted according to an embodiment of the disclosure.

Referring to FIG. 1, a certain reference signal (RS) may include a burst set transmitted with a certain period, bursts transmitted successively or at a certain interval in the corresponding burst set, and blocks transmitted successively or at a certain interval in the corresponding burst. In this case, the respective blocks may transmit beamformed signal information using the same or different antenna configurations, and the unit of the beam sweeping for transmitting the RS through changing such beams may be a block, burst, or burst set.

Figure 2:
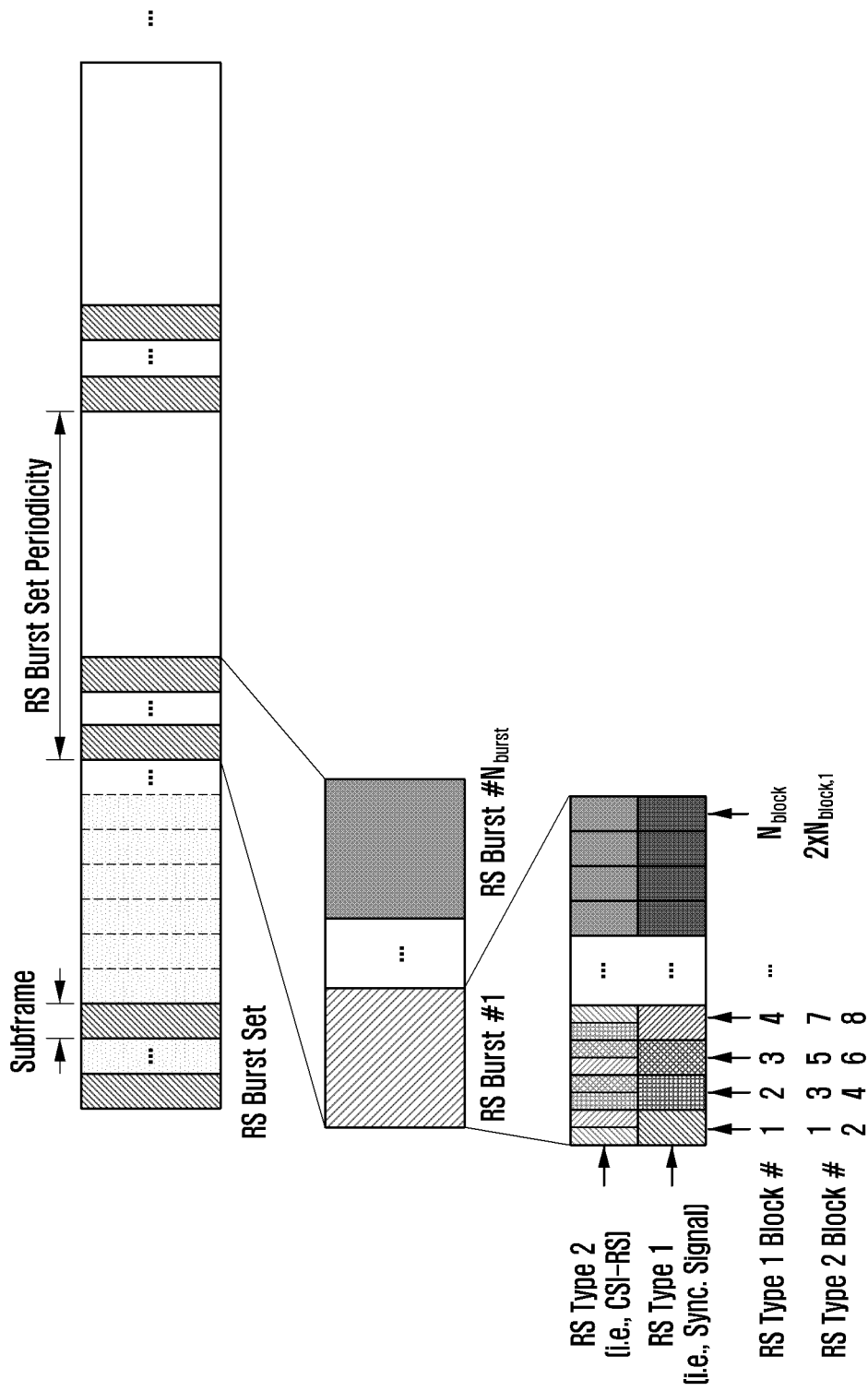
FIG. 2 illustrates different kinds of reference signals having different numbers of blocks in a same time resource according to an embodiment of the disclosure.

Further, in another embodiment of the disclosure, different kinds of reference signals may have the same period as shown in FIG. 2, and may be transmitted using different frequency bands on the same time resource. Even in this case, the different kinds of reference signals may include a burst set transmitted with a certain period, bursts transmitted successively or at a certain interval in the corresponding burst set, and blocks transmitted successively or at a certain interval in the corresponding burst. In this case, the respective blocks may transmit beamformed signal information using the same or different antenna configurations, and the unit of the beam sweeping for transmitting the RS through changing such beams may be a block, burst, or burst set.

FIG. 2 illustrates different kinds of reference signals having different numbers of blocks in the same time resource according to an embodiment of the disclosure.

Referring to FIG. 2, the different kinds of reference signals may have different numbers of blocks in the same time resource. Although FIG. 2 illustrates an example in which two RS Type 2 blocks exist corresponding to one RS Type 1 block, the numbers are not limited thereto, but may be considered in various manners.

Figure 3:
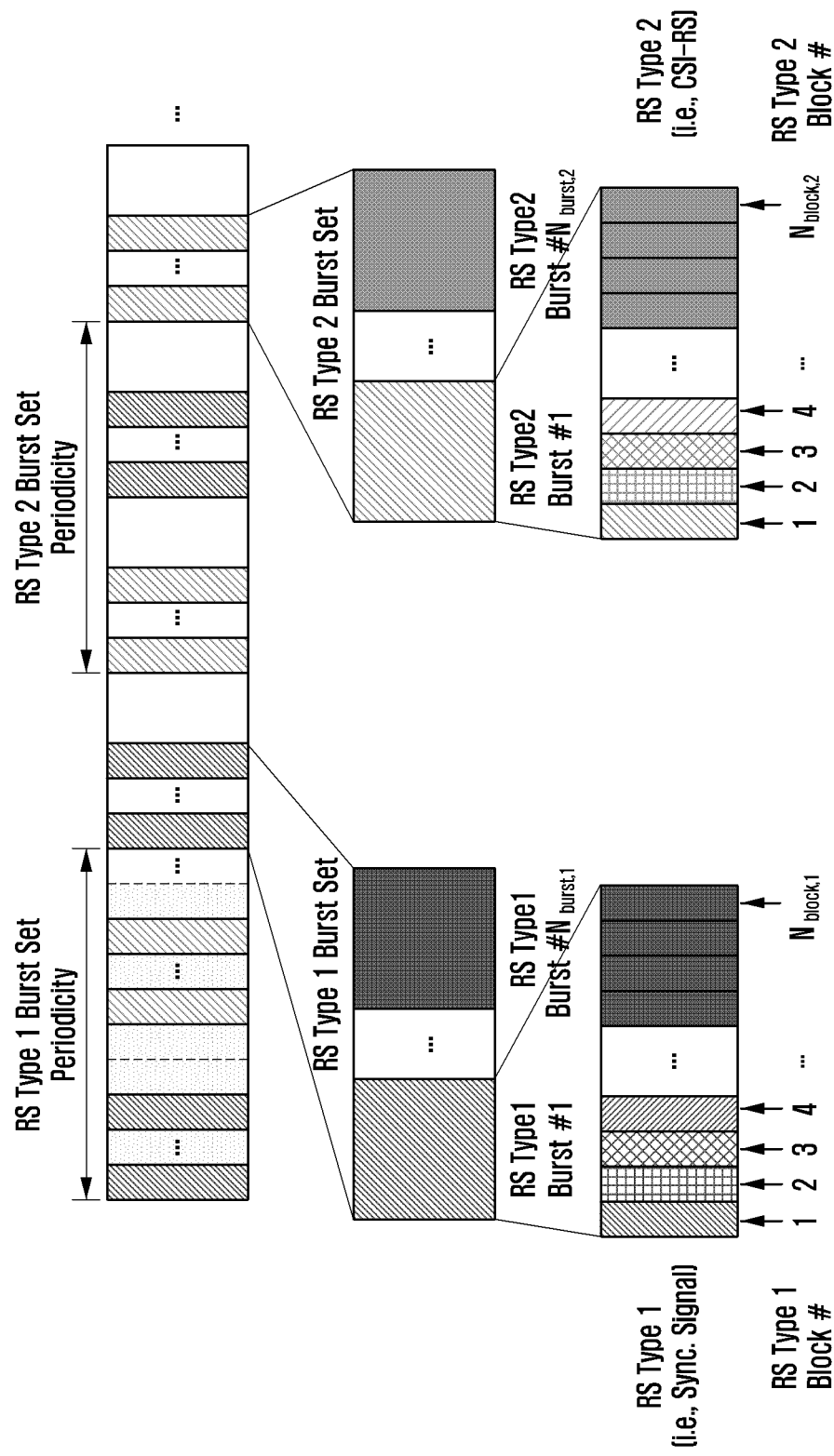
FIG. 3 illustrates different kinds of reference signals being transmitted in a same period using a same frequency band in different time resources according to an embodiment of the disclosure.

FIG. 3 illustrates different kinds of reference signals being transmitted in the same period using the same frequency band in different time resources according to an embodiment of the disclosure.

Referring to FIG. 3, in another embodiment of the disclosure, different kinds of reference signals may have the same period as shown in FIG. 3, and may be transmitted using the same frequency band on different time resources. Even in this case, the different kinds of reference signals may include a burst set transmitted with a certain period, bursts transmitted successively or at a certain interval in the corresponding burst set, and blocks transmitted successively or at a certain interval in the corresponding burst. In this case, the respective blocks may transmit beamformed signal information using the same or different antenna configurations, and the unit of the beam sweeping for transmitting the RS through changing such beams may be a block, burst, or burst set.

In addition, different kinds of reference signals may independently have different periods without correlations with each other, and may be transmitted on different times and frequency resources.

Figure 4:
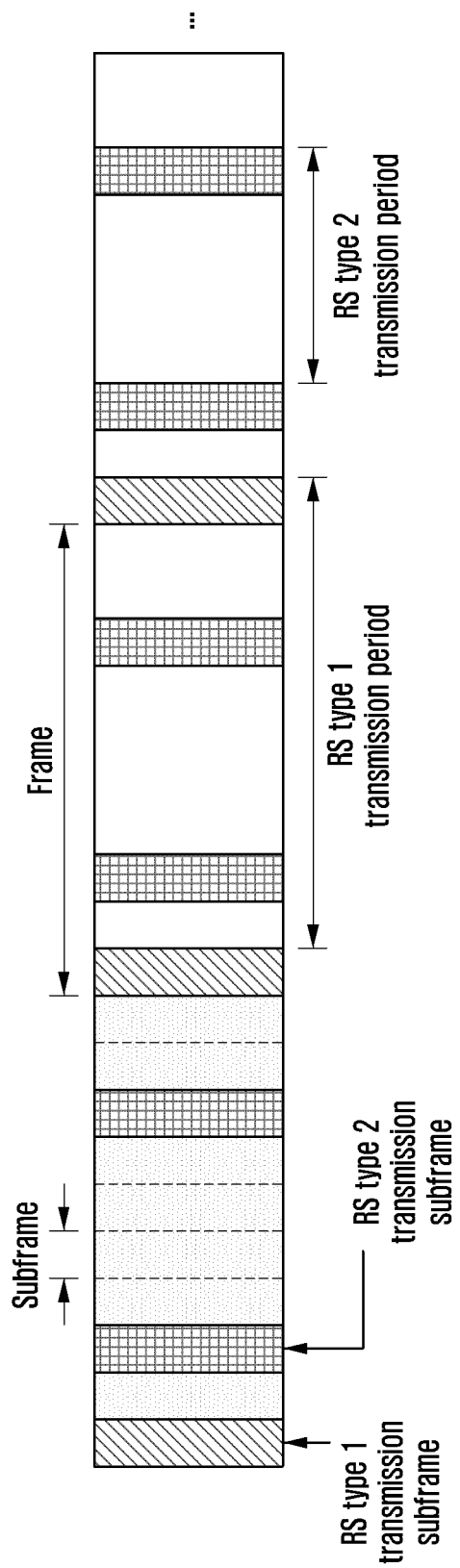
FIG. 4 illustrates reference signals being transmitted in different periods using a same frequency band in different time resources according to an embodiment of the disclosure.

FIG. 4 illustrates RSs being transmitted in different periods using a same frequency band in different time resources according to an embodiment of the disclosure.

B. Elements for RS Measurement Configuration from Network to UE

If a serving base station and an adjacent base station capable of transmitting different kinds of RSs exist, a network may provide the following information to a terminal in order to measure corresponding RSs (or certain RS).

The contents to be described in the disclosure may not be limited to a certain kind of RS, but may be one of certain RSs that can be configured by the network. Currently considerable RSs are as follows, but the disclosure is not limited thereto: synchronization signal (PSS, SSS, or any other SS), cell specific RS, beam specific RS, beam refinement RS, CSI-RS, DRS, and DM-RS.

Cell info
    Cell ID
        physical cell ID, logical cell ID, virtual cell ID
    Scrambling ID
        Parameter of Pseudo random sequence generator
    Cell Offset
        Subframe offset between serving cell and target measurement cell
        Frequency offset between serving cell and target measurement cell
        Timing offset between serving cell and target measurement cell
        Symbol/Slot boundary offset between serving cell and target measurement cell
Frequency info
    Frequency channel ID, freq. ID, ARFCN, Carrier ID, subcarrier ID, . . . .

RS resource info
  Antenna ports for RS tx
    # of antenna ports, ID of antenna ports, . . . .
  Resource mapping info.
    For UE to distinguish RE for receiving a specific RS
    I.e., Resource mapping of CSI-RS to RE
  # of blocks within a burst (Nblock)
  # of bursts within a burst set (Nburst)
  Subframe info
    To specify a subframe which contains the RS
      In LTE, Subframes containing CSI reference signals shall satisfy $(10n_f+\lfloor n_s/2 \rfloor - \Delta_{CSI-RS}) \bmod T_{CSI-RS}=0$ in terms of # of subframes, time, # of symbols, # of TTI, # of slot, # of mini-slot, # of PDCCH TTI, . . . .
  Periodicity
    Periodicity of burst set in terms of # of subframes, time, # of symbols, # of TTI, # of slot, # of mini-slot, # of PDCCH TTI, . . . .
    Periodicity of burst within a burst set in terms of # of subframes, time, # of symbols, # of TTI, # of slot, # of mini-slot, # of PDCCH TTI, . . . .
    Periodicity of block within a burst in terms of # of subframes, time, # of symbols, # of TTI, # of slot, # of mini-slot, # of PDCCH TTI, . . . .
  RS Offset (within a cell, i.e., from serving cell or from target cell)
    Offset between CSI-RS (target RS) block w.r.t. SS (pre-configured RS) block
    Offset between CSI-RS (target RS) burst w.r.t. SS (pre-configured RS) block
    Offset between CSI-RS (target RS) burst set w.r.t. SS (pre-configured RS) burst
    Offset between CSI-RS (target RS) burst set w.r.t. SS (pre-configured RS) burst set
  This offset can be time offset and/or frequency offset
  Other info
    Indication
      That the RS info. is exactly the same as the serving cell's RS.
      That the RS info. can be used for L3 mobility (to trigger measurement report)
    Index(s) from another RS
      If the network wants for the UE to measure part of (one or more than one) RSs from another RS
        Another RS should be already configured to UE
        UE should know the index of RSs within the another RS
      Index(s) could be block index, burst index, or burst set index from the another RS
    Sub-frame number
      To specify the absolute value of the subframe for accurate timing
    # of allocated CSI-RSs.
    Size of allocated CSI-RS
    Number of beams to be considered for cell level measurement quantity derivation (N)

In order to select a better cell through comparison of respective cells, a representative value for measurement values of respective cells is necessary. In order to derive such a representative value in a beamforming system, for example, N best reference signal measurement values are selected among all reference signals beamformed and transmitted with different beams, and an average value of the reference signal measurement values satisfying a certain condition (measurement value within an offset of the measurement value of the best beam or measurement value equal to or larger than a certain absolute threshold) is obtained to calculate the representative value of the cell.

In case of deriving the cell representative value using one or plural reference signal measurement values as described above, for pair comparison, the base station may transfer measurement configuration for making terminals measure a certain reference signal with the number N of reference signal measurement values to be considered in calculating the cell representative value using the corresponding reference signal.

The network may configure what RS the terminal measures by providing the whole or parts of the various information to the corresponding terminal, and hereinafter, various embodiments will be described.

C. UE Measurement Configuration Method of the Network

If a serving base station transmitting an RS that the terminal can receive and measure and an adjacent base station exist, in order to make the terminal measure the corresponding RS, the network may provide the RS information transmitted by the corresponding serving base station and the adjacent base station to the terminal in the following method.

C-1. Dedicated Signaling Based Measurement Configuration (i.e., RRC/MAC/PHY Signaling)

Method for a serving base station to directly provide RS information of a serving cell and a target cell to be measured to a belonging terminal Basically, a method for independently transmitting a unicast type message to each terminal is considered. If it is possible to additionally tie and designate one or more terminals into a group, it is also possible to simultaneously transmit a multicast type message to plural terminals.

As an embodiment of the disclosure, the base station may configure dedicated signaling based CSI-RS to the terminal for channel information measurement and report with the base station. The corresponding CSI-RS may be effective only with respect to a specific terminal, and the base station may configure the same through selection of the antenna configuration, transmission power, and resources. Such information may be transferred to the corresponding terminal through various methods in the form of an RRCConnectionReconfiguration, a MAC message, or a PHY message.

In the above-described embodiment of the disclosure, the CSI-RS to be transmitted by the base station to the terminal is information that is effective only in the cell, and may be information that is not necessary to be measured or estimated by other terminals belonging to an adjacent cell. Accordingly, including the following information, the base station may configure the CSI-RS for measuring a channel within the cell to the terminal in a dedicated signaling method. In a multi-beamforming environment, the CSI-RS may be designed to include even a case where the respective CSI-RSs are transmitted with different antenna configurations and different beams.

Further, the signal actually considered and transmitted may be transmitted to include the whole or parts of the following configurations.

CSI-RS Config.
  Indicator that this CSI-RS is only for intra-cell use
    If this indicator is off, this CSI-RS is also for inter-cell use
  Indicator that this CSI-RS is only valid for a specific UE
    If this indicator is off, this CSI-RS is common and for non-specific UE Indicator that this CSI-RS is for beam refinement and scheduling
Array of Antenna ports w/port # per beam
Array of # of using antenna ports per beam
Array of Resource per beam
Periodicity
   Periodicity of CSI-RS burst set
   Periodicity of CSI-RS burst within a CSI-RS burst set
   Periodicity of CSI-RS block within a CSI-RS burst
Offset: LTE consider from SSS to CSI-RS
   w/id (index, SFN) of originated SS (block/burst/burst set)
   w/id of destined CSI-RS type (block/burst/burst set)
   offset from the SS (block/burst/burst set) to CSI-RS (block/burst/burst set)
   The above offsets could be time offset and/or frequency offset
CSI-RS block size
   Actual size of CSI-RS block in terms of min. Unit i.e., ratio of CSI-RS block/symbol/s-frame size w.r.t. symbol size.
   Ratio of CSI-RS block/symbol/s-frame size w.r.t.~~~~ (NR-SS) size
   bitmap of ( . . . , 0.25, 0.5, 1, 2, 3, . . . )
Gap between CSI-RS blocks
   Consider if there is separation
   Window for CSI-RS measurement
# of CSI-RSs can be measured in one window
   Time duration of a measurement window
p-C
Index (or array of indices) from other RS beams
Beam info
   Beam ID (or SS block/burst/burst set ID)
Note that the above 'beam' could be replaced with CSI-RS measurement unit, such as CSI-RS block, CSI-RS burst, or CSI-RS burst set.

As another embodiment of the disclosure, the base station may configure dedicated signaling based CSI-RS to the terminal for not only channel information measurement and report with the base station but also adjacent cell information measurement. The corresponding CSI-RS may include not only serving cell information but also adjacent cell configuration information, and may be effective only with respect to a specific terminal. Even with respect to many and unspecified terminals, the base station may configure the same through selection of the antenna configuration, transmission power, and resources. Such information may be transferred to the corresponding terminal through various methods in the form of an RRCConnectionReconfiguration, a MAC message, or a PHY message.

In the above-described embodiment of the disclosure, the CSI-RS to be transmitted by the base station to the terminal is information that is effective not only in the cell but also in the adjacent cell, and may be information for terminals belonging to the serving cell to be able to measure or estimate the CSI-RS transmitted by adjacent cells. Accordingly, if the corresponding CSI-RS is configured, the terminal should know that the corresponding CSI-RS includes adjacent cell information, and should recognize that it may include additional information for successfully receiving the signal transmitted by the serving cell.

For example, including the following information, the base station may configure the CSI-RS for measuring the channel within the cell to the terminal in a dedicated signaling method. In a multi-beamforming environment, the CSI-RS may be designed to include even a case where the respective CSI-RSs are transmitted with different antenna configurations and different beams.
Cell info
   Cell ID
      physical cell ID, logical cell ID, virtual cell ID
   Scrambling ID
      Parameter of Pseudo random sequence generator
   Cell Offset
      Subframe offset between serving cell and target measurement cell
      Frequency offset between serving cell and target measurement cell
      Timing offset between serving cell and target measurement cell
      Symbol/Slot boundary offset between serving cell and target measurement cell
Frequency info
   Frequency channel ID, freq. ID, ARFCN, Carrier ID, subcarrier ID, . . . .
   Frequency offset (from reference point of the radio frame, from the SS block/burst/burst set)
Beam info
   Beam ID (or SS block/burst/burst set ID)
Other info
   Indication
      That the RS info. is exactly the same as the serving cell's RS.
      That the RS info. can be used for L3 mobility (to trigger measurement report)
   # of CSI-RS blocks within a CSI-RS burst/burst set
   # of CSI-RS bursts within a CSI-RS burst set
   Index(s) from another RS
      If the network wants for the UE to measure part of (one or more than one) RSs from another RS
      Another RS should be already configured to UE
      UE should know the index of RSs within the another RS
      Index(s) could be block index, burst index, or burst set index from the another RS
   Sub-frame number
      To specify the absolute value of the subframe for accurate timing
   Number of beams to be considered for cell level measurement quantity derivation (N)
   In order to select a better cell through comparison of respective cells, a representative value for measurement values of respective cells is necessary. In order to derive such a representative value in a beamforming system, for example, N best reference signal measurement values are selected among all reference signals beamformed and transmitted with different beams, and an average value of the reference signal measurement values satisfying a certain condition (measurement value within an offset of the measurement value of the best beam or measurement value equal to or larger than a certain absolute threshold) is obtained to calculate the representative value of the cell.
   In case of deriving the cell representative value using one or plural reference signal measurement values as described above, for pair comparison, the base station may transfer measurement configuration for making terminals measure a certain reference signal with the number N of reference signal measurement values to be considered in calculating the cell representative value using the corresponding reference signal.

Note that the above 'beam' could be replaced with CSI-RS measurement unit, such as CSI-RS block, CSI-RS burst, or CSI-RS burst set.

Hereinafter, a method for allocating RS resources to be configured more accurately and easily using an offset between the preexisting RS (synchronization signal (SS)) and RS (CSI-RS) to be configured will be described with reference to the drawings.

Figure 5A:
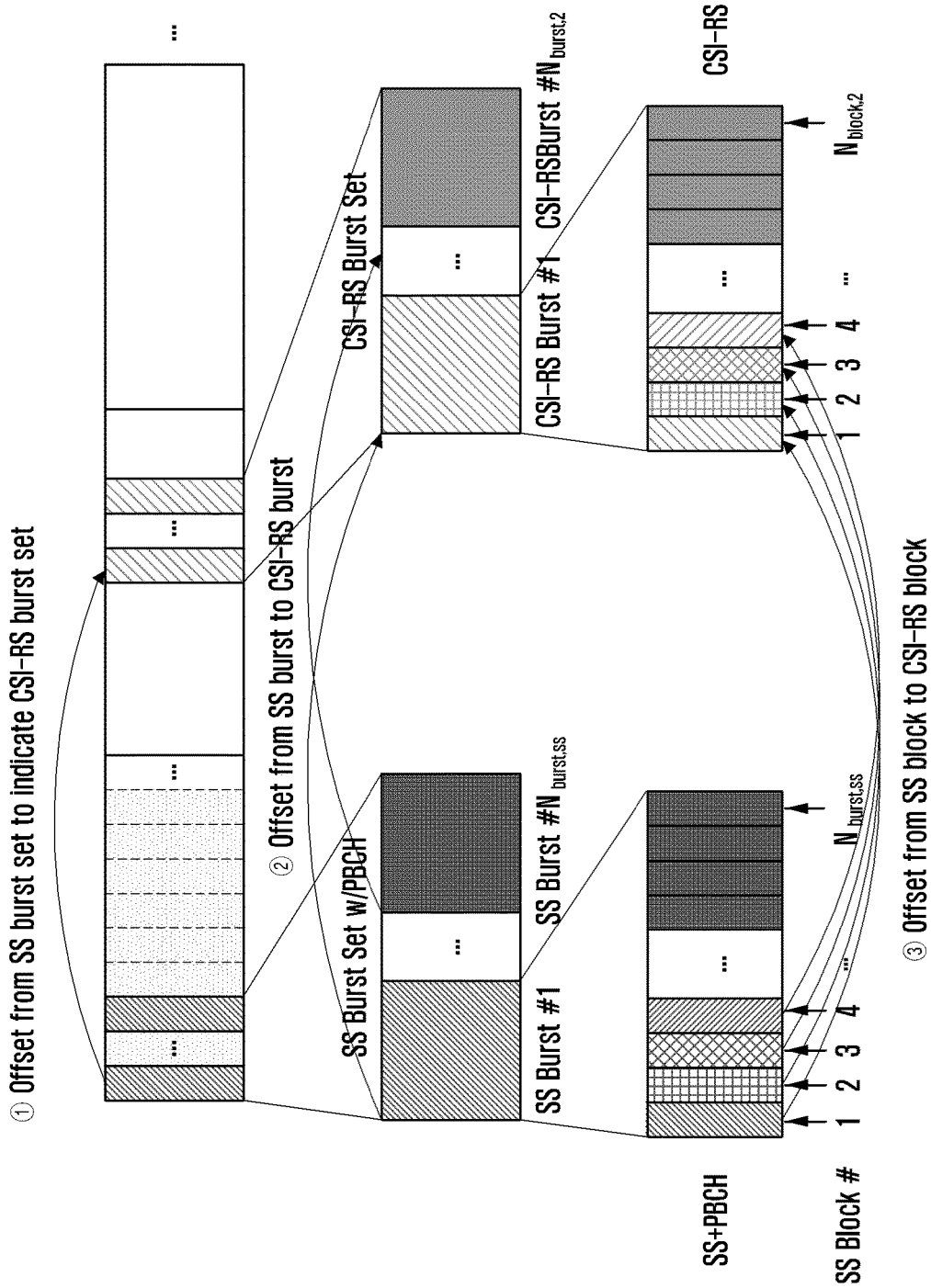
FIGS. 5A, 5B, and 5C illustrate a resource allocation method when a channel state information reference signal (CSI-RS) to be configured has a correlation with a preexisting synchronization signal (SS) according to various embodiments of the disclosure.
Figure 5B:
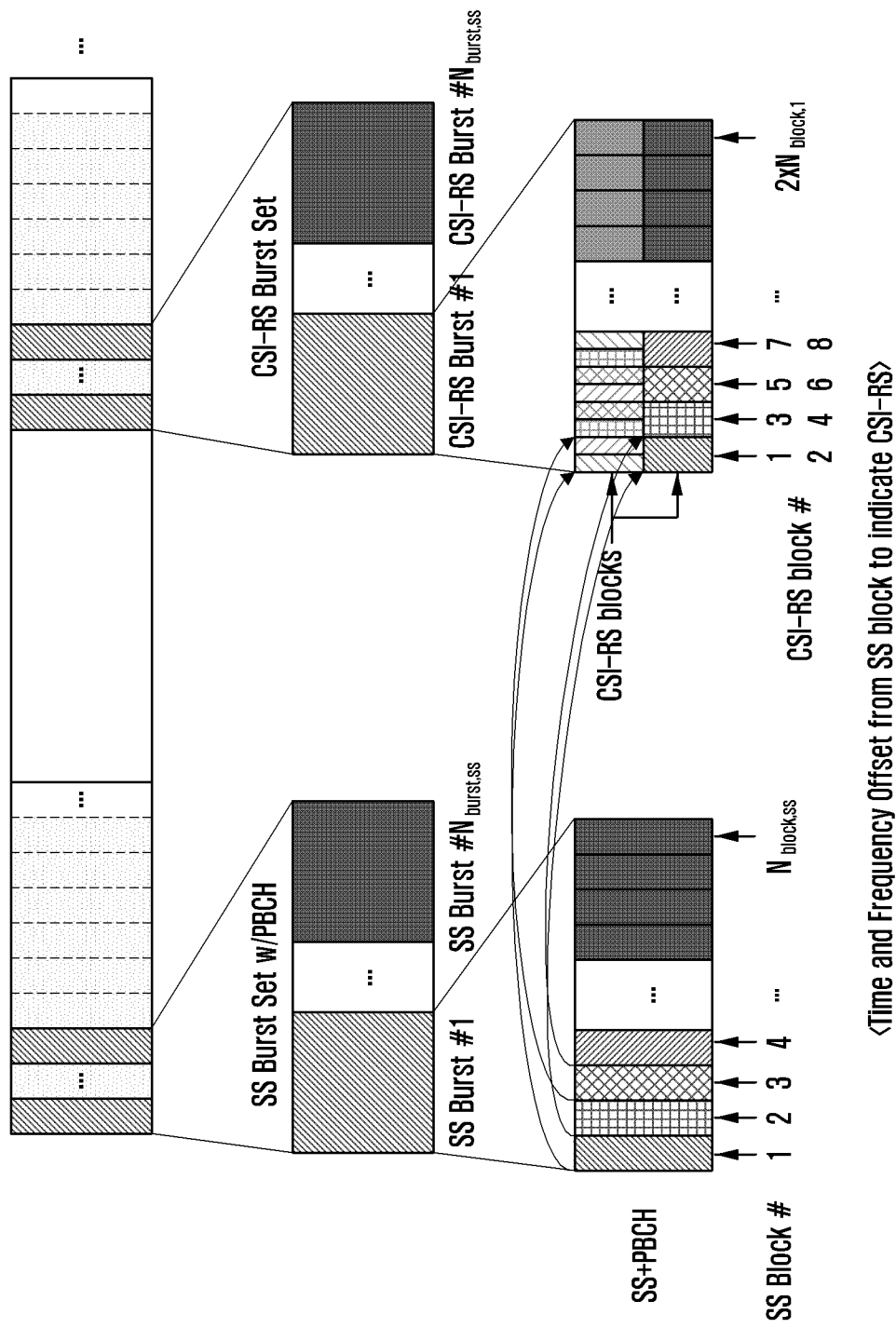
Figure 5C:
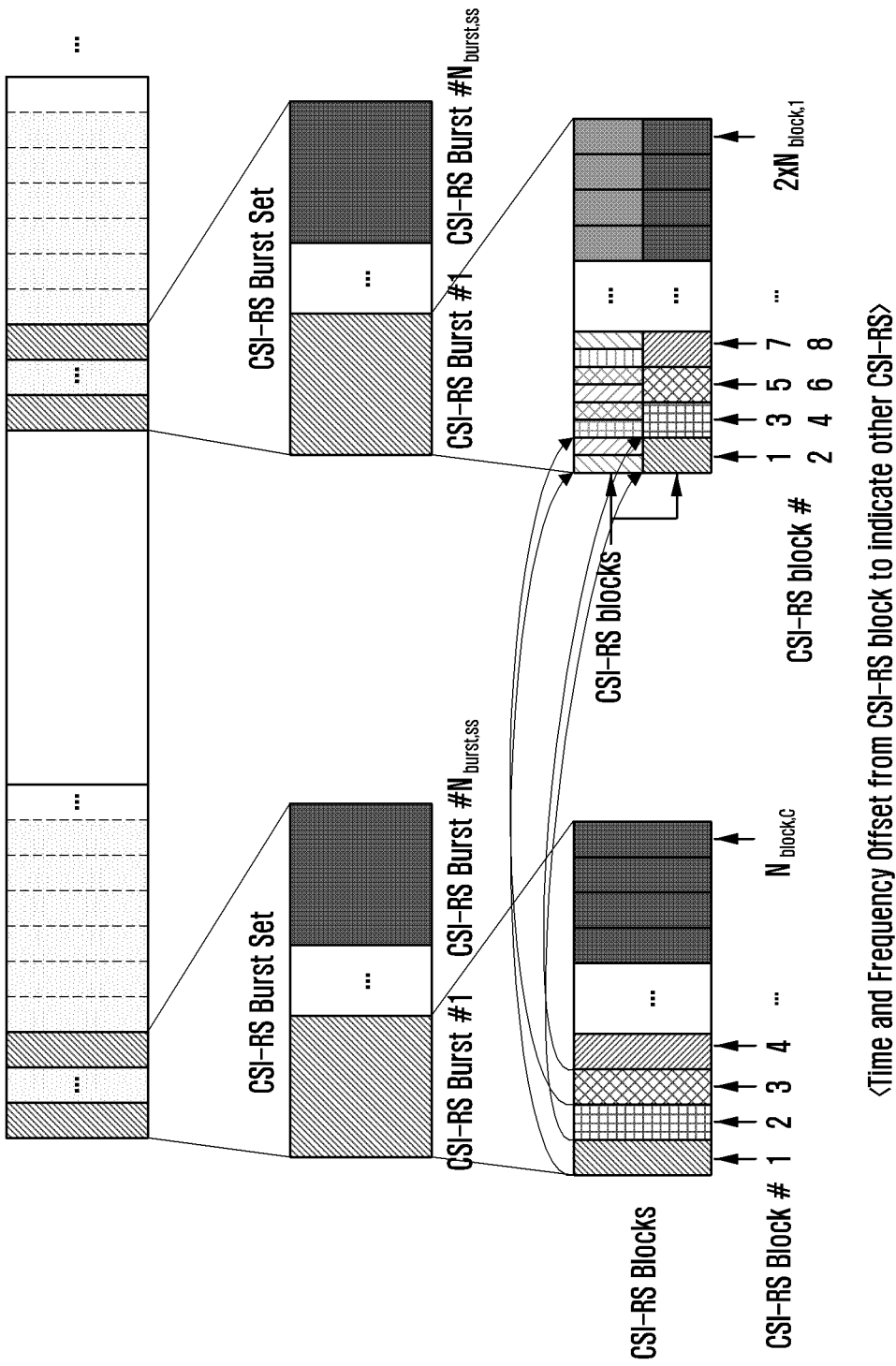

FIGS. 5A, 5B, and 5C illustrate a resource allocation method when a CSI-RS to be configured has a correlation with a preexisting SS according to various embodiments of the disclosure Referring to FIGS. 5A, 5B, and 5C, it can be seen that if the CSI-RS to be configured has a correlation with the preexisting SS, such resource allocation can be easily performed using an offset rather than a specific subframe number. The corresponding CSI-RS configuration information may exist in an illustrated broadcasting channel (PBCH) or in a certain control channel/data channel (PDCCH/PDSCH) designated by the PBCH, and may be transmitted to the terminal through signals, such as PHY/MSC/RRC/RLC.

Further, the corresponding CSI-RS configuration information is divided, and a part thereof may exist in the PBCH, and another part thereof may exist in a certain control channel/data channel (PDCCH/PDSCH) designated by the PBCH. Further, still another part thereof may be transmitted to the terminal through the signals, such as PHY/MSC/RRC/RLC.

FIG. 5A illustrates a method for allocating CSI-RS burst set resources to the offset based on the SS burst set, a method for allocating CSI-RS burst resources to the offset based on the SS burst, and a method for allocating CSI-RS block resources to the offset based on the SS block.

FIG. 5B illustrates a method for allocating CSI-RS burst set resources to the time and frequency offsets based on the SS burst set, a method for allocating CSI-RS burst resources to the time and frequency offsets based on the SS burst, and a method for allocating CSI-RS block resources to the time and frequency offset based on the SS block. The corresponding drawing illustrates a method for allocating CSI-RS resources occupying different frequencies on the same time resource.

FIG. 5C illustrates a method for allocating different CSI-RS resources to the time and frequency offsets based on the CSI-RS. The corresponding drawing illustrates a method for allocating CSI-RS resources occupying different frequencies on the same time resource.

Embodiment 1

CSI-RS config. may be in the form of the whole or parts of the following sequences.

```
CSI-RS config ::=   SEQUENCE{
    release         NULL,
    setup           SEQUENCE {
    intra-cellUseInd    BOOLEAN,
        physCellID      INTEGER (0...N_pcid),
        antennaPortsCount   ENUMERATED {an1, an2, an4, an8, an16,...N_ancnt},
        resourceConfigList  ,
        subframeConfigList  ,
        freqConfigList  ,
        timeOffset      INTEGER (0...N_to),
        frequencyOffset INTEGER (0...N_fo),
        periodicity     INTEGER (0...N_prd),
        p-C             INTEGER (-N_negpc...N_pospc),
        measUnit        INTEGER (0...N_munit),
        numberofmeasUnits   INTEGER (0...N_munits),
        measGap         INTEGER (0...N_mgap),
        measWindow      INTEGER (0...N_mwindow),
        csi-rs-IDList   CSI-RS-IDList,
    }
    ResourceConfigList::= SEQUENCE (SIZE (1..maxRcfg)) OF Integer (0...N_rcfg),
    SubframeConfigList::= SEQUENCE (SIZE (1..maxsfcfg)) OF Integer
(0...N_sfcfg),
    FreqConfigList::=   SEQUENCE (SIZE (1..maxfrcfg)) OF Integer (0...N_frcfg),
    CSI-RS-IDList::=    SEQUENCE (SIZE (1..maxcsirsid)) OF Integer (0...N_
csirsid),
}
``` intra-cellUseInd BOOLEAN,

Indication of whether the corresponding CSI-RS is dedicated in a cell and whether it can be used for a handover between cells physCellID INTEGER (0 . . . N_pcid), Cell ID belonging to the corresponding CSI-RS antennaPortsCount ENUMERATED {an1, an2, an4, an8, an16, . . . Nancnt}, Corresponding CSI-RS transmission antenna port configuration resourceConfigList Transmission resource location of corresponding CSI-RSs (list)

subframeConfigList SubframeConfigList,

Transmission subframe location of corresponding CSI-RSs (list)

freqConfigList FreqConfigList,

Transmission frequency and subcarrier location of corresponding CSI-RSs (list)

For example, it may mean a relative time interval between NR-SSs in the subframe/slot/symbol including a PBCH transmitted using a configuration structure that is equal or similar to an antenna configuration structure used by a base station in transmitting the corresponding CSI-RS.

timeOffset INTEGER (0 . . . N_to),

Relative time interval between corresponding CSI-RS transmission subframe/slot/symbol and an NR-SS related to corresponding config. (PBCH-belonging or measured by terminal)

frequencyOffset INTEGER (−Nfo1 ... N_fo2),

Relative frequency between corresponding CSI-RS transmission subframe/slot/symbol and an NR-SS related to corresponding config. (PBCH-belonging or measured by terminal) and subcarrier interval periodicity INTEGER (0 ... N_prd), Corresponding CSI-RS transmission period (same next CSI-RS transmission scheduled time)

p-C INTEGER (−N_negpc ... N_pospc),

UE assumption on reference PDSCH transmitted power for CSI feedback measUnit INTEGER (0 ... N_munit), Corresponding CSI-RS measurement unit (slot, symbol, subframe, sub-symbol, mini-slot, ... )

Ratio indication: Capable of being expressed as a multiple having the smallest unit or as a ratio with a reference unit (NR-SS size)

Indicator indication: Capable of being expressed by an indicator being 1:1-mapped on each measurement unit numberofmeasUnits INTEGER (0 ... N_munits), The number of CSI-RS units requiring measurement and related to a reference NR-SS measGap INTEGER (0 ... N_mgap), Interval between CSI-RSs requiring measurement and related to a reference NR-SS measWindow INTEGER (0 ... N_mwindow), Total CSI-RS measurement time related to a reference NR-SS csi-rs-IDList CSI-RS-IDList Corresponding CSI-RS ID list (beam ID list, scrambling id list)

QCL-ID

ID of a specific QCL in which corresponding CSI-RS has a QCL

The QCL is an abbreviation of quasi co-location, and indicates that certain characteristics between two different signals are the same as (or almost similar to) each other. "time QCL" indicates that time synchronizations are the same as (or almost similar to) each other, "frequency QCL" indicates that frequency synchronizations are the same as (or almost similar to) each other, and "spatial QCL" indicates that transmission/reception directions are similar to each other. It may be assumed that transmission/reception ends of two different signals having the same time, frequency, and spatial QCLs use configurations and beams of directional antennas existing in the same physical location and having the same direction, and in the disclosure, the QCL is defined as a correlation between signals that can be transmitted/received using the same beam.

QCLed-NR-SS-ID

The corresponding CSI-RS is an ID (NR-SS block index) of a specific NR-SS having the QCL. The terminal to which the corresponding CSI-RS has been configured may receive the corresponding CSI-RS using a received beam having the best performance among received beams used to measure the NR-SS (block, burst, and burst set) that coincides with the QCLed-NR-SS-ID. Through such an operation, the terminal receives the CSI-RS several times while changing the received beams, omits an operation of searching for the received beams through which the optimum CSI-RS can be received and reception CSI-RS performance, and can immediately find the optimum CSI-RS performance using the terminal beams used to receive the NR-SS. Through this, the terminal can reduce the power consumption and measurement delay.

QCLed-CSI-RS-ID

The corresponding CSI-RS is an ID of a specific QCLed-CSI-RS having the QCL. The terminal to which the corresponding CSI-RS has been configured may receive the corresponding CSI-RS using a received beam having the best performance among received beams used to measure the QCLed-CSI-RS that coincides with the QCLed-CSI-RS-ID. Through such an operation, the terminal receives the CSI-RS several times while changing the received beams, omits an operation of searching for the received beams through which the optimum CSI-RS can be received and reception CSI-RS performance, and can immediately find the optimum CSI-RS performance using the terminal beams used to receive the QCLed-CSI-RS. Through this, the terminal can reduce the power consumption and measurement delay.

Num-CSI-RS-per-NR-SS

The number of CSI-RS beams related to QCLed NR-SS.

The corresponding number of beams can be used as the following example to find timing of CSI-RS.

The reference point timing of CSI-RSs to be transmitted after an offset from the QCLed NR-SS is sensed.

The reference point timing of CSI-RSs to be transmitted after an offset from the QCLed NR-SS is sensed.

The terminal can recognize that CSI-RSs, the number of which is Num-CSI-RS-per-NR-SS from the corresponding reference point, are in QCL association with one NR-SS. Using this information, the terminal can be aware that the antenna configuration structure and direction used by a base station to transmit the corresponding CSI-RSs are the same as or similar to the antenna configuration structure and direction used to transmit one NR-SS, and can consider such CSI-RSs and NR-SS in a QCL association between them even without other information. Such an association can be achieved by providing only three kinds of numerical information, such as a start number of a CSI-RS index, a start number of a Num-CSI-RS-per-NR-SS, and a start number of an NR-SS index, and the terminal can easily grasp what CSI-RSs are in QCL association with the respective NR-SSs. For example, the CSI-RSs can be grouped by the number of Num-CSI-RS-per-NR-SS, starting from the index start number, and each group is in QCL association with one NR-SS index.

Numerology-ID

ID of numerology in which the corresponding CSI-RS is transmitted.

The NR-SS ID or CSI-RS ID may be replaced with a parameter calling an ID of a certain other reference signal RS.

Embodiment 2:

CSI-RS config. may be in the form of the whole or parts of the following sequences.

```
CSI-RS config ::=   SEQUENCE{
    release         NULL,
    setup           SEQUENCE {
      physCellID          INTEGER (0...N_pcid),
      intra-cellUseInd    BOOLEAN,
      antennaPortsCount   ENUMERATED {an1, an2, an4, an8, an16,...N_ancnt},
```

```
    resourceConfigList  ResourceConfigList,
    subframeConfigList  SubframeConfigList,
    freqConfigList      FreqConfigList,
    timeOffset          INTEGER (0...N_to),
    frequencyOffset     INTEGER (0...N_fo),
    periodicity         INTEGER (0...N_prd),
    p-C                 INTEGER (-N_negpc...N_pospc),
    measUnit            INTEGER (0...N_munit),
    numberofmeasUnits   INTEGER (0...N_munits),
    measGap             INTEGER (0...N_mgap),
    measWindow          INTEGER (0...N_mwindow),
    csi-rs-ID-List      CSI-RS-ID-List,
    qcl-ID-List         QCL-ID-List,
    qcled-NR-SS-ID-List QCLed-NR-SS-ID-List,
    qcled-CSI-RS-ID-List QCLed-CSI-RS-ID-List,
    numerology-ID-List  Numerology-ID-List,
}
ResourceConfig-List::= SEQUENCE (SIZE (1..maxRcfg)) OF ResourceConfig,
SubframeConfig-List::= SEQUENCE (SIZE (1..maxsfcfg)) OF SubframeConfig,
FreqConfig-List::=  SEQUENCE (SIZE (1..maxfrcfg)) OF FreqConfig,
CSI-RS-ID-List::=   SEQUENCE (SIZE (1..maxcsirsid)) OF CSI-RS-ID,
QCL-ID-List::=      SEQUENCE (SIZE (1..maxqclid)) OF QCL-ID,
QCLed-NR-SS-ID-List::= SEQUENCE (SIZE (1..maxqclSS)) OF QCLed-NR-SS-ID,
QCLed-CSI-RS-ID-List::= SEQUENCE (SIZE (1..maxqclCSIRS)) OF QCLed-CSI-RS-ID,
Numerology-ID-List ::= SEQUENCE (SIZE (1..maxnumID) OF Numerology-ID,
}
```

CSI-RS-ID

Corresponding CSI-RS ID (beam ID, scrambling id)

QCL-ID

ID of a specific QCL in which corresponding CSI-RS has a QCL

QCLed-NR-SS-ID

The corresponding CSI-RS is an ID (NR-SS block index) of a specific NR-SS having the QCL. The terminal to which the corresponding CSI-RS has been configured may receive the corresponding CSI-RS using a received beam having the best performance among received beams used to measure the NR-SS (block, burst, and burst set) that coincides with the QCLed-NR-SS-ID. Through such an operation, the terminal receives the CSI-RS several times while changing the received beams, omits an operation of searching for the received beams through which the optimum CSI-RS can be received and reception CSI-RS performance, and can immediately find the optimum CSI-RS performance using the terminal beams used to receive the NR-SS. Through this, the terminal can reduce the power consumption and measurement delay.

QCLed-CSI-RS-ID

The corresponding CSI-RS is an ID of a specific QCLed-CSI-RS having the QCL. The terminal to which the corresponding CSI-RS has been configured may receive the corresponding CSI-RS using a received beam having the best performance among received beams used to measure the QCLed-CSI-RS that coincides with the QCLed-CSI-RS-ID. Through such an operation, the terminal receives the CSI-RS several times while changing the received beams, omits an operation of searching for the received beams through which the optimum CSI-RS can be received and reception CSI-RS performance, and can immediately find the optimum CSI-RS performance using the terminal beams used to receive the QCLed-CSI-RS. Through this, the terminal can reduce the power consumption and measurement delay.

Numerology-ID

ID of numerology in which the corresponding CSI-RS is transmitted.

Embodiment 3:

CSI-RS config. may be in the form of the whole or parts of the following sequences.

```
CSI-RS-Cell-Config-List ::=  SEQUENCE (SIZE (1..maxcsirscell))
OF CSI-RS-Cell-Config,
CSI-RS-Cell-Config ::= SEQUENCE{
  release           NULL,
  setup             SEQUENCE {
    physCellID      INTEGER (0...N_pcid),
    intra-cellUseInd BOOLEAN,
    csi-rs-config-List CSI-RS-Config-List,
  }
CSI-RS-Config-List ::= SEQUENCE (SIZE (1..maxcsirscfg))
OF CSI-RS-Config,
CSI-RS-Config ::=  SEQUENCE {
    antennaPortsCount  ENUMERATED {an1, an2, an4,
    an8, an16,...N_ancnt},
    csi-rs-time-config   CSI-RS-Time-Config,
    csi-rs-freq-config   CSI-RS-Freq-Config,
    csi-rs-meas-config ,
    csi-rs-RE-mapping    CSI-RS-RE-mapping,
    p-C               INTEGER (-N_negpc...N_pospc),
    csi-rs-ID         CSI-RS-ID,
    qcl-ID            ,
    qcled-NR-SS-ID       QCLed-NR-SS-ID,
    qcled-CSI-RS-ID-List QCLed-CSI-RS-ID-List,
    numerology-ID        Numerology-ID,
}
CSI-RS-Time-Config ::= SEQUENCE{
    subframeConfig    SubframeConfig,
    nr-ss-based-timeoffset NR-SS-based-time-offset,
    NR-SS-offset-indicator BOOLEAN,
    timeOffset        INTEGER (0...N_to),
    periodicity       Periodicity,
    periodicity-ID    Periodicity-ID,
}
CSI-RS-Freq-Config ::= SEQUENCE{
    freqConfigList    FreqConfigList,
    frequency Offset  INTEGER (0...N_fo),
}
CSI-RS-Meas-Config::= SEQUENCE{
    measUnit          INTEGER (0...N_munit),
    numberofmeasUnits INTEGER (0...N_munits),
```

```
    measGap         INTEGER (0...N_mgap),
    measWindow      INTEGER (0...N_mwindow),
  }
}
```

NR-SS-Based-Time-Offset

An offset value if the timing of the corresponding CSI-RS is the corresponding offset from a specific NR-SS.

Here, the specific NR-SS is an NR-SS in which the corresponding CSI-RS has a QCL, and such information may be implicitly known through observation of the terminal, or may be explicitly included in QCLed-NR-SS-ID to be transmitted.

NR-SS-Offset-Indicator

An indicator indicating that the time offset of the corresponding CSI-RS is an offset from a specific NR-SS having a QCL. If it is true, the timing of the corresponding CSI-RS corresponds to an offset from a specific NR-SS that is in QCL relationship with the corresponding CSI-RS, whereas if it is false, the timing of the corresponding CSI-RS corresponds to an offset value from a frame boundary (radio frame, slot, symbol . . . ).

CSI-RS-RE-Mapping

An index enabling the corresponding CSI-RS to know a mapping rule for searching for an RE being transmitted. If a specific method (table) is specified in the standard, the terminal and the base station can successfully and efficiently share mapping through exchanging of the index.

Periodicity-ID

Actual value of an index or a period in which the corresponding CSI-RS indicates repeated period.

Embodiment 4:

CSI-RS config. may be in the form of the whole or parts of the following sequences.

```
CSI-RS-Cell-Config-List ::=  SEQUENCE (SIZE (1..maxcsirscell))
OF CSI-RS-Cell-Config,
CSI-RS-Cell-Config ::= SEQUENCE{
    release         NULL,
    setup           SEQUENCE {
      physCellID        INTEGER (0...N_pcid),
      intra-cellUseInd  BOOLEAN,
      csi-rs-config-List  CSI-RS-Config-List,
      antennaPortsCount   ENUMERATED {an1, an2, an4, an8,
        an16,...N_ancnt},
      p-C           INTEGER (-N_negpc...N_pospc),
      numerology-ID     Numerology-ID,
      periodicity-ID    Periodicity-ID,
```

```
  }
}
CSI-RS-Config-List ::= SEQUENCE (SIZE (1..maxcsirscfg))
OF CSI-RS-Config,
CSI-RS-Config ::=  SEQUENCE {
    csi-rs-time-config    CSI-RS-Time-Config,
    csi-rs-freq-config    CSI-RS-Freq-Config,
    csi-rs-meas-config    CSI-RS-Meas-Config,
    csi-rs-RE-mapping     CSI-RS-RE-mapping,
    csi-rs-ID             CSI-RS-ID,
    qcl-ID                QCL-ID,
    qcled-NR-SS-ID        QCLed-NR-SS-ID,
    qcled-CSI-RS-ID-List  QCLed-CSI-RS-ID-List,
}
CSI-RS-Time-Config ::= SEQUENCE{
    subframeConfig    SubframeConfig,
    nr-ss-based-timeoffset NR-SS-based-time-offset,
    NR-SS-offset-indicator BOOLEAN,
    timeOffset        INTEGER (0...N_to),
}
CSI-RS-Freq-Config ::= SEQUENCE{
    freqConfigList    FreqConfigList,
    frequencyOffset   INTEGER (0...N_fo),
}
CSI-RS-Meas-Config::= SEQUENCE{
    measUnit          INTEGER (0...N_munit),
    numberofmeasUnits INTEGER (0...N_munits),
    measGap           INTEGER (0...N_mgap),
    measWindow        INTEGER (0...N_mwindow),
}
}
```

The above-described embodiment corresponds to an example in which maximum common information that the respective CSI-RS resources have is transmitted from cell config., and individual information that only the respective CSII-RSs have is provided in the form of a list.

Embodiment 5: All Resource Information Transmission

According to this embodiment of the disclosure, resources of all CSI-RSs are individually configured when a base station configures a terminal to observe a CSI-RS.

```
CSI-RS-Cell-Config-List ::=  SEQUENCE (SIZE (1..maxcsirscell)) OF CSI-RS-
Config-List,
CSI-RS-Config-List ::=  SEQUENCE (SIZE (1..maxcsirscell)) OF CSI-RS-Config,
CSI-RS-Config ::=      SEQUENCE{
    release         NULL,
    setup           SEQUENCE {
    intra-cellUseInd    BOOLEAN,
       physCellID       INTEGER (0...N_pcid),
       antennaPortsCount    ENUMERATED {an1, an2, an4, an8, an16,...N_ancnt},
       resourceConfigList   ResourceConfigList,
       subframeConfigList   SubframeConfigList,
       freqConfigList       FreqConfigList,
       periodicity          INTEGER (0...N_prd),
    p-C          INTEGER (-N_negpc...N_pospc),
       csi-rs-IDList        CSI-RS-IDList,
    }
    ResourceConfigList::= SEQUENCE (SIZE (1..maxRcfg)) OF Integer (0...N_rcfg),
    SubframeConfigList::= SEQUENCE (SIZE (1..maxsfcfg)) OF Integer
(0...N_sfcfg),
```

-continued

```
    FreqConfigList::=   SEQUENCE (SIZE (1..maxfrcfg)) OF Integer (0...N__frcfg),
    CSI-RS-IDList::=    SEQUENCE (SIZE (1..maxcsirsid)) OF Integer (0...N__
csirsid),
}
```

Embodiment 6 Transmission of NR-SS Based Connection Relationship

When configuring a terminal to observe a CSI-RS, a base station may make the terminal identify a resource of the corresponding RS (hereafter, CSI-RS) in accordance with a correlation with a certain reference RS (NR-SS or CSI-RS, hereafter, called NR-SS). In this embodiment of the disclosure, CSI-RSs having the same offset with respect to all reference NR-SSs are configured without notifying of an ID of a reference NR-SS that is in a correlation with a specific CSI-RS. In the corresponding embodiment of the disclosure, FIG. 5A illustrates the correlation.

```
CSI-RS-Cell-Config-List ::=   SEQUENCE (SIZE (1..maxcsirscell))
OF CSI-RS-Config-List,
CSI-RS-Config-List ::=    SEQUENCE (SIZE (1..maxcsirscell))
OF CSI-RS-Config,
CSI-RS-Config::=       SEQUENCE{
    release            NULL,
    setup              SEQUENCE {
       physCellID          INTEGER (0...N__pcid),
       timeOffset          INTEGER (0...N__to),
       frequencyOffset     INTEGER (0...N__fo),
       periodicity         INTEGER (0...N__prd),
       numerology          Numerology,
       scrambling__ID      Scrambling-ID,
       measUnit            INTEGER (0...N__munit),
       numberofmeasUnits   INTEGER (0...N__munits),
       measGap             INTEGER (0...N__mgap),
       csi-rs-IDList       CSI-RS-IDList,
    }
    CSI-RS-IDList::=   SEQUENCE (SIZE (1..maxcsirsid)) OF Integer
(0...N__csirsid),
}
```

The terminal having received (configured) the CSI-RS config. can grasp what rule one or more CSI-RSs are configured in using the embodiment with respect to the cell to which the corresponding CSI-RS is configured. In this case, the one or more CSI-RSs may be composed of common information (period, NR-SS in a QCL relationship, scrambling ID, numerology, and antenna ports) and independent information (CSI-RS transmission location and antenna ports). The terminal may refer to the configuration information to grasp the independent information, or may discriminate and receive the respective CSI-RSs through a certain operation using parameters provided from the configuration information. As an example of such an operation, the terminal may grasp and measure the CSI-RS location in the following methods.

1) Grasp a CSI-RS transmission reference point spaced apart for an offset (time/frequency) from a measured NR-SS 2) Grasp necessity of reception of one CSI-RS with a measUnit size from the corresponding reference point 3) Grasp necessity of reception of numberofmeasUnits of CSI-RSs in total 4) Grasp measGap between respective CSI-RSs 5) Grasp respective CSI-RS IDs from csi-rs-IDList 6) Grasp retransmission of respective CSI-RSs in a periodicity unit on the same frequency resource Embodiment 7 Transmission of NR-SS Based Connection Relationship When configuring a terminal to observe a CSI-RS, a base station may make the terminal identify a resource of the corresponding RS (hereafter, CSI-RS) in accordance with a correlation with a certain reference RS (NR-SS or CSI-RS, hereafter, called NR-SS). In this embodiment of the disclosure, one or more CSI-RSs having the same offset with respect to all reference NR-SSs are configured in a one-to-many manner without notifying of an ID of a reference NR-SS that is in a correlation with a specific CSI-RS. In the corresponding embodiment of the disclosure, FIGS. 5B and 5C illustrates the correlation.

```
CSI-RS-Cell-Config-List ::=   SEQUENCE (SIZE (1..maxcsirscell))
OF CSI-RS-Config-List,
CSI-RS-Config-List ::=    SEQUENCE (SIZE (1..maxcsirscell))
OF CSI-RS-Config,
CSI-RS-Config ::=      SEQUENCE{
    release            NULL,
    setup              SEQUENCE {
       physCellID          INTEGER (0...N__pcid),
       csi-rs-rsc-List     CSI-RS-rsc-List,
       periodicity         INTEGER (0...N__prd),
       numerology          Numerology,
       scrambling__ID      Scrambling-ID,
       measUnit            INTEGER (0...N__munit),
       numberofmeasUnits   INTEGER (0...N__munits),
       measGap             INTEGER (0...N__mgap),
    }
    CSI-RS-rsc-List::=   SEQUENCE (SIZE (1..maxcsirscfg))
OF CSI-RS-rsc,
    CSI-RS-rsc ::=     SEQUENCE{
       timeOffset          INTEGER (0...N__to),
       frequencyOffset     INTEGER (0...N__fo),
       re__mapping         RE__mapping,
       csi-rs-ID           CSI-RS-ID,
    }
}
```

Embodiment 8: NR-SS Based Connection Relationship and Transmission of NR-SS ID Having the Connection Relationship When configuring a terminal to observe a CSI-RS, a base station may make the terminal identify a resource of the corresponding RS (hereafter, CSI-RS) in accordance with a correlation with a certain reference RS (NR-SS or CSI-RS, hereafter, called NR-SS). In this embodiment of the disclosure, one or more CSI-RSs having different offsets with respect to reference NR-SSs are configured through notifying of an ID of a reference NR-SS that is in a correlation with a specific CSI-RS. In the corresponding embodiment of the disclosure, FIGS. 5B and 5C illustrates the correlation.

```
CSI-RS-Cell-Config-List ::=   SEQUENCE (SIZE (1..maxcsirscell))
OF CSI-RS-Config-List,
CSI-RS-Config-List ::=    SEQUENCE (SIZE (1..maxcsirscell))
OF CSI-RS-Config,
CSI-RS-Config ::=      SEQUENCE{
    release            NULL,
    setup              SEQUENCE {
       physCellID          INTEGER (0...N__pcid),
       csi-rs-rsc-List     CSI-RS-rsc-List,
       periodicity         INTEGER (0...N__prd),
       numerology          Numerology,
```

```
    scrambling_ID      Scrambling-ID,
    measUnit           INTEGER (0...N_munit),
    numberofmeasUnits  INTEGER (0...N_munits),
    measGap            INTEGER (0...N_mgap),
    }
    CSI-RS-rsc-List::= SEQUENCE (SIZE (1..maxcsirscfg))
    OF CSI-RS-rsc,
    CSI-RS-rsc ::=    SEQUENCE{
        timeOffset        INTEGER (0...N_to),
        frequencyOffset   INTEGER (0...N_fo),
        re_mapping        RE_mapping,
        csi-rs-ID         CSI-RS-ID,
        qcled-NR-SS-ID       QCLed-NR-SS-ID,
        qcled-CSI-RS-ID-List  QCLed-CSI-RS-ID-List,
    }
}
```

The terminal having received the information may specify CSI-RS resources from an NR-SS having a specific NR-SS ID, and may receive the CSI-RS having a correlation with the corresponding NR-SS using UE Rx beams having the optimum performance in receiving the corresponding NR-SS.

Figure 6:
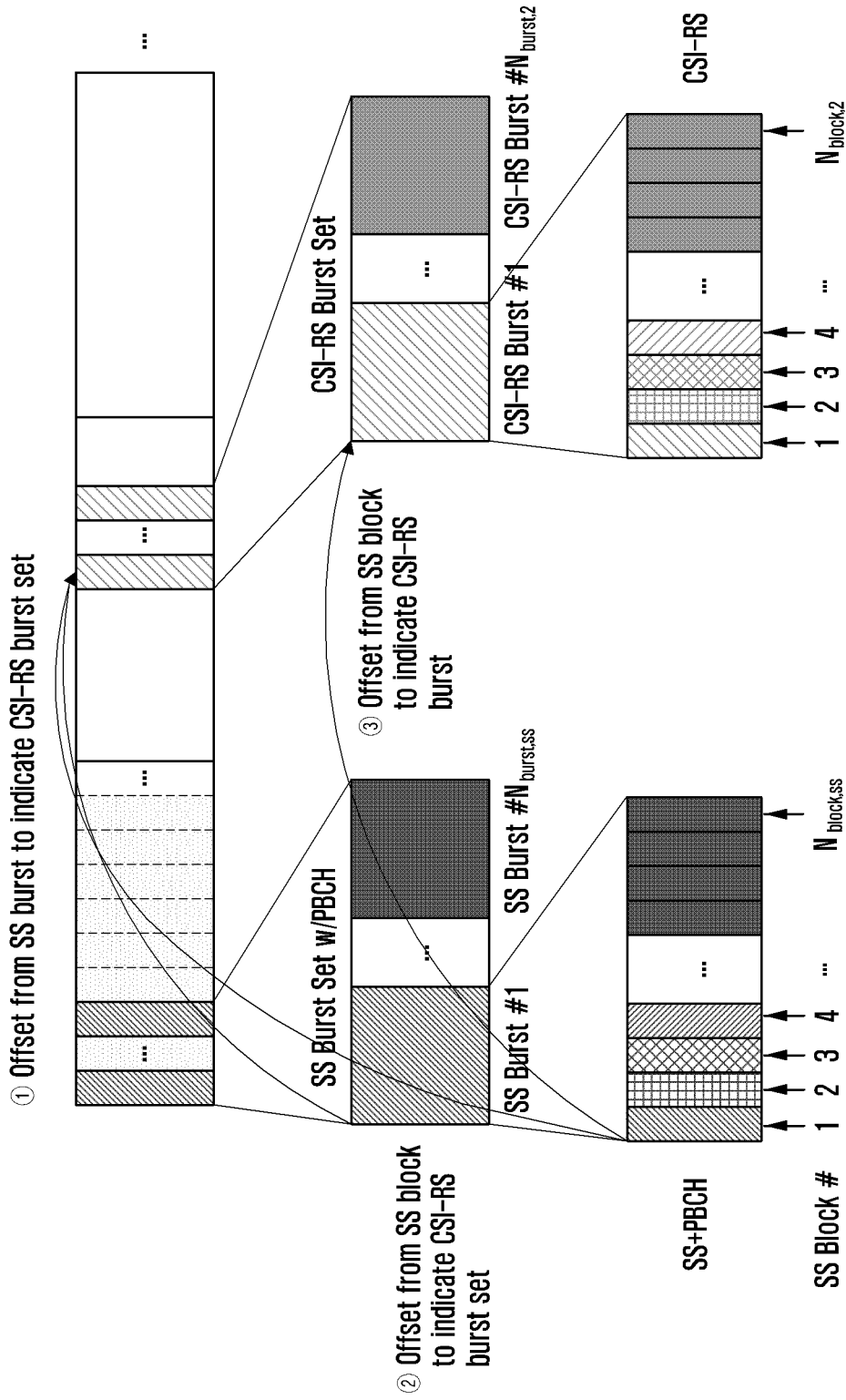
FIG. 6 illustrates a resource allocation method when a CSI-RS to be configured has a correlation with a preexisting SS according to an embodiment of the disclosure.

FIG. 6 illustrates a resource allocation method when a CSI-RS to be configured has a correlation with a preexisting SS according to an embodiment of the disclosure.

Referring to FIG. 6, it can be seen that if the CSI-RS to be configured has a correlation with the preexisting SS, such resource allocation can be easily performed using an offset rather than a specific subframe number.

The corresponding CSI-RS configuration information may exist in an illustrated PBCH) or in a certain control channel/data channel (PDCCH/PDSCH) designated by the PBCH), and may be transmitted to the terminal through signals, such as PHY/MSC/RRC/RLC.

Further, the corresponding CSI-RS configuration information is divided, and a part thereof may exist in the PBCH), and another part thereof may exist in a certain control channel/data channel (PDCCH/PDSCH) designated by the PBCH). Further, still another part thereof may be transmitted to the terminal through the signals, such as PHY/MS C/RRC/RLC.

FIG. 6 illustrates a method for allocating CSI-RS burst set resources to the offset based on the SS burst, a method for allocating CSI-RS burst set resources to the offset based on the SS block, and a method for allocating CSI-RS burst resources to the offset based on the SS block.

Figure 7:
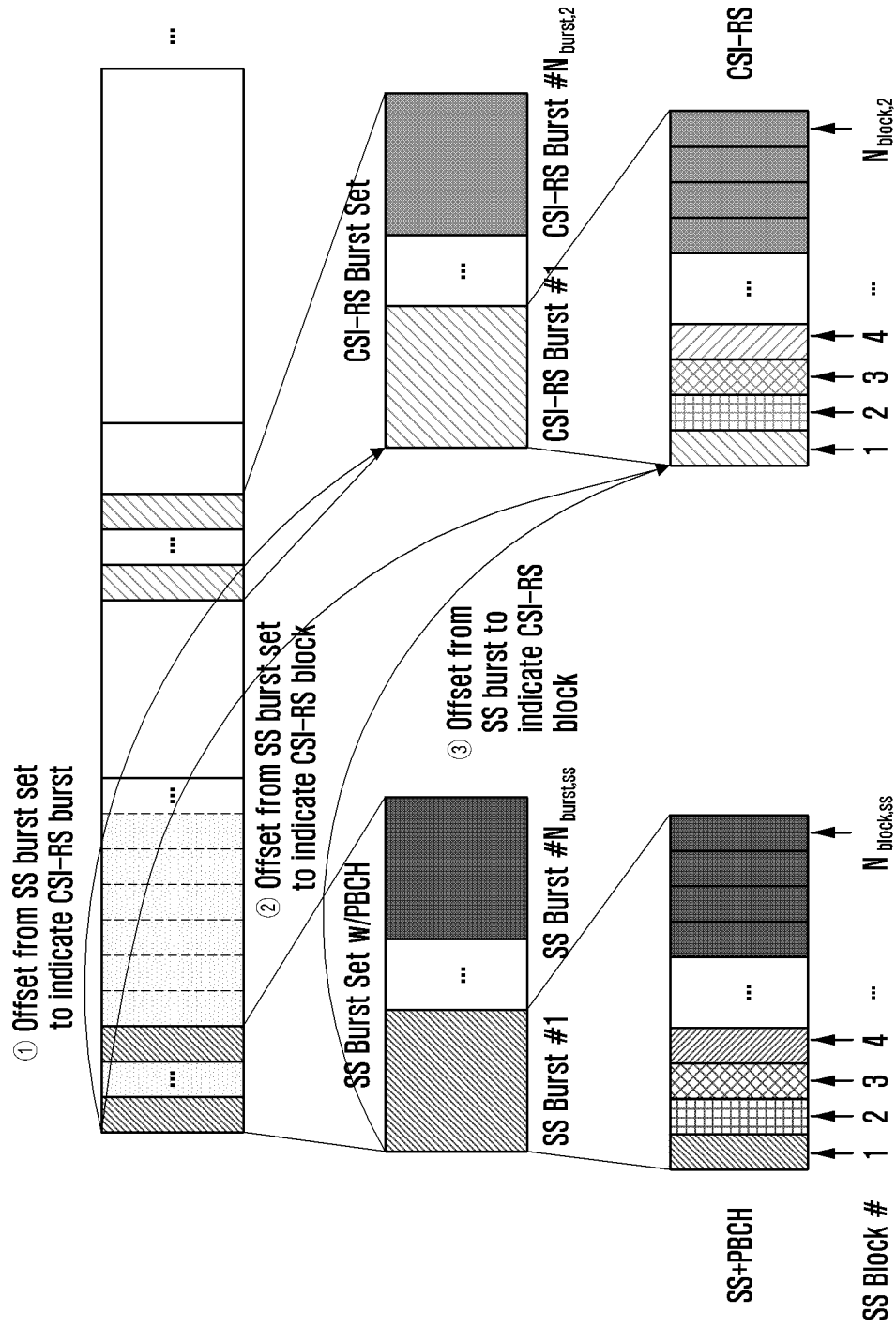
FIG. 7 illustrates a resource allocation method when a CSI-RS to be configured has a correlation with a preexisting SS according to an embodiment of the disclosure.

FIG. 7 illustrates a resource allocation method when a CSI-RS to be configured has a correlation with a preexisting SS according to an embodiment of the disclosure.

Referring to FIG. 7, it can be seen that if the CSI-RS to be configured has a correlation with the preexisting SS, such resource allocation can be easily performed using an offset rather than a specific subframe number.

The corresponding CSI-RS configuration information may exist in an illustrated PBCH or in a certain control channel/data channel (PDCCH/PDSCH) designated by the PBCH, and may be transmitted to the terminal through signals, such as PHY/MSC/RRC/RLC.

Further, the corresponding CSI-RS configuration information is divided, and a part thereof may exist in the PBCH, and another part thereof may exist in a certain control channel/data channel (PDCCH/PDSCH) designated by the PBCH. Further, still another part thereof may be transmitted to the terminal through the signals, such as PHY/MS C/RRC/RLC.

FIG. 7 illustrates a method for allocating CSI-RS burst resources to the offset based on the SS burst set, a method for allocating CSI-RS block resources to the offset based on the SS burst set, and a method for allocating CSI-RS block resources to the offset based on the SS burst.

Using the offsets as described above with reference to FIGS. 5A to 5C, 6, and 7, the base station can allocate CSI-RS resources to the terminal (or terminals) in the following methods.

1. Indication of referred type of RS (i.e., SS burst set=0, SS burst=1, SS block=2)+offset (# of subframes/slots/symbols, time, frequency, . . . )
   With this option, UE can detect CSI-RS block/burst/burst set based on the referred RS.
   With this option, UE may know that the CSI-RS of a specific resource will be transmitted by the same beam as the referred RS.

2. Indication of the specific resource of the referred type of RS (i.e., resource of the reference point of the SS burst set/burst/block)+offset (# of subframes/slots/symbols, time, frequency, . . . )
   With this option, UE can detect CSI-RS block/burst/burst set based on the referred resource location.
   With this option, UE may know that the CSI-RS of a specific resource will be transmitted by the same beam as the referred RS
   i. i.e., even if the reference resource is in the middle of the referred RS, the CSI-RS will be transmitted on the same beams consequently after the reference resource.
   With this option, network can allocate only part of the referred RSs as CSI-RS.

3. Indication of the specific resource of the referred type of RS (i.e., resource of the reference point of the SS burst set/burst/block)+offset (# of subframes/slots/symbols, time, frequency, . . . )+end-of-CSI-RS resource
   With this option, UE can detect CSI-RS block/burst/burst set based on the referred resource location.
   With this option, UE may know that the CSI-RS of a specific resource will be transmitted by the same beam as the referred RS
   i. i.e., even if the reference resource is in the middle of the referred RS, the CSI-RS will be transmitted on the same beams consequently after the reference resource.
   With this option, network can allocate only part of the referred RSs as CSI-RS.

4. Indication of referred type of RS (i.e., SS burst set=0, SS burst=1, SS block=2)+Indication of CSI-RS (i.e., CSI-RS burst set=0, CSI-RS burst=1, CSI-RS block=2)+offset (# of subframes/slots/symbols, time, frequency, . . . )
   With this option, UE can detect CSI-RS block/burst/burst set based on the referred RS.
   With this option, UE may know that the CSI-RS of a specific resource will be transmitted by the same beam as the referred RS.

5. Indication of the specific resource of the referred type of RS (i.e., resource of the reference point of the SS burst set/burst/block)+Indication of referred type of RS (i.e., SS burst set=0, SS burst=1, SS block=2)+Indication of CSI-RS (i.e., CSI-RS burst set=0, CSI-RS burst=1, CSI-RS block=2)+offset (# of subframes/slots/symbols, time, frequency, . . . )+end-of-CSI-RS resource
   With this option, UE can detect CSI-RS block/burst/burst set based on the referred resource location.
   With this option, UE may know that the CSI-RS of a specific resource will be transmitted by the same beam as the referred RS i. i.e., even if the reference resource is in the middle of the referred RS, the CSI-RS will be transmitted on the same beams consequently after the reference resource.

With this option, network can allocate only part of the referred RSs as CSI-RS.

C-2. Broadcasting Signal-Based Measurement Configuration (Master System Information, System Information, Broadcasting Signal, Multicasting Signal, . . . )

A method for a base station to provide RS information of a corresponding cell to be measured to many and unspecified terminals as a broadcasting channel or a broadcasting signal In an embodiment of the disclosure, the terminal may include RS configuration information in a certain broadcasting channel or broadcasting message to be transmitted.

The CSI-RS information included in the corresponding message to be transmitted may be a part of various pieces of information as described above.

Figure 8:
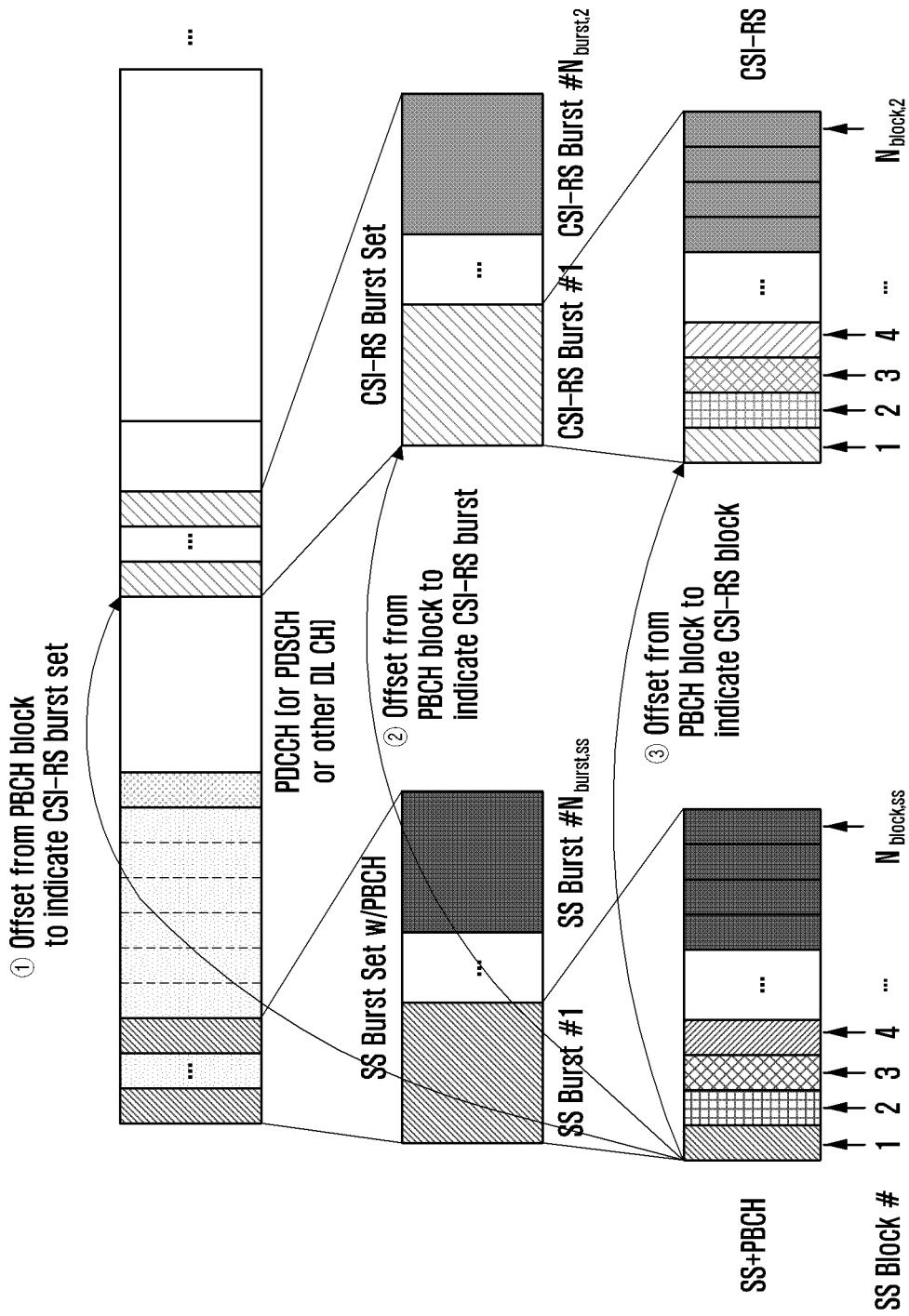
FIG. 8 illustrates a physical broadcast channel (PBCH) block uses an offset to configure a CSI-RS burst set, burst, and block according to an embodiment of the disclosure.
Figure 9:
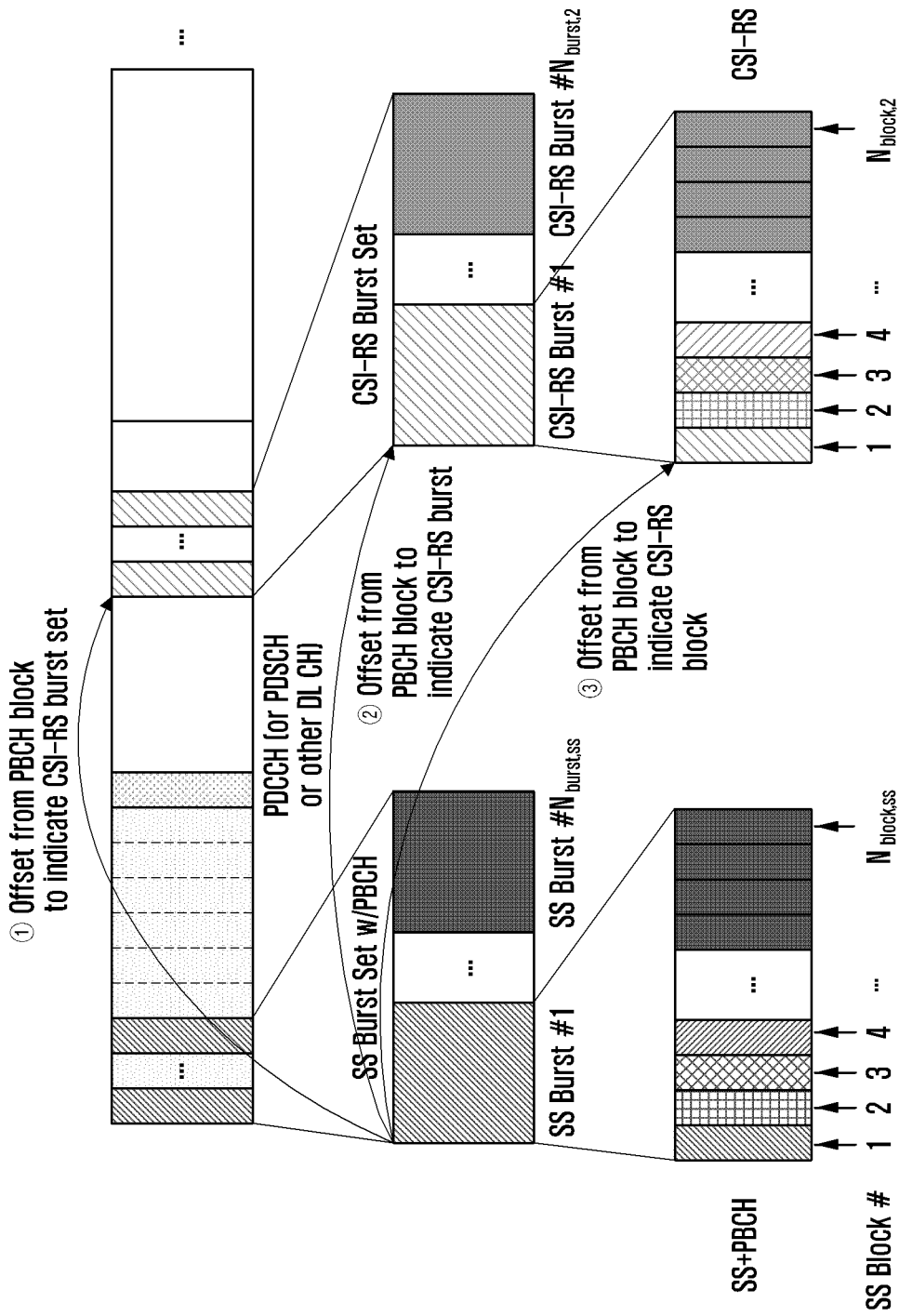
FIG. 9 illustrates a PBCH burst uses an offset to configure a CSI-RS burst set, burst, and block according to an embodiment of the disclosure.
Figure 10:
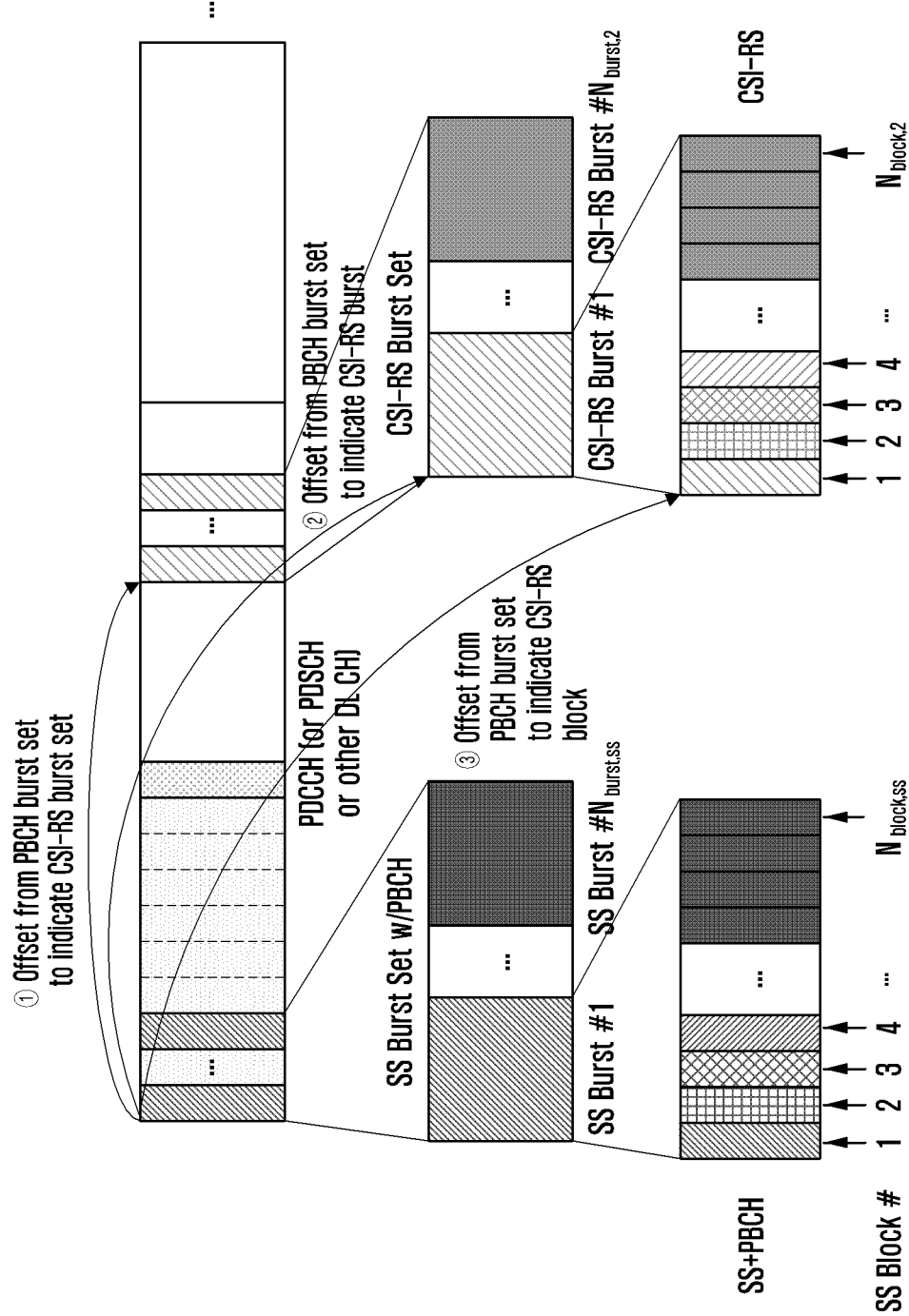
FIG. 10 illustrates a PBCH burst set uses an offset to configure a CSI-RS burst set, burst, and block according to an embodiment of the disclosure.

FIGS. 8, 9, and 10 illustrate a PBCH burst set uses an offset to configure a CSI-RS burst set, burst, and block according to various embodiments of the disclosure.

Referring to FIGS. 8, 9, and 10, if a CSI-RS to be configured in a certain broadcasting channel has a correlation with the corresponding broadcasting channel (e.g., if being transmitted with the same beams or if occupying resource blocks having the same size), such resource allocation can be easily performed using an offset rather than a specific subframe number.

The corresponding CSI-RS configuration information may exist in an illustrated PBCH or in a certain control channel/data channel (PDCCH/PDSCH) designated by the PBCH, and may be transmitted to the terminal through signals, such as PHY/MSC/RRC/RLC.

Further, the corresponding CSI-RS configuration information is divided, and a part thereof may exist in the PBCH, and another part thereof may exist in a certain control channel/data channel (PDCCH/PDSCH) designated by the PBCH. Further, still another part thereof may be transmitted to the terminal through the signals, such as PHY/MSC/RRC/RLC.

FIG. 8 may illustrate that a PBCH block uses an offset to configure a CSI-RS burst set, burst, and block.

FIG. 9 may illustrate that a PBCH burst uses an offset to configure a CSI-RS burst set, burst, and block.

FIG. 10 may illustrate that a PBCH burst set uses an offset to configure a CSI-RS burst set, burst, and block.

In this case, the terminal and the base station may tacitly know that corresponding configuration resources use beams of the same base station as that of PBCH (by standard), or an indicator is given, and the base station may universally know the same through the corresponding indicator (e.g., 1 bit).

Further, the PDSCH is a signal being continuously transmitted in a short period in a cell, and for power saving, it may not include the corresponding CSI-RS every time. In this case, whether the corresponding PDSCH includes the CSI-RS may be indicated by 1 bit to be transmitted to the PBCH.

If it is intended to maximize the power saving, the PBCH may include minimum information necessary for CSI-RS detection, for example, offset, and may not include other information.

Figure 11A:
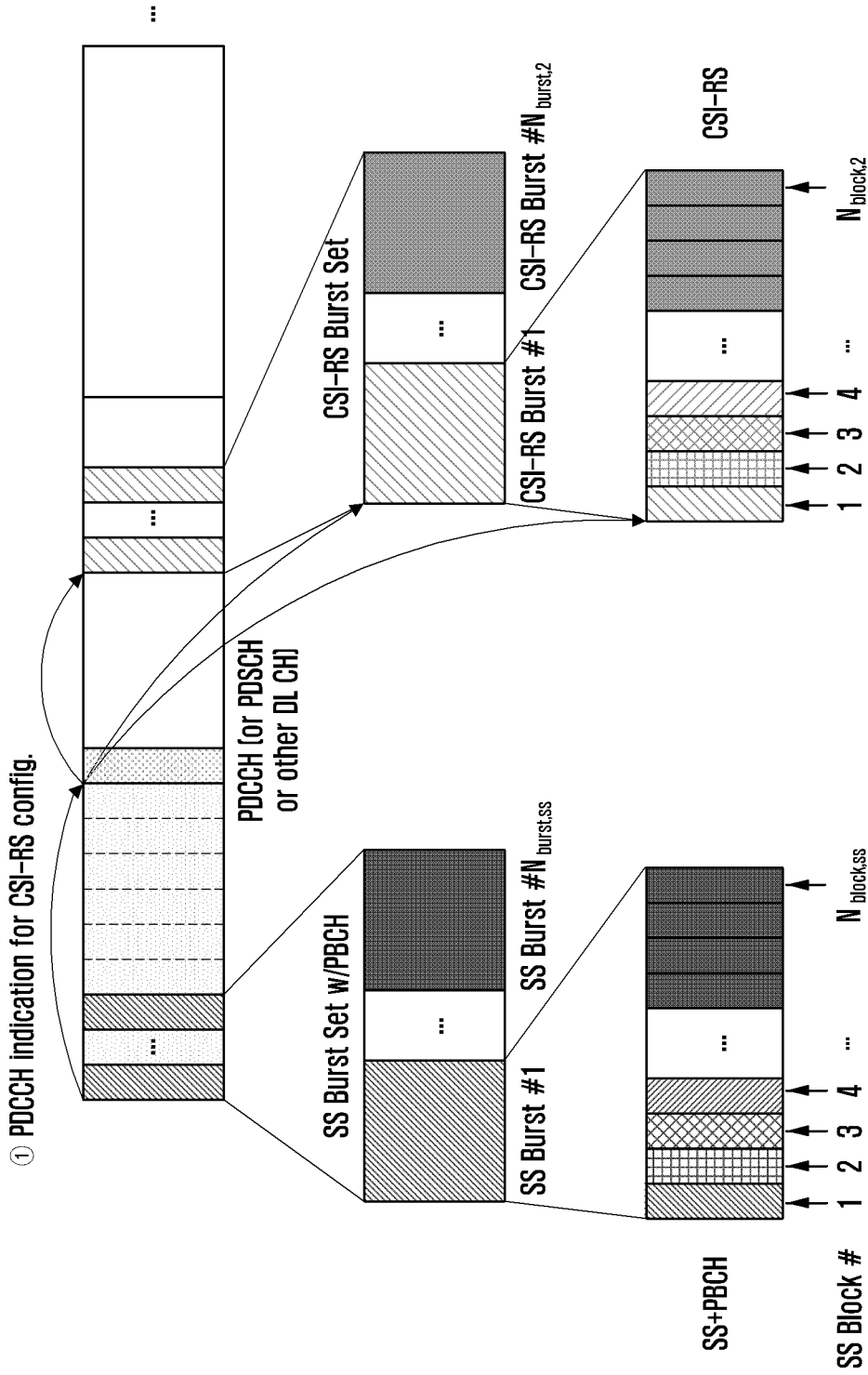
FIGS. 11A and 11B illustrate a base station occupying a downlink resource to transmit configuration information for CSI-RS measurement using a broadcasting channel, and configuring information for the CSI-RS measurement to a terminal through a corresponding downlink resource according to various embodiments of the disclosure.
Figure 11B:
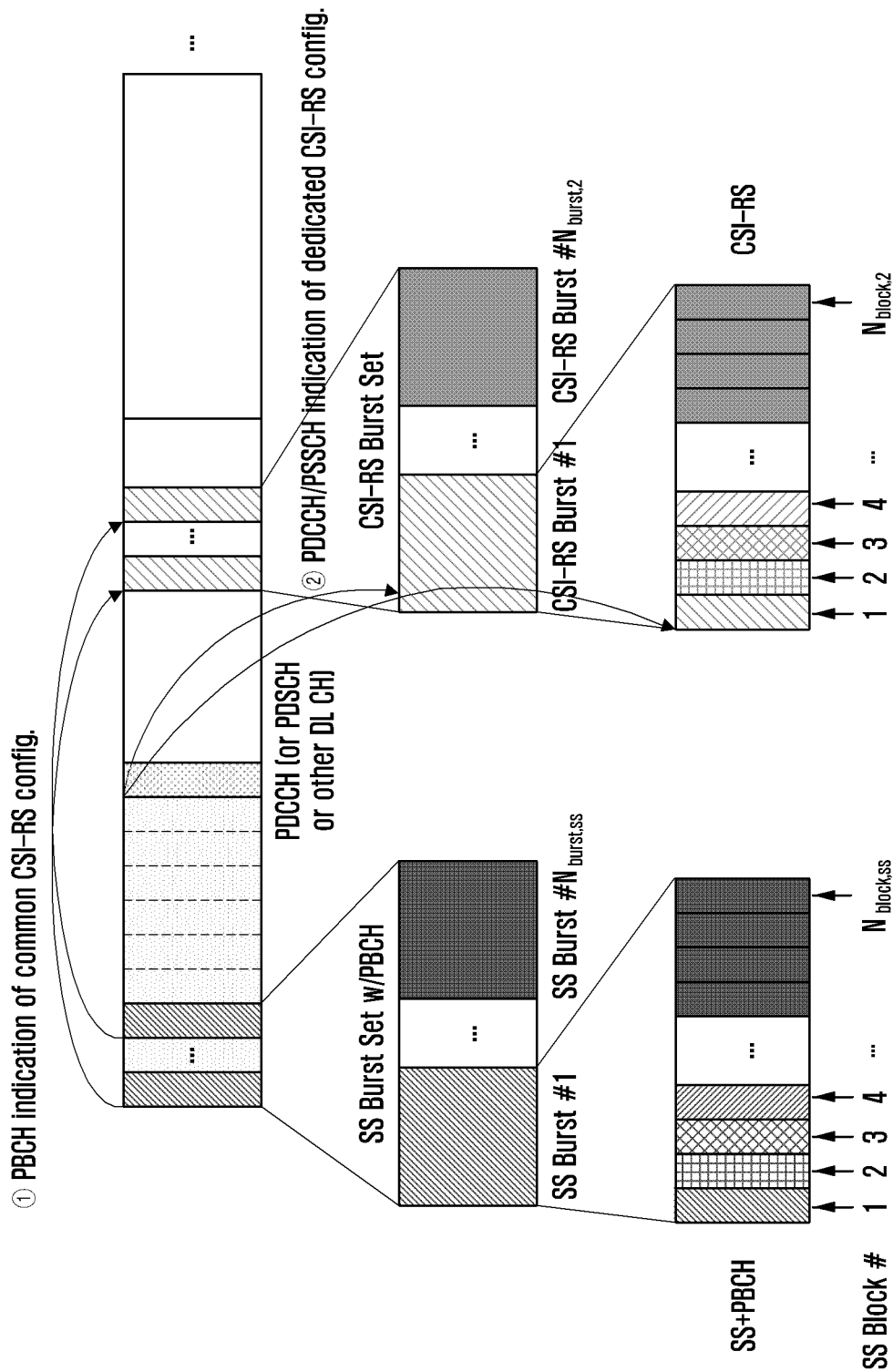

FIGS. 11A and 11B illustrate a base station occupying a downlink resource to transmit configuration information for CSI-RS measurement using a broadcasting channel, and configuring information for the CSI-RS measurement to a terminal through a corresponding downlink resource according to various embodiments of the disclosure.

Referring to FIG. 11A, a base station may occupy a downlink resource for transmitting configuration information for CSI-RS measurement using a certain broadcasting channel, and may configure information for the CSI-RS measurement to many and unspecified terminals (or specific terminal) through the corresponding downlink resource.

The corresponding CSI-RS configuration information may exist in an illustrated PBCH or in a certain control channel/data channel (PDCCH/PDSCH) designated by the PBCH, and may be transmitted to the terminal through signals, such as PHY/MSC/RRC/RLC.

Further, the corresponding CSI-RS configuration information is divided, and a part thereof may exist in the PBCH, and another part thereof may exist in a certain control channel/data channel (PDCCH/PDSCH) designated by the PBCH. Further, still another part thereof may be transmitted to the terminal through the signals, such as PHY/MSC/RRC/RLC.

In the PBCH, a certain indicator indicating that the control channel or data channel (PDCCH/PDSCH), resource schedule information, and corresponding resources (PDCCH/PDSCH) include CSI-RS allocation information may be included.

Referring to FIG. 11B, a frame structure and procedure in which common information of a CSI-RS is configured through a broadcasting channel and detailed information of the CSI-RS is configured using dedicated PHY/MAC/RLC/RRC signals, and a terminal combines the two kinds of information to measure the CSI-RS.

According to an embodiment illustrated in FIG. 11B, a network provides common information that CSI-RS resources have through the broadcasting channel, and provides detailed CSI-RS resource configuration information using dedicated signals PHY/MAC/RLC/RRC. In the corresponding embodiment of the disclosure, an offset between an NR-SS and CSI-RS burst (or burst set) is provided using the PBCH, and the detailed CSI-RS measurement unit, number, and CSI-RS transmission antenna port information are provided as the dedicated signals.

The network may disperse even any CSI-RS configuration information that is not according to the above-described embodiment to the terminal through a broadcasting channel, a control channel or a data channel, and provide the dispersed information to the terminal.

C-3. Self-discoverable Signal-Based Measurement Configuration

A method in which a base station does not provide RS information of a corresponding cell to be measured to many and unspecified terminals through signal transmission, but a terminal itself discovers measurement configuration using a method prescribed in the standard.

As an embodiment of the disclosure, if a certain RS is discovered, the terminal itself may discover and measure the CSI-RS resources.

1. Spec Fixed Offset to Discover CSI-RS Block/Burst/Burst Set According to SS Block/Burst/Burst Set Resource.

Figure 12:
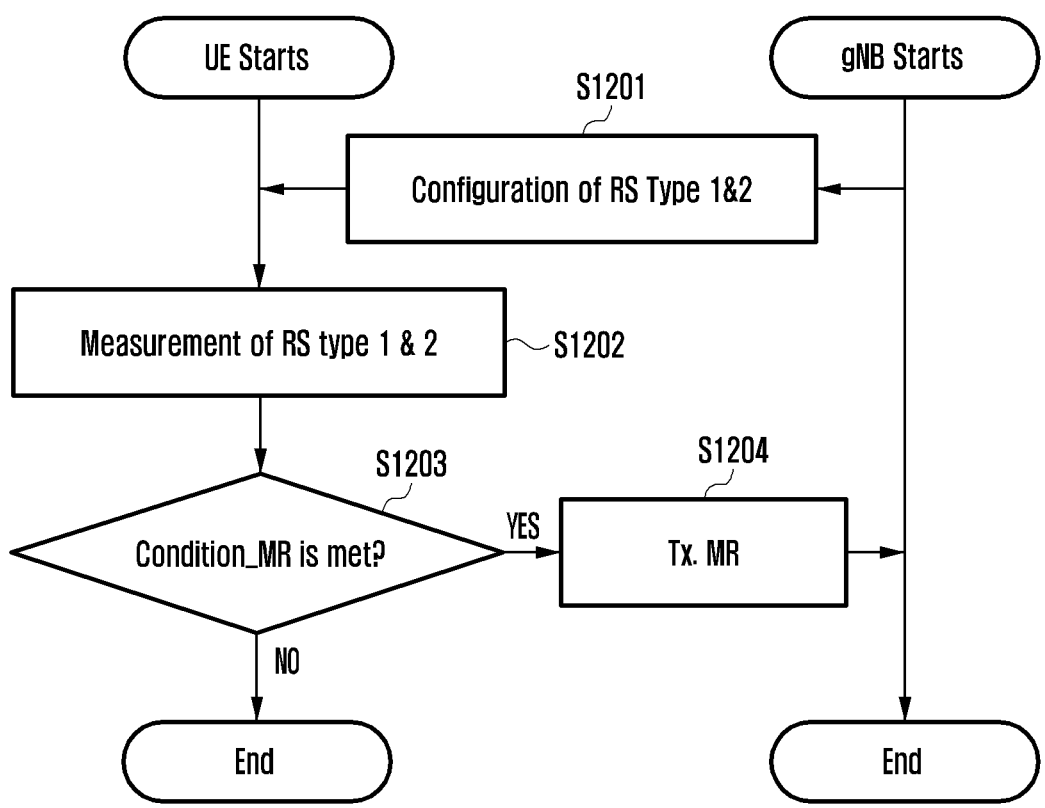
FIG. 12 is a flowchart illustrating a method for reporting a measurement result in accordance with an RS configuration for a terminal of a serving base station, configured RS measurement of the terminal, and a condition of the terminal according to an embodiment of the disclosure.

FIG. 12 is a flowchart illustrating a method for reporting a measurement result in accordance with an RS configuration for a terminal of a serving base station, configured RS measurement of the terminal, and a condition of the terminal according to an embodiment of the disclosure.

Referring to FIG. 12, it is possible to observe different RS configuration by a serving base station to a terminal, configured RS measurement of the terminal, and measurement result report according to a condition of the terminal. As can be seen from FIGS. 5A to 5C, the serving base station can configure different RS information to the terminal for the purpose of measurement, and in addition, and also can configure the condition to send the measurement report (MR) at operation S1201. As configured, the terminal attempts measurement of different RSs at operation S1202, observes the condition to transmit the measurement report as configured at operation S1203, and reports the measurement result if the condition is satisfied at operation S1204.

The measurement report or an RS Type2 configuration request message may include the measurement result for the configured RS, the corresponding measurement result is managed by a measurement object ID, and both the base station and the terminal can recognize what RS the measurement result is for through the corresponding ID.

Figure 13:
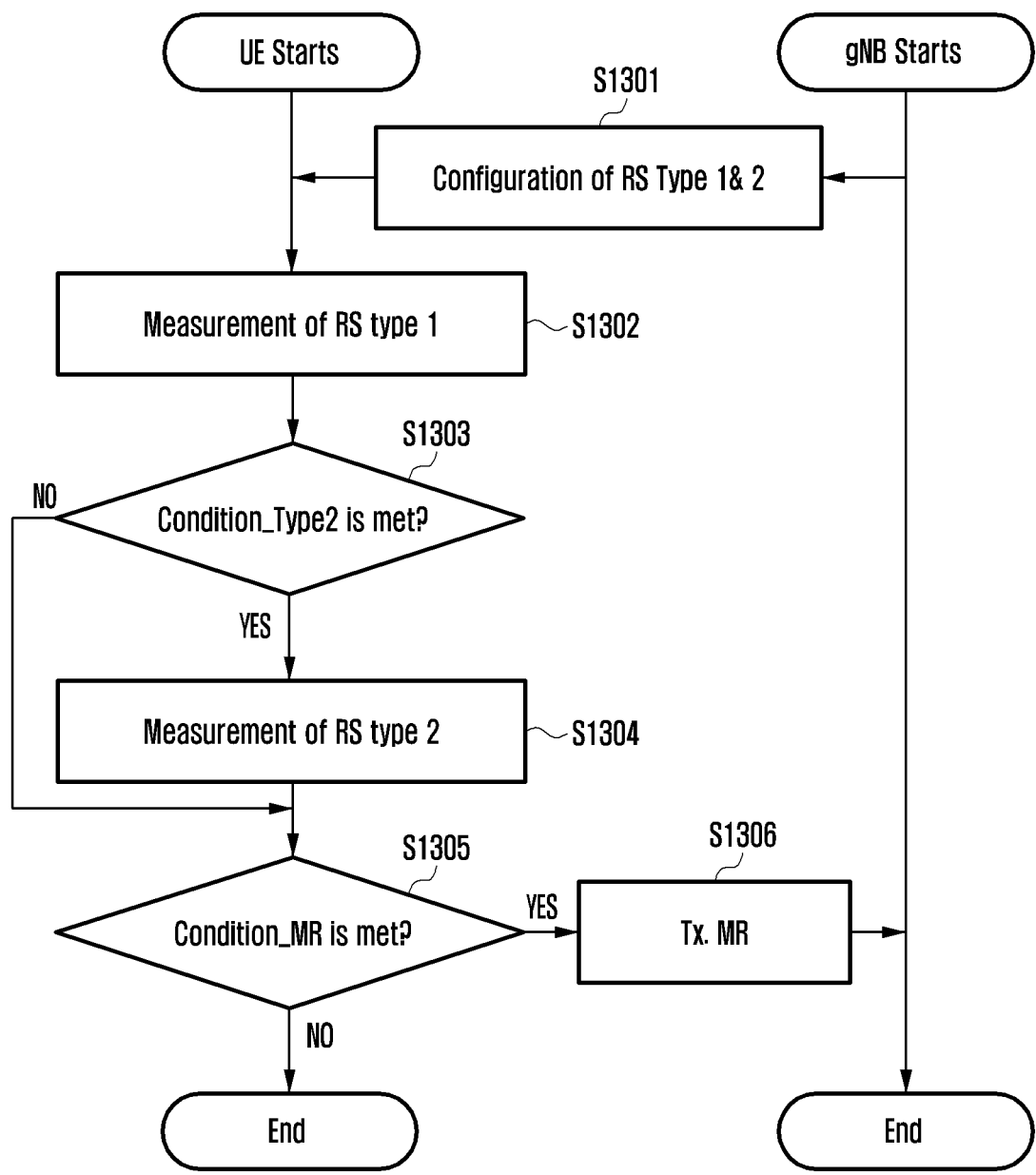
FIG. 13 is a flowchart illustrating an embodiment related to a case where a serving base station configures information on different RSs to a terminal according to an embodiment of the disclosure.

FIG. 13 illustrating an embodiment related to a case where a serving base station configures information on different RSs to a terminal according to an embodiment of the disclosure.

Referring to FIG. 13, a serving base station configures information on different RSs to a terminal at operation S1301. The terminal having been configured the information on the different RSs continuously performs measurement with respect to a serving cell and adjacent cells basically for one RS at operation S1302 (RS Type 1, i.e., synchronization signal), and if a certain condition (Condition_Type2) is satisfied at operation S1303, the terminal additionally performs measurement of different kinds of RS Type2 at operation S1304.

As can be seen from FIG. 13, the serving base station may configure different RS information to the terminal for the purpose of measurement, and may also configure a certain condition (Condition_Type2) for performing measurement of the different kinds of RSs. In addition, the condition for sending a measurement report (hereinafter, MR) can also be configured. The Condition_Type2 may be the same as or different from the Condition_MR, and the detailed condition for this may be transmitted using the type of the existing LTE A1 to A6.

The measurement configuration for the RS Type 2 (i.e., CSI-RS) may notify the terminal that the Condition_Type2 is included through inclusion of a certain indication (i.e., indication_condition_Type2), and if such indication and condition are included, the terminal may measure the corresponding RS if the condition is satisfied.

Further, in an embodiment of the disclosure, if there is no Condition_Type2, and a measurement report triggering event for the corresponding RS is not specially specified although the measurement configuration for the RS Type2 (i.e., CSI-RS) has been made, the terminal may perform the measurement of the RS Type 2 if a certain condition (Condition_Type2) is satisfied according to the condition of the terminal itself.

The terminal attempts measurement of the different RSs as configured, observes the condition to transmit the measurement report as configured based on the measurement result at operation S1305, and reports the measurement result if the condition is satisfied at operation S1306.

The measurement report or RS Type2 configuration request message may include the measurement result for the configured RS, and the corresponding measurement result is managed by a measurement object ID, and both the base station and the terminal can recognize what RS the measurement result is for through the corresponding ID.

If one or plural other RSs being in QCL correlations with the corresponding RS (e.g., NR-SS) exist, the base station may configure the corresponding RSs to the terminal as RS Type2, and may request the measurement.

Figure 14:
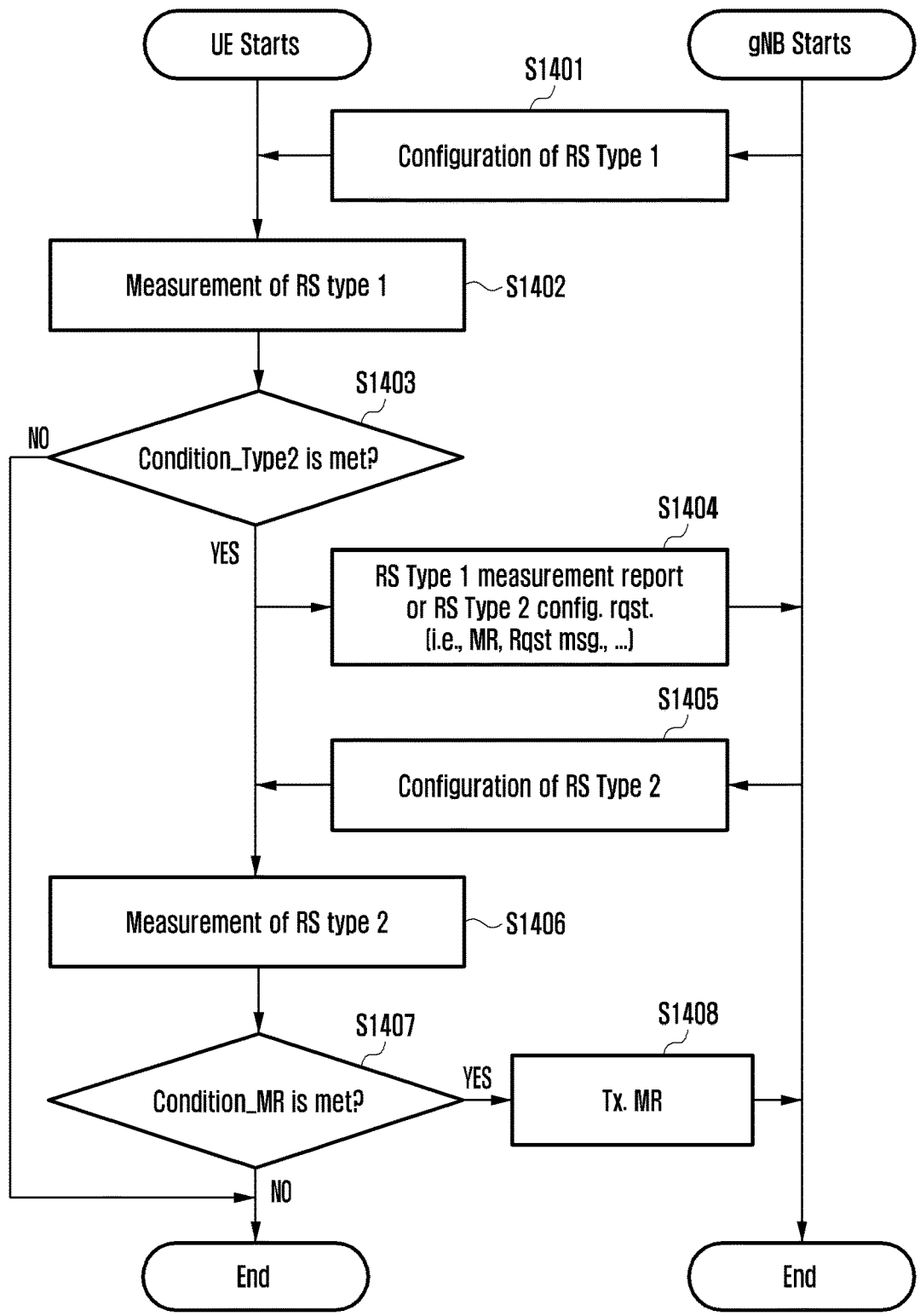
FIG. 14 is a flowchart illustrating an embodiment related to a case where a serving base station configures information on RS Type 1 to a terminal according to an embodiment of the disclosure.

FIG. 14 is a flowchart illustrating an embodiment related to a case where a serving base station configures information on RS Type 1 to a terminal according to an embodiment of the disclosure.

Referring to FIG. 14, a serving base station configures information on RS Type 1 to a terminal at operation S1401. The terminal having been configured the information on the RS Type 1 continuously performs measurement with respect to a serving cell and adjacent cells basically for the corresponding RS at operation S1402 (RS Type 1, i.e., synchronization signal), and if a certain condition (Condition_Type2) is satisfied at operation S1403, the terminal performs uplink transmission including RS Type1 measurement result report or RS Type2 configuration request at operation S1404.

The measurement report or RS Type2 configuration request message may include the measurement result for the configured RS, the corresponding measurement result is managed by a measurement object ID, and both the base station and the terminal can recognize what RS the measurement result is for through the corresponding IE.

If one or plural other RSs (e.g., CSI-RS) being in QCL correlations with the corresponding RS (e.g., NR-SS) exist, the base station may configure the corresponding RSs to the terminal as RS Type2, and may request the measurement.

As can be seen from FIG. 14, the serving base station may configure a certain condition (Condition_Type2) to the terminal with respect to the measurement result of a specific RS (Type1, i.e., synchronization signal) for the purpose of configuring a certain RS (Type2, i.e., CSI-RS) to the corresponding terminal at operation S1405. In addition, the condition for sending a measurement report (hereinafter, MR) can also be configured. The Condition_Type2 may be the same as or different from the Condition_MR, and the detailed condition for this may be transmitted using the type of the existing LTE A1 to A6.

If the Condition_Type2 is satisfied, the terminal may send a measurement report for RS Type1 (RRC/MAC/PHY message), or may transmit a configuration request message for RS Type2 (RRC/MAC/PHY message). The serving base station having received the report or request message from the terminal, if possible, may configure RS Type2 to the corresponding terminal, so that the terminal can perform the measurement or report with respect to the corresponding RS.

Further, in an embodiment of the disclosure, if there is no Condition_Type2, and a measurement configuration for RS Type2 (i.e., CSI-RS) has not been made, the terminal may request configuration of RS Type2 if a certain condition (Condition_Type2) is satisfied in accordance with the condition of the terminal itself in a certain case where a performance gain is expected.

The RS Type 2 may include adjacent cell information or only serving cell information.

The terminal attempts measurement of the different RSs as configured at operation S1406, observes the condition to transmit the measurement report as configured based on the measurement result at operation S1407, and reports the measurement result if the condition is satisfied at operation S1408.

Figure 15:
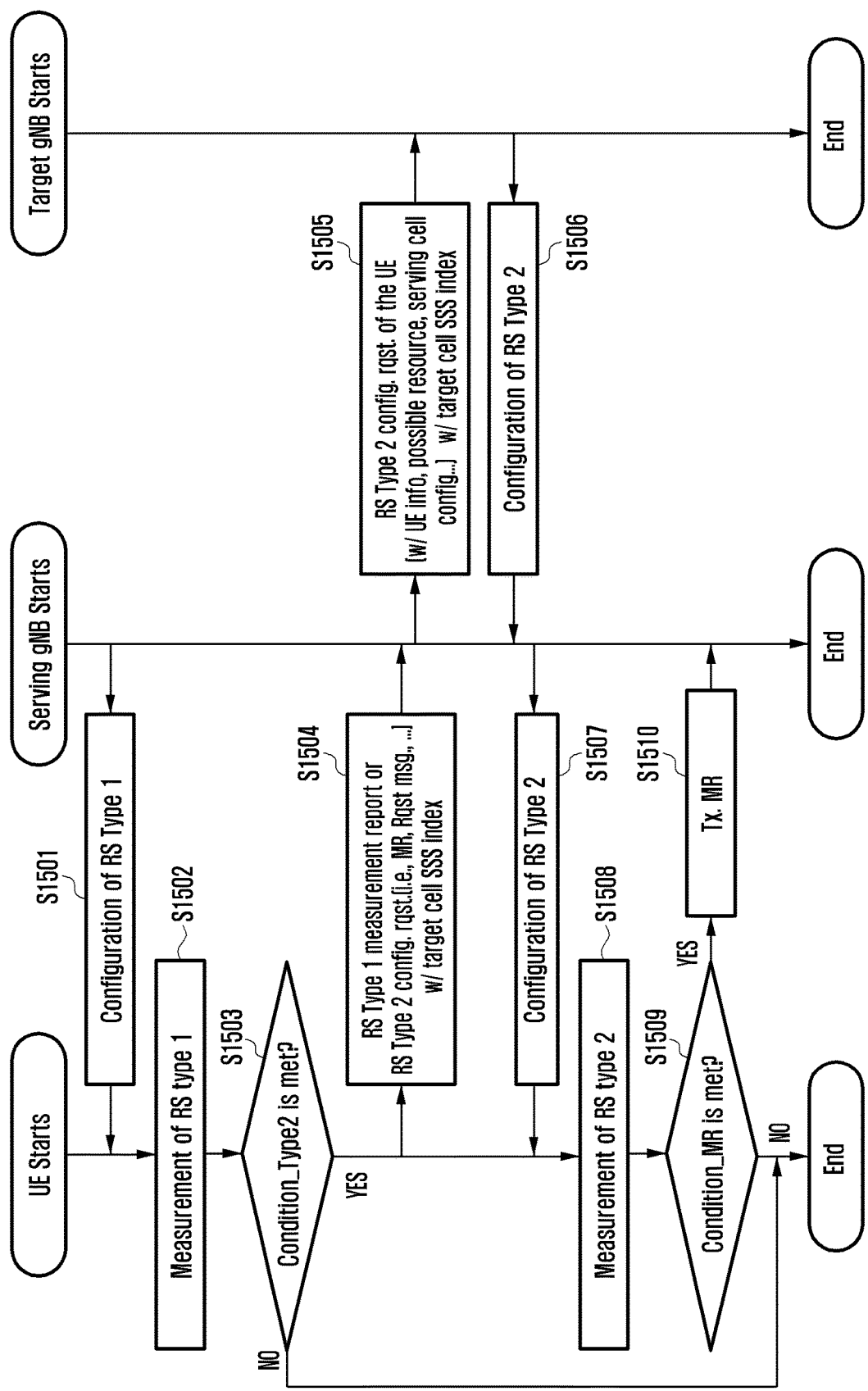
FIG. 15 is a flowchart illustrating an embodiment related to a case where a serving base station configures information on RS Type 1 to a terminal according to an embodiment of the disclosure.

FIG. 15 is a flowchart illustrating an embodiment related to a case where a serving base station configures information on RS Type 1 to a terminal according to an embodiment of the disclosure.

Referring to FIG. 15, a serving base station configures information on RS Type 1 to a terminal at operation S1501. The terminal having been configured the information on the RS Type 1 continuously performs measurement with respect to a serving cell and adjacent cells basically for the corresponding RS (RS Type 1, i.e., synchronization signal) at operation S1502, and if a certain condition (Condition_Type2) is satisfied at operation S1503, the terminal directly performs uplink transmission including RS Type 1 measurement result report or RS Type2 configuration request at operation S1504.

As can be seen from FIG. 15, the serving base station may configure a certain condition (Condition_Type2) to the terminal with respect to the measurement result of a specific RS (Type1, i.e., synchronization signal) for the purpose of configuring a certain RS (Type2, i.e., CSI-RS) to the corresponding terminal. In addition, the condition for sending a measurement report (hereinafter, MR) can also be configured. The Condition_Type2 may be the same as or different from the Condition_MR, and the detailed condition for this may be transmitted using the type of the existing LTE A1 to A6.

If the Condition_Type2 is satisfied, the terminal may send a measurement report for RS Type1 (RRC/MAC/PHY message), or may transmit a configuration request message for RS Type2 (RRC/MAC/PHY message).

The measurement report or RS Type2 configuration request message may include the measurement result for the configured RS, and the corresponding measurement result is managed by a measurement object ID, and both the base station and the terminal can recognize what RS the measurement result is for through the corresponding ID.

If one or plural other RSs (e.g., CSI-RS) being in QCL correlations with the corresponding RS (e.g., NR-SS) exist, the base station may configure the corresponding RSs to the terminal as RS Type2, and may request the measurement.

The serving base station having received the report or request message from the terminal, if possible, may configure RS Type2 to the corresponding terminal, so that the terminal can perform the measurement or report with respect to the corresponding RS.

Further, in an embodiment of the disclosure, if there is no Condition_Type2, and a measurement configuration for RS Type2 (i.e., CSI-RS) has not been made, the terminal may request configuration of RS Type2 if a certain condition (Condition_Type2) is satisfied in accordance with the condition of the terminal itself in a certain case where a performance gain is expected.

The measurement report or RS Type2 configuration request message may include the measurement result for the configured RS, and the corresponding measurement result is managed by a measurement object ID, and both the base station and the terminal can recognize what RS the measurement result is for through the corresponding ID.

If one or plural other RSs (e.g., CSI-RS) being in QCL correlations with the corresponding RS (e.g., NR-SS) exist, the base station may configure the corresponding RSs to the terminal as RS Type2, and may request the measurement.

If it is necessary to also configure RS Type 2 of an adjacent specific base station (or base stations) to the corresponding terminal, the serving base station having received an uplink signal transmission from the terminal as the result according to the configured condition Condition_Type2 may request adjacent base stations to configure RS Type 2 to the corresponding terminal directly (through X2 interference, Internet, or certain wired backhaul link) at operation S1505. The RS Type 2 configuration request signal transmitted from the serving base station to the adjacent base station may include resource information capable of configuring the corresponding RS Type 2 (frequency, time, antenna, beam information, and offset), terminal information (terminal ID, terminal use frequency, time, antenna, beam information, and offset), and serving cell information (serving cell ID, use frequency, time, antenna, beam information, and offset).

At operation S1505, the adjacent target base station requested from the serving base station to configure the corresponding RS Type 2, if possible, may configure the corresponding RS to the corresponding terminal, and may transfer the corresponding configuration information to the serving base station at operation S1506. The configuration information may include resource information capable of configuring the corresponding RS Type 2 (frequency, time, antenna, beam information, and offset), terminal information (terminal ID, terminal use frequency, time, antenna, beam information, and offset), and configuration target cell information (cell ID, use frequency, time, antenna, beam information, and offset).

The serving base station having received the configuration information of the corresponding RS Type 2 from the target base station may configure RS Type 2 of the serving base station and the target base station to the terminal at operation S1507.

As configured, the terminal attempts measurement of different RSs of different cells at operation S1508, observes the condition to transmit the measurement report as configured based on the measurement result at operation S1509, and reports the measurement result if the condition is satisfied at operation S1510.

Figure 16:
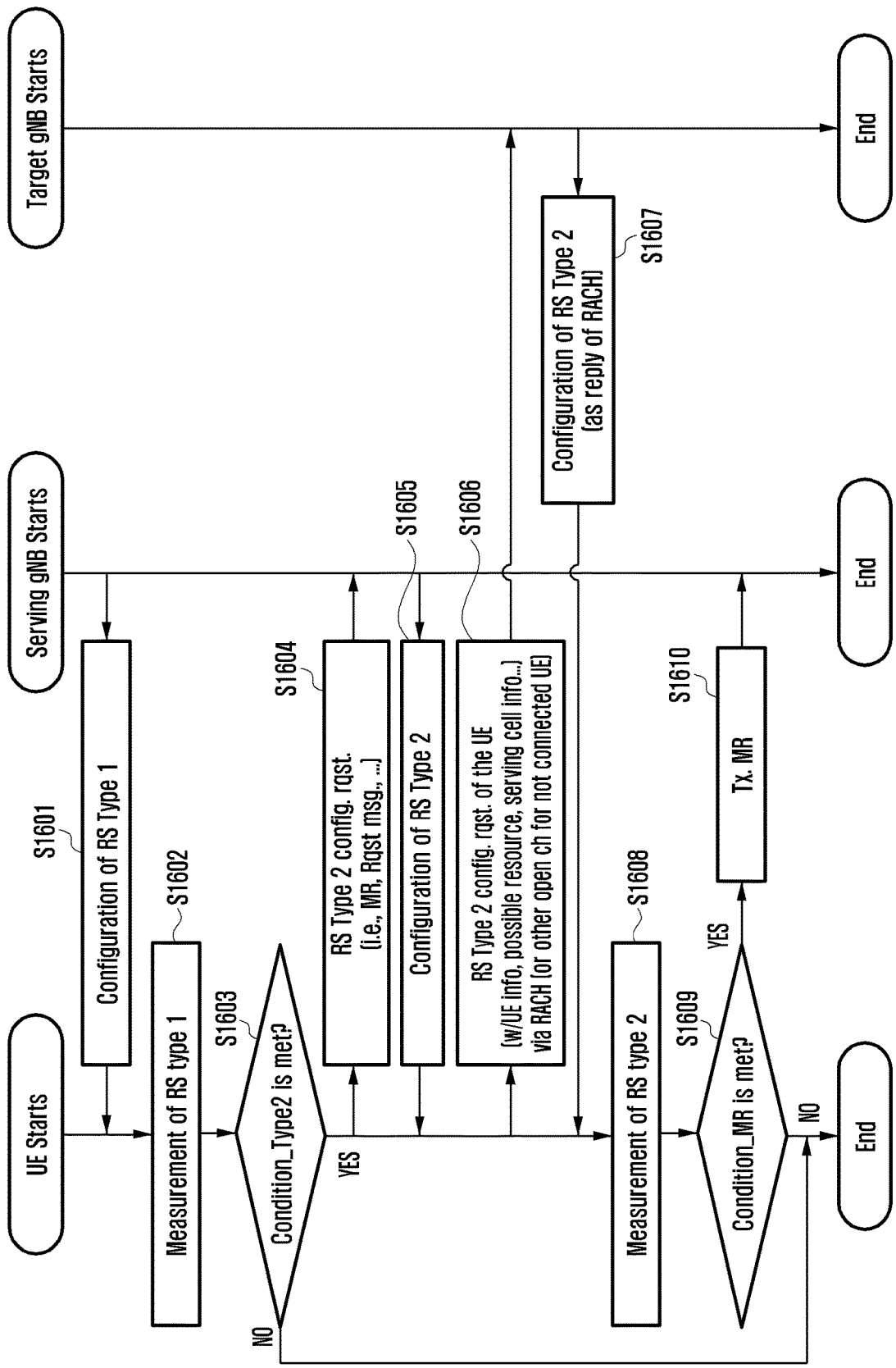
FIG. 16 is a flowchart illustrating an embodiment related to a case where a serving base station configures information on RS Type 1 to a terminal according to an embodiment of the disclosure.

FIG. 16 is a flowchart illustrating an embodiment related to a case where a serving base station configures information on RS Type 1 to a terminal according to an embodiment of the disclosure.

Referring to FIG. 16, a serving base station configures information on RS Type 1 to a terminal at operation S1601. The terminal having been configured the information on the RS Type 1 continuously performs measurement with respect to a serving cell and adjacent cells basically for the corresponding RS (RS Type 1, i.e., synchronization signal) at operation S1602, and if a certain condition (Condition_Type2) is satisfied at operation S1603, the terminal performs uplink transmission including RS Type2 configuration request with respect to the serving cell and target base stations at operation S1604.

As can be seen from FIG. 16, the serving base station may configure a certain condition (Condition_Type2) to the terminal with respect to the measurement result of a specific RS (Type1, i.e., synchronization signal) for the purpose of configuring a certain RS (Type2, i.e., CSI-RS) to the corresponding terminal at operation S1605. In addition, the condition for sending a measurement report (hereinafter, MR) can also be configured at operation S1606. The Condition_Type2 may be the same as or different from the Condition_MR, and the detailed condition for this may be transmitted using the type of the existing LTE A1 to A6.

If the Condition_Type2 is satisfied, the terminal may send a measurement report for RS Type1 (RRC/MAC/PHY message), or may transmit a configuration request message for RS Type2 (RRC/MAC/PHY message). The serving base station having received the report or the request message from the terminal, if possible, may configure RS Type2 to the corresponding terminal, so that the terminal can perform the measurement or report with respect to the corresponding RS.

Further, in an embodiment of the disclosure, if there is no Condition_Type2, and a measurement configuration for RS Type2 (i.e., CSI-RS) has not been made, the terminal may request configuration of RS Type2 if a certain condition (Condition_Type2) is satisfied in accordance with the condition of the terminal itself in a certain case where a performance gain is expected.

If it is necessary to also configure RS Type 2 of an adjacent specific base station (or base stations) to the corresponding terminal, the serving base station having received an uplink signal transmission from the terminal as the result according to the configured condition Condition_Type2 may request adjacent base stations to configure RS Type 2 to the corresponding terminal directly (through X2 interference, Internet, or certain wired backhaul link). The RS Type 2 configuration request signal transmitted from the serving base station to the adjacent base station may include resource information capable of configuring the corresponding RS Type 2 (frequency, time, antenna, beam information, and offset), terminal information (terminal ID, terminal use frequency, time, antenna, beam information, and offset), and serving cell information (serving cell ID, use frequency, time, antenna, beam information, and offset).

Further, if it is necessary to also configure the RS Type 2 of the adjacent specific base station (or base stations) to the corresponding terminal, the adjacent base station having received an uplink signal transmission from the terminal as the result according to the configured condition Condition_Type2 may transfer the corresponding configuration information, which may include resource information capable of configuring the corresponding RS Type 2 (frequency, time, antenna, beam information, and offset), terminal information (terminal ID, terminal use frequency, time, antenna, beam information, and offset), and serving cell information (serving cell ID, use frequency, time, antenna, beam information, and offset) through downlink transmission (Msg2 or Msg4) that the corresponding base station can transmit in a procedure of transmitting a RACH transmitted by the corresponding terminal or using other downlink resources that can be transmitted to the corresponding terminal at operation S1607.

The serving base station having received the configuration information of the corresponding RS Type 2 from the target base station may configure RS Type 2 of the serving base station and the target base station to the terminal.

As configured, the terminal attempts measurement of different RSs of different cells at operation S1608, observes the condition to transmit the measurement report as configured based on the measurement result at operation S1609, and reports the measurement result if the condition is satisfied at operation S1610.

Figure 17:
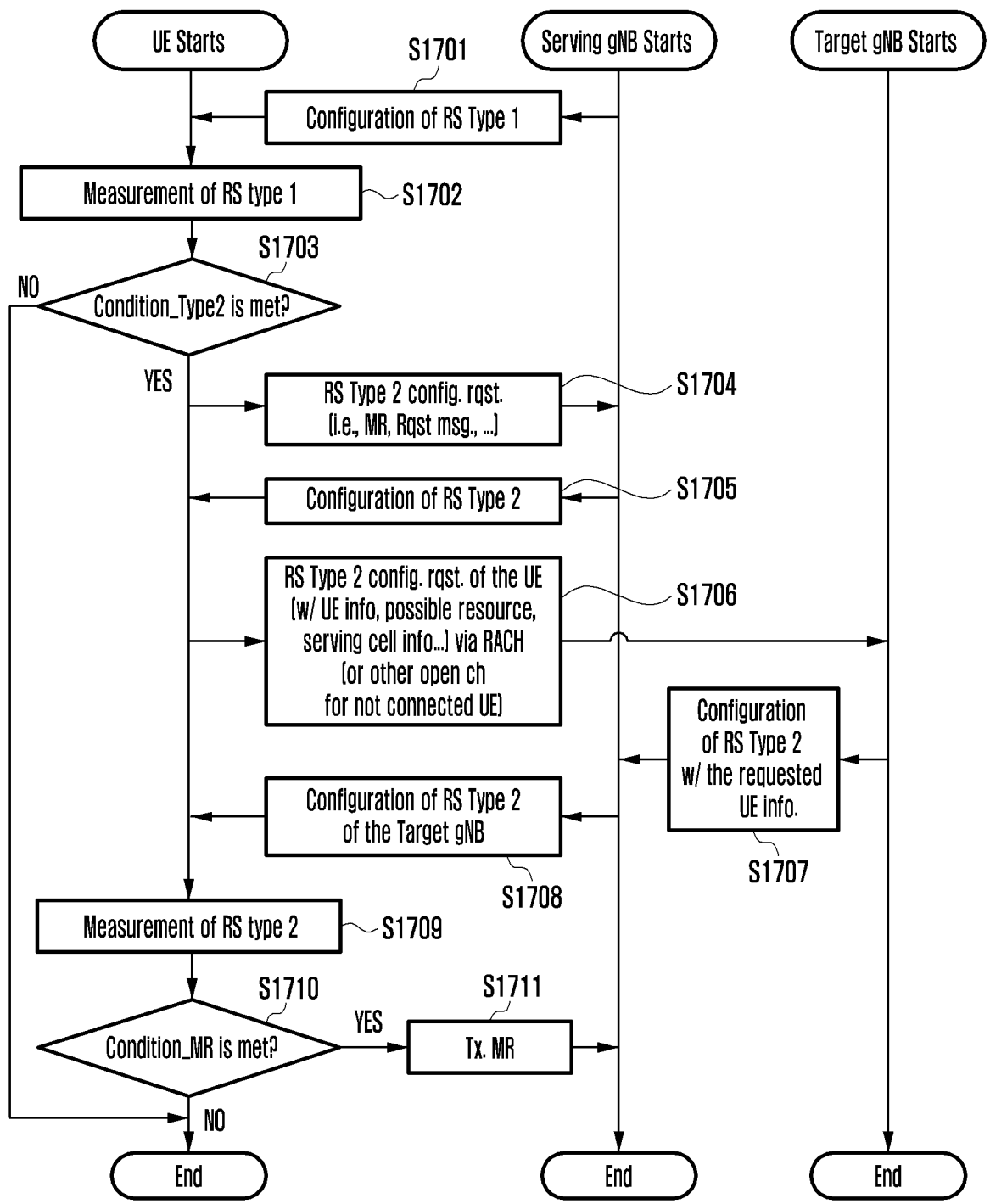
FIG. 17 is a flowchart illustrating an embodiment related to a case where a serving base station configures information on RS Type 1 to a terminal according to an embodiment of the disclosure.

FIG. 17 is a flowchart illustrating an embodiment related to a case where a serving base station configures information on RS Type 1 to a terminal according to an embodiment of the disclosure.

Referring to FIG. 17, a serving base station configures information on RS Type 1 to a terminal at operation S1701. The terminal having been configured the information on the RS Type 1 continuously performs measurement with respect to a serving cell and adjacent cells basically for the corresponding RS (RS Type 1, i.e., synchronization signal) at operation S1702, and if a certain condition (Condition_Type2) is satisfied at operation S1703, the terminal performs uplink transmission including RS Type2 configuration request with respect to the serving cell and target base stations at operation S1704.

As can be seen from FIG. 17, the serving base station may configure a certain condition (Condition_Type2) to the terminal with respect to the measurement result of a specific RS (Type1, i.e., synchronization signal) for the purpose of configuring a certain RS (Type2, i.e., CSI-RS) to the corresponding terminal at operation S1705. In addition, the condition for sending a measurement report (hereinafter, MR) can also be configured. The Condition_Type2 may be the same as or different from the Condition_MR, and the detailed condition for this may be transmitted using the type of the existing LTE A1 to A6.

If the Condition_Type2 is satisfied, the terminal may send a measurement report for RS Type1 (RRC/MAC/PHY message), or may transmit a configuration request message for RS Type2 (RRC/MAC/PHY message). The serving or a certain adjacent base station having received the report or the request message from the terminal, if possible, may configure RS Type2 to the corresponding terminal, so that the terminal can perform the measurement or report with respect to the corresponding RS.

Here, the terminal may send the measurement report for the RS Type1 (RRC/MAC/PHY message), or may transmit the configuration request message for the RS Type2 (RRC/MAC/PHY message). Further, the terminal may transmit RS Type 2 configuration request message including pre-configured RS measurement information received and measured from the adjacent base station, for example, SS beam/block/burst/burst set ID. The RS Type 2 request information transmitted from the terminal to the adjacent base station at operation S1706 may be transmitted using a random-access procedure, and if a certain uplink channel that can be transmitted by a terminal of a certain adjacent network is defined, it may be transmitted using the defined uplink channel.

Further, in an embodiment of the disclosure, if there is no Condition_Type2, and a measurement configuration for RS Type2 (i.e., CSI-RS) has not been made, the terminal may transmit the measurement report or RS Type2 configuration request to the serving base station or the adjacent base station if a certain condition (Condition_Type2) is satisfied in accordance with the condition of the terminal itself in a certain case where a performance gain is expected.

If it is necessary to also configure RS Type 2 of an adjacent specific base station (or base stations) to the corresponding terminal, the serving base station having received an uplink signal transmission from the terminal as the result according to the configured condition Condition_Type2 may request adjacent base stations to configure RS Type 2 to the corresponding terminal directly (through X2 interference, Internet, or certain wired backhaul link). The RS Type 2 configuration request signal transmitted from the serving base station to the adjacent base station may include resource information capable of configuring the corresponding RS Type 2 (frequency, time, antenna, beam information, and offset), terminal information (terminal ID, terminal use frequency, time, antenna, beam information, and offset), and serving cell information (serving cell ID, use frequency, time, antenna, beam information, and offset).

Further, if it is necessary to also configure the RS Type 2 of the adjacent specific base station (or base stations) to the corresponding terminal, the adjacent base station having received an uplink signal transmission from the terminal as the result according to the configured condition Condition_Type2 may provide the RS Type 2 configuration to the serving base station to which the corresponding terminal belongs directly (through X2 interface, Internet, or certain wired backhaul link). The RS Type 2 configuration request signal transmitted from the serving base station to the adjacent base station may include resource information capable of configuring the corresponding RS Type 2 (frequency, time, antenna, beam information, and offset), terminal information (terminal ID, terminal use frequency, time, antenna, beam information, and offset), and serving cell information (serving cell ID, use frequency, time, antenna, beam information, and offset).

Further, if it is necessary to also configure the RS Type 2 of the adjacent specific base station (or base stations) to the corresponding terminal, the adjacent base station having received an uplink signal transmission from the terminal as the result according to the configured condition Condition_Type2 may provide the RS Type 2 configuration to the serving base station to which the corresponding terminal belongs directly (through X2 interface, Internet, or certain wired backhaul link). The RS Type 2 configuration request signal transmitted from the adjacent base station to the serving base station may include resource information capable of configuring the corresponding RS Type 2 (frequency, time, antenna, beam information, and offset), terminal information (terminal ID, terminal use frequency, time, antenna, beam information, and offset), and serving cell information (serving cell ID, use frequency, time, antenna, beam information, and offset).

If possible, the adjacent target base station having been requested the corresponding RS Type 2 configuration from the serving base station may configure the corresponding RS to the corresponding terminal, and may transfer the corresponding configuration information to the serving base station at operation S1707. The configuration information to be transmitted may include resource information capable of configuring the corresponding RS Type 2 (frequency, time, antenna, beam information, and offset), terminal information (terminal ID, terminal use frequency, time, antenna, beam information, and offset), and configured target cell information (serving cell ID, use frequency, time, antenna, beam information, and offset).

The serving base station having received the configuration information of the corresponding RS Type 2 from the target base station may configure RS Type 2 of the serving base station and the target base station to the terminal at operation S1708.

As configured, the terminal attempts measurement of different RSs of different cells at operation S1709, observes the condition to transmit the measurement report as configured based on the measurement result at operation S1710, and reports the measurement result if the condition is satisfied at operation S1711.

Different CSI-RSs having the same or different characteristics, resources, beams, and purposes may be configured to a user.

Measurement Report Triggering Events Using Measurement Values of Different RSs

| event NR1 |
| --- |
| Event Description |
| NR1 Serving becomes better than threshold<br>(Entering condition)<br>NR1-1-1) Ms(IDLE mode RS) − Hys1 > Threshold1<br>NR1-1-2) Ms(Additional RS) − Hys2 > Threshold2<br>NR1-1-3) (Ms(IDLE mode RS) − Hys1 > Threshold1)<br>   && (Ms(Additional RS) − Hys2 > Threshold2)<br>NR1-1-4) MS(IDLE mode RS) + Ms(Additional RS) − Hys3 > Threshold3<br>(Leaving condition)<br>NR1-2-1) Ms(IDLE mode RS) + Hys1 < Threshold1<br>NR1-2-2) Ms(Additional RS) + Hys2 < Threshold2<br>NR1-2-3) (Ms(IDLE mode RS) + Hys1 < Threshold1)<br>   && (Ms(Additional RS) + Hys2 < Threshold2)<br>NR1-2-4) Ms(IDLE mode RS) + Ms(Additional RS) + Hys3 < Threshold3<br># Ms(IDLE mode RS) is the measurement result of the serving cell derived from IDLE mode RS, not taking into account any offsets,<br># Ms(Additional RS) is the measurement result of the serving cell derived from additional RS, not taking into account any offsets,<br># Hys1, Hys2, and Hys3 are the hysteresis parameter for this event (i.e. hysteresis as defined within reportConfigEUTRA for this event),<br># Threshold1, Threshold2, and Threshold3 are the threshold parameter for this event (i.e. a1-Threshold1, a1-Threshold2, and a1-Threshold3 as defined within reportConfigEUTRA for this event).<br># Ms(IDLE mode RS) is expressed in dBm in case of RSRP, or in dB in case of RSRQ and RS-SINR,<br># Ms(Additional RS) is expressed in dBm in case of RSRP, or in dB in case of RSRQ and RS-SINR,<br># Hys1, Hys2, and Hys3 are expressed in dB,<br># Threshold1, Threshold2, and Threshold3 are expressed in the same unit as Ms. |

| event NR2 |
| --- |
| NR2 Serving becomes worse than threshold<br>(Entering condition)<br>NR2-1-1) Ms(IDLE mode RS) + Hys1 < Threshold1<br>NR2-1-2) Ms(Additional RS) + Hys2 < Threshold2<br>NR2-1-3) (Ms(IDLE mode RS) + Hys1 < Threshold1)<br>   && (Ms(Additional RS) + Hys2 < Threshold2)<br>NR2-1-4) Ms(IDLE mode RS) + Ms(Additional RS) + Hys3 < Threshold3<br>(Leaving condition)<br>NR2-2-1) Ms(IDLE mode RS) − Hys1 > Threshold1 |

| event NR2 |
| --- |
| NR2-2-2) Ms(Additional RS) − Hys2 > Threshold2<br>NR2-2-3) (Ms(IDLE mode RS) − Hys1 > Threshold1)<br>    && (Ms(Additional RS) − Hys2 > Threshold2)<br>NR2-2-4) Ms(IDLE mode RS) + Ms(Additional RS) − Hys3 > Threshold3<br># Ms(IDLE mode RS) is the measurement result of the serving cell derived from IDLE mode RS, not taking into account any offsets,<br># Ms(Additional RS) is the measurement result of the serving cell derived from additional RS, not taking into account any offsets,<br># Hys1, Hys2, and Hys3 are the hysteresis parameter for this event (i.e. hysteresis as defined within reportConfigEUTRA for this event),<br># Threshold1, Threshold2, and Threshold3 are the threshold parameter for this event (i.e. a1-Threshold1, a1-Threshold2, and a1-Threshold3 as defined within reportConfigEUTRA for this event).<br># Ms(IDLE mode RS) is expressed in dBm in case of RSRP, or in dB in case of RSRQ and RS-SINR,<br># Ms(Additional RS) is expressed in dBm in case of RSRP, or in dB in case of RSRQ and RS-SINR,<br># Hys1, Hys2, and Hys3 are expressed in dB,<br># Threshold1, Threshold2, and Threshold3 are expressed in the same unit as Ms. |

Tables below are to explain a description based on event (NR3).

| event NR3 |
| --- |
| NR3 Neighbour becomes offset better than PCell/ PSCell<br>(Entering condition)<br>NR3-1-1) Mn(IDLE mode RS) + Ofn1 + Ocn1 − Hys1 > Mp(IDLE mode RS) + Ofp1 + Ocp1 + Off1<br>NR3-1-2) Mn(Additional RS) + Ofn2 + Ocn2 − Hys2 > Mp(Additional RS) + Ofp2 + Ocp2 + Off2<br>NR3-1-3) (Mn(IDLE mode RS) + Ofn1 + Ocn1 − Hys1 > Mp(IDLE mode RS) + Ofp1 + Ocp1 + Off1)<br>    && (Mn(Additional RS) + Ofn2 + Ocn2 − Hys2 > Mp(Additional RS) + Ofp2 + Ocp2 + Off2)<br>NR3-1-4) Mn(IDLE mode RS) + Mn(Additional RS) + Ofn3 + Ocn3 − Hys3 > Mp(IDLE mode RS) + Mp(Additional RS) + Ofp3 + Ocp3 + Off3<br>(Leaving condition)<br>NR3-2-1) Mn(IDLE mode RS) + Ofn1 + Ocn1 + Hys1 < Mp(IDLE mode RS) + Ofp1 + Ocp1 + Off1<br>NR3-2-2) Mn(Additional RS) + Ofn2 + Ocn2 + Hys2 < Mp(Additional RS) + Ofp2 + Ocp2 + Off2<br>NR3-2-3) (Mn(IDLE mode RS) + Ofn1 + Ocn1 + Hys1 < Mp(IDLE mode RS) + Ofp1 + Ocp1 + Off1)<br>    && (Mn(Additional RS) + Ofn2 + Ocn2 + Hys2 < Mp(Additional RS) + Ofp2 + Ocp2 + Off2)<br>NR3-2-4) Mn(IDLE mode RS) + Mn(Additional RS) + Ofn3 + Ocn3 + Hys3 < Mp(IDLE mode RS) + Mp(Additional RS) + Ofp3 + Ocp3 + Off3<br># Mn(IDLE mode RS) is the measurement result of the neighbour cell derived from IDLE mode RS, not taking into account any offsets,<br># Mn(Additional RS) is the measurement result of the neighbour cell derived from additional RS, not taking into account any offsets,<br># Mp(IDLE mode RS) is the measurement result of the PCell/ PSCell derived from IDLE mode RS, not taking into account any offsets,<br># Mp(Additional RS) is the measurement result of the PCell/ PSCell derived from additional RS, not taking into account any offsets.<br># Hys1, Hys2, and Hys3 are the hysteresis parameter for this event (i.e. hysteresis as defined within reportConfigEUTRA for this event),<br># Ofn1, Ofn2, and Ofn3 are the frequency specific offset of the frequency of the neighbour cell (i.e. offsetFreq as defined within measObjectEUTRA corresponding to the frequency of the neighbour cell).<br># Ocn1, Ocn2, and Ocn3 are the cell specific offset of the neighbour cell (i.e. cellIndividualOffset as defined within measObjectEUTRA corresponding to the frequency of the neighbour cell), and set to zero if not configured for the neighbour cell.<br># Ofp1, Ofp2, and Ofp3 are the frequency specific offset of the frequency of the PCell/ PSCell (i.e. offsetFreq as defined within measObjectEUTRA corresponding to the frequency of the PCell/ PSCell).<br>#Ocp1, Ocp2, and Ocp3 are the cell specific offset of the PCell/ PSCell (i.e. cellIndividualOffset as defined within measObjectEUTRA corresponding to the frequency of the PCell/ PSCell), and is set to zero if not configured for the PCell/ PSCell. |

-continued

| event NR3 |
|---|
| #Off1, Off2, and Off3 are the offset parameter for this event (i.e. a3-Offset as defined within reportConfigEUTRA for this event).<br># Mn( ) and Mp( ) are expressed in dBm in case of RSRP, or in dB in case of RSRQ and RS-SINR,<br># Hys1, Hys2, and Hys3 are expressed in dB,<br># Ofn, Ocn, Ofp, Ocp, Off are expressed in dB. |

Tables below are to explain a description based on event (NR4).

| event NR4 |
|---|
| NR4 Neighbour becomes better than threshold<br>(Entering condition)<br>NR4-1-1) Mn(IDLE mode RS) + Ofn1 + Ocn1 − Hys1 > Threshold1<br>NR4-1-2) Mn(Additional RS) + Ofn2 + Ocn1 − Hys2 > Threshold2<br>MR4-1-3) (Mn(IDLE mode RS) + Ofn1 + Ocn1 − Hys1 > Threshold1)<br>    && (Mn(Additional RS) + Ofn2 + Ocn2 − Hys2 > Threshold2)<br>NR4-1-4) Mn(IDLE mode RS) + Mn(Additional RS) + Ofn3 + Ocn3 − Hys3 > Threshold3<br>(Leaving condition)<br>NR4-2-1) Mn(IDLE mode RS) + Ofn1 + Ocn1 + Hys1 < Threshold1<br>NR4-2-2) Mn(Additional RS) + Ofn2 + Ocn2 + Hys2 < Threshold2<br>NR4-2-3) (Mn(IDLE mode RS) + Ofn1 + Ocn1 + Hys1 < Threshold1)<br>    && (Mn(Additional RS) + Ofn2 + Ocn2 + Hys2 < Threshold2)<br>NR4-2-4) Mn(IDLE mode RS) + Mn(Additional RS) + Ofn3 + Ocn3 + Hys3 < Threshold3<br># Mn(IDLE mode RS) is the measurement result of the neighbour cell derived from IDLE mode RS, not taking into account any offsets.<br># Mn(Additional RS) is the measurement result of the neighbour cell derived from additional RS, not taking into account any offsets,<br># Hys1, Hys2, and Hys3 are the hysteresis parameter for this event (i.e. hysteresis as defined within reportConfigEUTRA for this event),<br># Ofn1, Ofn2, and Ofn3 are the frequency specific offset of the frequency of the neighbour cell (i.e. offsetFreq as defined within measObjectEUTRA corresponding to the frequency of the neighbour cell).<br># Ocn1, Ocn2 and Ocn3 are the cell specific offset of the neighbour cell (i.e. cellIndividualOffset as defined within measObjectEUTRA corresponding to the frequency of the neighbour cell), and set to zero if not configured for the neighbour cell.<br># Threshold1, Threshold2, and Threshold3 are the threshold parameter for this event (i.e. a1-Threshold1, a1-Threshold2, and a1-Threshold3 as defined within reportConfigEUTRA for this event).<br># Mn( ) are expressed in dBm in case of RSRP, or in dB in case of RSRQ and RS-SINR,<br># Hys1, Hys2, and Hys3 are expressed in dB,<br># Ofn, Ocn, Ofp, Ocp, Off are expressed in dB.<br># Threshold1, Threshold2, and Threshold3 are expressed in the same unit as Mn( ) |

Tables below are to explain a description based on event (NR5).

| event NR5 |
|---|
| NR5 PCell/ PSCell becomes worse than thresholdA and neighbour becomes better than thresholdB<br>  1 > consider the entering condition for this event to be satisfied when both condition 5-1-X and condition 5-2-X, as specified below, are fulfilled;<br>  1 > consider the leaving condition for this event to be satisfied when condition 5-3-X or condition 5-4-X, i.e. at least one of the two, as specified below, is fulfilled;<br>(Entering condition 1)<br>NR5-1-1) Mp(IDLE mode RS) + HysA1 < ThresholdA1<br>NR5-1-2) Mp(Additional RS) + HysA2 < ThresholdA2<br>NR5-1-3) (Mp(IDLE mode RS) + HysA1 < ThresholdA1)<br>    && (Mp(Additional RS) + HysA2 < ThresholdA2)<br>NR5-1-4) Mp(IDLE mode RS) + Mp(Additional RS) + HysA3 < ThresholdA3<br>(Entering condition 2)<br>NR5-2-1) Mn(IDLE mode RS) + Ofn1 + Ocn1 − HysB1 > ThresholdB1<br>NR5-2-2) Mn(Additional RS) + Ofn2 + Ocn2 − HysB2 > ThresholdB2 |

| event NR5 |
| --- |
| NR5-2-3) (Mn(IDLE mode RS) + Ofn1 + Ocn1 − HysB1 > ThresholdB1)<br>    && (Mn(Additional RS) + Ofn2 + Ocn2 − HysB2 > ThresholdB2)<br>NR5-2-4) Mn(IDLE mode RS) + Mn(Additional RS) + Ofn3 + Ocn3 − Hys3 > ThresholdB3<br>(Leaving condition 1)<br>NR5-3-1) Mp(IDLE mode RS) − HysA1 > ThresholdA1<br>NR5-3-2) Mp(Additional RS) − HysA2 > thresholdA2<br>NR5-3-3) (Mp(IDLE mode RS) − HysA1 > ThresholdA1)<br>    && Mp(Additional RS) − HysA2 > ThresholdA2)<br>NR5-3-4) Mp(IDLE mode RS) + Mp(Additional RS) − HysA3 > ThresholdA3<br>(Leaving condition 2)<br>NR5-4-1) Mn(IDLE mode RS) + Ofn1 + Ocn1 + HysB1 < ThresholdB1<br>NR5-4-2) Mn(Additional RS) + Ofn2 + Ocn2 + HysB2 < ThresholdB2<br>NR5-4-3) (Mn(IDLE mode RS) + Ofn1 + Ocn1 + HysB1 < ThresholdB1)<br>    && (Mn(Additional RS) + Ofn2 + Ocn2 + HysB2 < ThresholdB2)<br>NR5-4-4) Mn(IDLE mode RS) + Mn(Additional RS) + Ofn3 + Ocn3 + HysB3 < ThresholdB3<br># Mn(IDLE mode RS) is the measurement result of the neighbour cell derived from IDLE mode RS, not taking into account any offsets,<br># Mn(Additional RS) is the measurement result of the neighbour cell derived from additional RS, not taking into account any offsets,<br># Mp(IDLE mode RS) is the measurement result of the PCell/ PSCell derived from IDLE mode RS, not taking into account any offsets,<br># Mp(Additional RS) is the measurement result of the PCell/ PSCell derived from additional RS, not taking into account any offsets,<br># HysA1, HysA2, HysA3, HysB1, HysB2, and HysB3 are the hysteresis parameter for this event (i.e. hysteresis as defined within reportConfigEUTRA for this event),<br># Ofn1, Ofn2, and Ofn3 are the frequency specific offset of the frequency of the neighbour cell (i.e. offsetFreq as defined within measObjectEUTRA corresponding to the frequency of the neighbour cell).<br># Ocn1, Ocn2, and Ocn3 are the cell specific offset of the neighbour cell (i.e. cellIndividualOffset defined within measObjectEUTRA corresponding to the frequency of the neighbour cell), and set to zero if not configured for the neighbour cell.<br># Ofp1, Ofp2, and Ofp3 are the frequency specific offset of the frequency of the PCell/ PSCell (i.e. offsetFreq as defined within measObjectEUTRA corresponding to the frequency of the PCell/ PSCell).<br>#Ocp1, Ocp2, and Ocp3 are the cell specific offset of the PCell/ PSCell (i.e. cellIndividualOffset as defined within measObjectEUTRA corresponding to the frequency of the PCell/ PSCell), and is set to zero if not configured for the PCell/ PSCell.<br>#Off1, Off2, and Off3 are the offset parameter for this event (i.e. a3-Offset as defined within reportConfigEUTRA for this event).<br># Mn( ) and MP( ) are expressed in dBm in case of RSRP, or in dB in case of RSRQ and RS-SINR,<br># HysA1, HysA2, HysA3, HysB1, HysB2, and HysB3 are expressed in dB,<br># Ofn, Ocn, Ofp, Ocp, Off are expressed in dB. |

Tables below are to explain a description based on event (NR6).

| event NR6 |
| --- |
| NR6  Neighbour becomes offset better than SCell<br>    (Entering condition)<br>    NR3-1-1) Mn(IDLE mode RS) + Ocn1 − Hys1 > Ms(IDLE mode RS) + Ocs1 + Off1<br>    NR3-1-2) Mn(Additional RS) + Ocn2 − Hys2 > Ms(Additional RS) + Ocs2 + Off2<br>    NR3-1-3) (Mn(IDLE mode RS) + Ocn1 − Hys1 > Ms(IDLE mode RS) + Ocs1 + Off1)<br>        && (Mn(Additional RS) + Ocn2 − Hys2 > Ms(Additional RS) + Ocs2 + Off2)<br>    NR3-1-4) Mn(IDLE mode RS) + Mn(Additional RS) + Ocn3 − Hys3 > Ms(IDLE mode RS) + Ms(Additional RS) + Ocs3 + Off3<br>    (Leaving condition)<br>    NR3-2-1) Mn(IDLE mode RS) + Ocn1 + Hys1 < Ms(IDLE mode RS) + Ocs1 + Off1<br>    NR3-2-2) Mn(Additional RS) + Ocn2 + Hys2 < Ms(Additional RS) + Ocs2 + Off2<br>    NR3-2-3) Mn(IDLE mode RS) + Ocn1 + Hys1 < Ms(IDLE mode RS) + Ocs1 + Off1)<br>        && (Mn(Additional RS) + Ocn2 + Hys2 < Ms(Additional RS) + Ocs2 + Off2)<br>    NR3-2-4) Mn(IDLE mode RS) + Mn(Additional RS) + Ocn3 + Hys3 < Ms(IDLE mode RS) + Ms(Additional RS) + Ocs3 + Off3<br>    # Mn(IDLE mode RS) is the measurement result of the neighbour cell derived from IDLE mode RS, not taking into account any offsets,<br>    # Mn(Additional RS) is the measurement results of the neighbour cell derived from additional RS, not taking into account any offsets,<br>    # Ms(IDLE mode RS) is the measurement result of the serving cell derived from IDLE mode RS, not taking into account any offsets, |

| event NR6 |
| --- |
| # Ms(Additional RS) is the measurement result of the serving cell derived from additional RS, not taking into account any offsets,<br># Hys1, Hys2, and Hys3 are the hysteresis parameter for this event (i.e. hysteresis as defined within reportConfigEUTRA for this event),<br># Ocn1, Ocn2, and Ocn3 are the cell specific offset of the neighbour cell (i.e. cellIndividualOffset as defined within measObjectEUTRA corresponding to the frequency of the neighbour cell), and set to zero if not configured for the neighbour cell.<br>#Ocs1, Ocs2, and Ocs3 are the cell specific offset of the serving cell (i.e. cellIndividualOffset as defined within measObjectEUTRA corresponding to the frequency of the PCell/ PSCell), and is set to zero if not configured for the PCell/ PSCell.<br>#Off1, Off2, and Off3 are the offset parameter for this event (i.e. a3-Offset as defined within reportConfigEUTRA event).<br># Mn( ) and Ms( ) are expressed in dBm in case of RSRP, or in dB in case of RSRQ and RS-SINR,<br># Hys1, Hys2, and Hys3 are expressed in dB,<br># Ocn, Ocs, Off are expressed in dB. |

Tables below are to explain a description based on event (NR7).

| event NR7 |
| --- |
| NR7 Neighbour becomes offset better than PCell/ PSCell, while there are more than N beams above threshold in that neighbour cell<br>    1>     consider the entering condition for this event to be satisfied when both condition 7-1-X and condition 7-2-X, as specified below, are fulfilled;<br>    1>     consider the leaving condition for this event to be satisfied when condition 7-3-X or condition 7-4-X, i.e. at least one of the two, as specified below, is fulfilled;<br>(Entering condition 1)<br>NR7-1-1) $Mn(\text{IDLE mode RS}) + Ofn1 + Ocn1 - Hys1 > Mp(\text{IDLE mode RS}) + Ofp1 + Ocp1 + Off1$<br>NR7-1-2) $Mn(\text{Additional RS}) + Ofn2 + Ocn2 - Hys2 > Mp(\text{Additional RS}) + Ofp2 + Ocp2 + Off2$<br>NR7-1-3) $(Mn(\text{IDLE mode RS}) + Ofn1 + Ocn1 - Hys1 > Mp(\text{IDLE mode RS}) + Ofp1 + Ocp1 + Off1)$<br>    && $(Mn(\text{Additional RS}) + Ofn2 + Ocn2 - Hys2 > Mp(\text{Addtional RS}) + Ofp2 + Ocp2 + Off2)$<br>NR7-1-4) $Mn(\text{IDLE mode RS}) + Mn(\text{Additional RS}) + Ofn3 + Ocn3 - Hys3 > Mp(\text{IDLE mode RS}) + Mp(\text{Additional RS}) + Ofp3 + Ocp3 + Off3$<br>(Entering condition 2)<br>NR7-2-1) # of beams satisfy $(MBn(\text{IDLE mode RS}) > Threshold1) > N1$,<br>NR7-2-2) # of beams satisfy $(MBn(\text{Additional RS}) > Threshold2) > N2$,<br>NR7-2-3) # of beams satisfy $((MBn(\text{IDLE mode RS}) > Threshold1)$ or $(MBn(\text{Additional RS}) > Threshold2)) > N3$,<br>(Leaving condition 1)<br>NR7-3-1) $Mn(\text{IDLE mode RS}) + Ofn1 + Ocn1 + Hys1 < Mp(\text{IDLE mode RS}) + Ofp1 + Ocp1 + Off1$<br>NR7-3-2) $Mn(\text{Additional RS}) + Ofn2 + Ocn2 + Hys2 < Mp(\text{Additional RS}) + Ofp2 + Ocp2 + Off2$<br>NR7-3-3) $(Mn(\text{IDLE mode RS}) + Ofn1 + Ocn1 + Hys1 < Mp(\text{IDLE mode RS}) + Ofp1 + Ocp1 + Off1)$<br>    && $(Mn(\text{Additional RS}) + Ofn2 + Ocn2 + Hys2 < Mp(\text{Additional RS}) + Ofp2 + Ocp2 + Off2)$<br>NR7-3-4) $Mn(\text{IDLE mode RS}) + Mn(\text{Additional RS}) + Ofn3 + Ocn3 + Hys3 < Mp(\text{IDLE mode RS}) + Mp(\text{Additional RS}) + Ofp3 + Ocp3 + Off3$<br>(Leaving condition 2)<br>NR7-4-1) # of beams satisfy $(MBn(\text{IDLE mode RS}) > Threshold1) < N1$,<br>NR7-4-2) # of beams satisfy $(MBn(\text{Additional RS}) > Threshold2) < N2$,<br>NR7-4-3) # of beams satisfy $((MBn(\text{IDLE mode RS}) > Threshold1)$ or $(MBn(\text{Additional RS}) > Threshold2)) < N3$,<br># Mn(IDLE mode RS) is the measurement result of the neighbor cell derived from IDLE mode RS, not taking into account any offsets,<br># Mn(Additional RS) is the measurement result of the neighbor cell derived from additional RS, not taking into account any offsets,<br># MBn(IDLE mode RS) is the measurement result of a beam of the neighbor cell derived from IDLE mode RS, not taking into account any offsets,<br># MBn(Additional RS) is the measurement result of a beam of the neighbour cell derived from additional RS, not taking into account any offsets,<br># Mp(IDLE mode RS) is the measurement result of the PCell/ PSCell derived from IDLE mode RS, not taking into account any offsets, |

| event NR7 |
|---|
| # Mp(Additional RS) is the measurement result of PCell/ PSCell deived from additional RS, not taking into account any offsets,<br># Hys1, Hys2, and Hys3 are the hysteresis parameter for this event (i.e. hysteresis as defined within reportConfigEUTRA for this event),<br># Ofn1, Ofn2, and Ofn3 are the frequency specific offset of the frequency of the neighbor cell (i.e. offsetFreq as defined within measObjectEUTRA corresponding to the frequency of the neighbor cell).<br># Ocn1, Ocn2, and Ocn3 are the cell specific offset of the neighbor cell (i.e. cellIndividualOffset as defined within measObjectEUTRA corresponding to the frequency of the neighbor cell), and set to zero is not configured for the neighbor cell.<br># Ofp1, Ofp2, and Ofp3 are the frequency specific offset of the frequency of the PCell/ PSCell (i.e offsetFreq as defined within measObjectEUTRA corresponding to the frequency of the PCell/ PSCell).<br>#Ocp1, Ocp2, and Ocp3 are the cell specific offset of the PCell/ PSCell (i.e. cellIndividualOffset as defined within measObjectEUTRA corresponding to the frequency of the PCell/ PSCell), and is set to zero if not configured for the PCell/ PSCell.<br>#Off1, Off2, and Off3 are the offset parameter for this event (i.e. a3-Offset as defined within reportConfigEUTRA for this event).<br># N1, N2, and N3 are the required number of beams which satisfies the threshold required<br># Threshold1, Threshold2, and Threshold3 are the threshold parameter for this event (i.e. a1-Threshold1, a1-Threshold2 and a1-Threshold3 as defined within reportConfigEUTRA for this event).<br># Mn( ) and Mp( ) are expressed in dBm in case of RSRP, or in dB in case of RSRQ and RS-SINR,<br># Hys1, Hys2, and Hys3 are expressed in dB,<br># Ofn, Ocn, Ofp, Ocp, Off are expressed in dB.<br># Threshold1, Threshold2, and Threshold3 are expressed in the same unit as Ms. |

Embodiment a—Beam Failure Detection by L1/L2/L3

The terminal may measure performance deterioration of a beam being used, and using this, may trigger a beam change procedure for changing the beam to another beam. In this case, a procedure of determining the performance deterioration of the beam being used is called a beam failure detection procedure, and this procedure can be performed as follows.

Here, the beam may be a certain beam (base station beam, terminal beam, or a pair of the base station beam and the terminal beam) being used by the terminal and the base station. Further, the beam may be a certain set of beams being specifically (or tacitly) used by the terminal and the base station.

Here, the beam may correspond to physical antenna configuration, or may be a measurement unit of a certain terminal (e.g., SS block, SS burst, SS burst set, CSI-RS block, CSI-RS burst, or CSI-RS burst set).

1. L1 Detection

If beam(s) measured by a physical layer satisfies condition 1, beam failure is determined.

The physical layer transmits a corresponding indication to an upper layer for subsequent operations.

The upper layer starts a beam recovery procedure after receiving the indication.

2. L2 Detection with L1 Indication

If beam(s) measured by a physical layer satisfies Condition 1, a corresponding indication is transmitted to an upper layer.

L2 layer receives one or more indications from the physical layer, and if reception of the corresponding indications satisfies Condition 2, beam failure and/or beam recovery triggering are determined.

L2 layer starts a beam recovery procedure.

3. L3 Detection with L1 Indication

If beam(s) measured by a physical layer satisfies Condition 1, a corresponding indication is transmitted to an upper layer.

L3 layer receives one or more indications from the physical layer, and if reception of the corresponding indications satisfies Condition 2, beam failure and/or beam recovery triggering are determined.

L3 layer starts a beam recovery procedure.

The Condition 1 may be as follows.

Beam(s) measurement value<Threshold1

Estimated DL signal reception error probability>N1%

Beam(s) measurement value<Threshold1 (AND) one certain beam measurement value>Threshold2

Certain set1 of beams measurement value pre-engaged with a base station (or configured from a base station) <Threshold1

The Condition 2 may be as follows.

Successive indication reception N2 times

Indication reception not less than N3 times in a predetermined time (timer2)

one certain beam measurement value>Threshold2

Certain beam measurement value in certain set2 of beams pre-engaged with a base station (or configured from a base station)>Threshold2

A case where certain timer1 triggered just after the condition 1 is satisfied expires The timer1 may be a configured value through terminal implementation The timer1 may be a value configured by a base station The timer1 may be cancelled if a certain indication (i.e., In-sync-indication) is received from a lower layer.

The timer1 may be cancelled if a certain indication (i.e., RLF triggering indication or RLF declaration indication) is received from an upper layer.

Embodiment b1—Level Cells and Sets

The following embodiment is another embodiment in which CSI-RS resource sets in a cell have the same subcarrier spacing, CSI-RS transmission period, CSI-RS transmission BW, and CSI-RS reception BW.

Table 1 below is according to this embodiment of the disclosure, and Table 1aa and Table 1ab are added for explanation of respective fields included in Table 1. It is preferable to understand that the contents of Table 1aa and Table 1ab are connected to each other.

In this case, CSI-RSs are configured by CSI-RS resource sets, and the respective CSI-RS resource sets have the same CSI-RS configuration offset, CSI-RS scrambling ID, sequence generation configuration, repetition, and density. Antenna ports, resource element mapping patterns, QCL information, and bandwidth part information of the CSI-RS resources in the respective CSI-RS resource sets may be provided to the terminal in the form of a bit-map having one equal value or different values in the CSI-RS resource set.

TABLE 1

```
-- ASN1START
MeasObjectNR ::=                       SEQUENCE {
    carrierFreq                        ARFCN-ValueNR,
    referenceSignalConfig              ReferenceSignalConfig
                                       OPTIONAL,
    ...
}
ReferenceSignalConfig::=               SEQUENCE {
    ssb-MeasurementTimingConfiguration    SSB-
MeasurementTimingConfiguration,
        OPTIONAL,
    csi-rs-ResourceConfig-Mobility     CSI-RS-ResourceConfig-
Mobility          OPTIONAL,
}
CSI-RS-ResourceConfig-Mobility ::=     SEQUENCE {
    csi-ConfigCells                    SEQUENCE (SIZE
(1..maxNrofCSI-ConfigCells)) OF CSI-ConfigCell        OPTIONAL,
}
CSI-ConfigCell::=                      SEQUENCE {
    csi-ResourceSets-RRM               SEQUENCE (SIZE
(1..maxNrofCSI-ResourceSets-RRM)) OF   CSI-ResourceSet-
RRM         OPTIONAL,
    cellId                             PhysicalCellId,
    slotConfigPeriodicity              ENUMERATED {sf5, sf10, sf20,
sf40, [sf80, sf160]},
    subcarrierSpacing                  SubcarrierSpacing,
    csi-rs-TransmissionBW              TYPE_FFS!,
    csi-rs-MeasurementBW               TYPE_FFS!,
}
CSI-ResourceSet-RRM ::=                SEQUENCE {
    csi-rs-ResourcesetId-RRM           CSI-RS-ResourceSetId-RRM,
    slotConfigOffset                   INTEGER (0..XX),
    scrambling_ID                      TYPE_FFS!,
    sequenceGenerationConfig           TYPE_FFS!,
    repetition                         BOOLEAN,
    nrofRepeateadCSI-RS-Resources      ENUMERATED{X,...},
    nrofAntennaPortsBitmap             ENUMERATED{X,...},
    resourceElementMappingPatternBitmap   TYPE_FFS!,
    gcl_SSB_info_Bitmap                TYPE_FFS!,
    densityBitmap                      ENUMERATED{X,...},
    bandwidthpartsBitmap               ENUMERATED{X,...},
}
CSI-RS-ResourceSetId-RRM ::=           INTEGER (0..maxNrofCSI-RS-
ResourceSetsRRM − 1)
-- ASN1STOP
```

TABLE 1aa

```
-- ASN1START
MeasObjectNR ::=                       SEQUENCE {
    carrierFreq                        ARFCN-ValueNR,
    -- Configuration of a reference signal to be measured for the purpose of RRM
    referenceSignalConfig              ReferenceSignalConfig
                                       OPTIONAL,
    -- Hereinafter, variables are omitted: # of SS/CSI-RS beams to derive cell
quality, Thresholds, offsets, cell lists, ...
    ...
}
ReferenceSignalConfig::=               SEQUENCE {
    -- Sync signal measurement configuration: Sync Signal measurement timing
configuration (SMTC)
    ssb-MeasurementTimingConfiguration    SSB-
MeasurementTimingConfiguration,                         OPTIONAL,
    -- CSI-RS signal measurement configuration
    csi-rs-ResourceConfig-Mobility     CSI-RS-ResourceConfig-
Mobility          OPTIONAL,
}
CSI-RS-ResourceConfig-Mobility ::=     SEQUENCE {
    csi-ConfigCells                    SEQUENCE (SIZE (1..maxNrofCSI-
ConfigCells)) OF CSI-ConfigCell         OPTIONAL,
}
```

TABLE 1aa-continued

```
-- Configure one or more CSI-RS resource sets in one cell
CSI-ConfigCell::=                   SEQUENCE {
    csi-ResourceSets-RRM            SEQUENCE (SIZE (1..maxNrofCSI-
ResourceSets-RRM)) OF CSI-ResourceSet-RRM       OPTIONAL,
    cellId                          PhysicalCellId,
    -- CSI-RS transmission period
    slotConfigPeriodicity           ENUMERATED {sf5, sf10, sf20, sf40,
[sf80, sf160]},
    -- CSI-RS subcarrier spacing numerical value (It may be a numerical value
representing numerology, and may have the same value as the value of a sync signal and
a data channel)
    subcarrierSpacing               SubcarrierSpacing,
    -- CSI-RS transmission frequency bandwidth or specific band
    csi-rs-TransmissionBW           TYPE_FFS!,
    -- CSI-RS measurement frequency bandwidth or specific band
    csi-rs-MeasurementBW            TYPE_FFS!,
}
```

TABLE 1ab

```
-- CSI-RS measurement unit resource information to be measured by
terminal
CSI-ResourceSet-RRM ::=             SEQUENCE {
    csi-rs-ResourcesetId-RRM        CSI-RS-ResourceSetId-RRM,
    -- CSI-RS transmission slot offset
    slotConfigOffset                INTEGER (0..XX),
    scrambling_ID                   TYPE_FFS!,
    sequenceGenerationConfig        TYPE_FFS!,
    repetition                      BOOLEAN,
    nrofRepeateadCSI-RS-Resources   ENUMERATED{X,...},
    -- The number of CSI-RS transmission antenna ports
    nrofAntennaPortsBitmap          ENUMERATED{X,...},
    -- CSI-RS Resource Element mapping pattern
    resourceElementMappingPatternBitmap   TYPE_FFS!,
    gcl_SSB_info_Bitmap             TYPE_FFS!,
    densityBitmap                   ENUMERATED{X,...},
    bandwidthpartsBitmap            ENUMERATED{X,...},
}
CSI-RS-ResourceSetId-RRM ::=        INTEGER (0..maxNrofCSI-RS-
ResourceSetsRRM - 1)
-- ASN1STOP
```

It is exemplified that the cell configures the terminal to transmit CSI-RS resource sets having the same period for the purpose of RRM and handover of many and unspecified terminals.

Further, the CSI-RS transmission period may be configured by CSI-RS resource sets rather than by cells in a CSI-ResourceSet-RRM. In this case, the different CSI-RS resource sets transmitted in the corresponding cell may be transmitted in different periods, and accordingly, the terminal may receive the different CSI-RS resource sets in different periods.

In the same CSI-RS resource set, the cell may transmit CSI-RSs having the same transmission slot offset (slotConfigOffset), and different transmission slot offset values may be provided by different CSI-RS resource sets in the cell. Using this, as an example, the CSI-RS resource sets having different CSI-RS transmission slot offsets and the same period may be transmitted by a bundle of transmission/reception antennas existing in different physical locations, for example, by transmission/reception points (TRP or TRxP), and the terminal may receive the CSI-RS resource sets by applying a reception period that is equal to the different reception slot offsets.

Further, if the CSI-RS resource sets have different frequency characteristics, for example, center frequencies, frequency bandwidths, and carrier frequencies, the cell may transmit CSI-RS resources having different transmission slot offsets and the same period between the CSI-RS resource sets, and the terminal may be made to receive the transmitted CSI-RS resources.

Further, the transmission slot offsets may be configured in a CSI-ConfigCell in the unit of a cell rather than in the unit of a CSI-RS resource set. This case means that all the CSI-RS resources and the CSI-RS resource sets configured and transmitted in the corresponding cell have the same transmission slot offset, and the terminal may receive CSI-RSs transmitted by the corresponding cell with the same transmission slot offset.

If a repetition indicator is in an on state, the network may configure the CSI-RS resources in the corresponding set to transmit signals using the same antenna pattern and the same beam, and the terminal may measure a received signal strength of the corresponding CSI-RS beam for different received beams and may measure a channel quality while changing the received beams of the terminal in the CSI-RS resource set. If the terminal feeds measurement information back to the base station, the corresponding indicator may be tacitly used as an indicator indicating to perform feedback of a CSI-RS resource set ID (CSI-RS-ResourceSetId-RRM).

If the repetition indicator is in an off state, the network may configure the CSI-RS resources in the corresponding CSI-RS resource set to transmit signals using different antenna patterns and different beams, and the terminal may fix and receive the received beams of the terminal in the CSI-RS resource set, may measure the received signal strength of the corresponding CSI-RS beam among different transmitted beams of the base station for the corresponding received beam, and may measure the channel quality. If the terminal feeds measurement information back to the base station, the corresponding indicator may be tacitly used as an indicator indicating to perform feedback of not only the CSI-RS resource set ID (CSI-RS-ResourceSetId-RRM) but also a resource ID, for example, the bitmap order of RE mapping patterns to which the feedback resource has been configured, and the bitmap order of antenna ports.

Further, the repetition indicator may be configured in CSI-ConfigCell in the unit of a cell rather than in the unit of a CSI-RS resource set. This case means that all the CSI-RS resources and the CSI-RS resource sets configured and transmitted in the corresponding cell are transmitted in accordance with the same repetition indicator.

If the repetition is in an on state and several CSI-RS resource sets are provided, it may be configured that signals are to be transmitted using the same antenna pattern and the same beam in the respective CSI-RS resource sets, and it may be tacitly configured that the signals are to be transmitted using different antenna patterns and different beams between the CSI-RS resource sets. In this case, the terminal may receive CSI-RSs transmitted by the corresponding cell while changing the received beams by different CSI-RS resources in one CSI-RS resource set.

Further, if the repetition is in an on state and several CSI-RS resource sets are configured, the repetition indicator may be an indicator configuring all CSI-RS resource sets and CSI-RS resources in the sets to transmit signals using the same antenna pattern and the same analog beam. In this case, the terminal may receive CSI-RSs transmitted by the corresponding cell while changing the received beams by different CSI-RS resources in one CSI-RS resource set.

nrofRepeateadCSI-RS-Resources indicates the number of repetition CSI-RS resources notifying whether it is configured in the corresponding CSI-RS resource set how many CSI-RS resources are transmitted using the same antenna configuration and the same beam. The corresponding parameter may be configured and transmitted only when the repetition is in an on state.

Further, the nrofRepeateadCSI-RS-Resources may be configured in CSI-ConfigCell in the unit of a cell rather than in the unit of a CSI-RS resource set. In this case, the nrofRepeateadCSI-RS-Resources may configure how many CSI-RS resources existing in the CSI-RS resource sets configured and transmitted in the corresponding cell are tied in bundles and transmitted using the same antenna configuration and the same beam.

nrofAntennaPortsBitmap is the number of antenna ports used by the CSI-RS resources being transmitted in the corresponding CSI-RS resource set or configuration information. If all resources in the CSI-RS resource set use the same antenna port, it may be configured and transmitted as one piece of information, whereas if the resources in the set use different antenna ports, it may be transmitted in the form of a bitmap of different pieces of information.

Further, the nrofAntennaPortsBitmap may be configured in CSI-ConfigCell in the unit of a cell rather than in the unit of a CSI-RS resource set. In this case, the nrofAntennaPortsBitmap is the number of antenna ports used by the CSI-RS resource sets configured and transmitted in the corresponding cell or the CSI-RS resources existing in the respective CSI-RS resource sets or configuration information. If all resources in the cell use the same antenna port, it may be configured and transmitted as one piece of information, whereas if the CSI-RS resources in the CSI-RS resource set use the same antenna port, but different antenna ports are used between the CSI-RS resource sets, an indicator indicating such configuration may be included, or different pieces of information may be transmitted in the form of a bitmap with respect to the antenna ports configured by the sets without the indicator. If the CSI_RS resources in the CSI-RS resource set use different antenna ports, different antenna port information may be transmitted in the form of a bitmap.

resourceElementMappingPatternBitmap is configuration information of resource elements used by the CSI-RS resources being transmitted in the corresponding CSI-RS resource set. If all resources in the CSI-RS resource set use the same resource element mapping pattern, it may be configured and transmitted as one piece of information, whereas if the resources in the CSI-RS resource set use different resource element mapping patterns, it may be transmitted in the form of a bitmap of different pieces of information.

Further, the resourceElementMappingPatternBitmap may be configured in CSI-ConfigCell in the unit of a cell rather than in the unit of a CSI-RS resource set. In this case, the resourceElementMappingPatternBitmap is resource element mapping pattern information or configuration information used by the CSI-RS resource sets configured and transmitted in the corresponding cell or the CSI-RS resources existing in the respective CSI-RS resource sets. If all resources in the cell use the same resource element mapping pattern information, it may be configured and transmitted as one piece of information, whereas if the CSI-RS resources in the CSI-RS resource set use the same resource element mapping pattern information, but different resource element mapping patterns are used between the CSI-RS resource sets, an indicator indicating such configuration may be included, or different pieces of information may be transmitted in the form of a bitmap with respect to the resource element mapping patterns configured by sets without the indicator. If the CSI_RS resources in the CSI-RS resource set use different resource element mapping patterns, different RE mapping pattern information may be transmitted in the form of a bitmap.

qcl_SSB_info_Bitmap is information used to inform QCL relevance with a synchronization signal block that is in time, frequency, and spatial QCL relationship with the CSI-RS resources transmitted in the corresponding CSI-RS resource set, and an id of the corresponding SS block, QCL ID, or transmission config. ID may be used. If all resources in the CSI-RS resource set are in QCL relationship with the same SS block, qcl_SSB_info_Bitmap may be configured and transmitted as one piece of information, whereas if the resources in the CSI-RS resource set are in QCL relationship with different SS blocks, it may be transmitted in the form of a bitmap of different pieces of information.

Further, the qcl_SSB_info_Bitmap may be configured in CSI-ConfigCell in the unit of a cell rather than in the unit of a CSI-RS resource set. In this case, the qcl_SSB_info_Bitmap is information on synchronization signals that are in QCL relationship with the CSI-RS resource sets configured and transmitted in the corresponding cell or the CSI-RS resources existing in the respective CSI-RS resource sets. If all resources in the cell are in QCL relationship with the same SS blocks, it may be configured and transmitted as one piece of information, whereas if the CSI-RS resources in the CSI-RS resource set is in QCL relationship with the same SS block, but the CSI-RS resource sets are in QCL relationship with different SS blocks, an indicator indicating such configuration may be included, or different pieces of information may be transmitted in the form of a bitmap with respect to the SS blocks that are in QCL relationship by sets. If the CSI_RS resources in the CSI-RS resource set are in QCL relationship with different SS blocks, different SS block information may be transmitted in the form of a bitmap.

densityBitmap is a density in RE/port/PRB of CSI-RS resources transmitted in the corresponding CSI-RS resource set. If all resources in the CSI-RS resource set use the same antenna port, it may be configured and transmitted as one piece of information, whereas if the resources in the CSI-RS resource set use different densities, it may be transmitted in the form of a bitmap of different pieces of information.

Further, the densityBitmap may be configured in CSI-ConfigCell in the unit of a cell rather than in the unit of a CSI-RS resource set. In this case, the densityBitmap is density information used by the CSI-RS resource sets configured and transmitted in the corresponding cell or the CSI-RS resources existing in the respective CSI-RS resource sets. If all resources in the cell use the same density information, it may be configured and transmitted as one piece of information, and the CSI-RS resources in the CSI-RS resource set use the density, whereas if different densities are used between the CSI-RS resource sets, an indicator indicating such configuration may be included, or different pieces of information may be transmitted in the form of a bitmap with respect to the density configured by sets without the indicator. If the CSI_RS resources in the CSI-RS resource set use different densities, different density information may be transmitted in the form of a bitmap.

bandwidthpartsBitmap is a parameter including information, such as a bandwidth part id, bandwidth, and frequency, of the CSI-RS resources transmitted in the corresponding CSI-RS resource set. If all resources in the CSI-RS resource set use the same bandwidth part, it may be configured and transmitted as one piece of information, whereas if the resources in the CSI-RS resource set use different bandwidth parts, it may be transmitted in the form of a bitmap of different pieces of information.

Further, the bandwidthpartsBitmap may be configured in CSI-ConfigCell in the unit of a cell rather than in the unit of a CSI-RS resource set. In this case, the bandwidthpartsBitmap is bandwidthparts information used by the CSI-RS resource sets configured and transmitted in the corresponding cell or the CSI-RS resources existing in the respective CSI-RS resource sets. If all resources in the cell use the same bandwidthparts, it may be configured and transmitted as one piece of information, and the CSI-RS resources in the CSI-RS resource set use the bandwidthparts, whereas if different bandwidthparts are used between the CSI-RS resource sets, an indicator indicating such configuration may be included, or different pieces of information may be transmitted in the form of a bitmap with respect to the bandwidthparts configured by sets without the indicator. If the CSI RS resources in the CSI-RS resource set use different bandwidthparts, different bandwidthparts information may be transmitted in the form of a bitmap.

csi-rs-TransmissionBW is a numerical value of a bandwidth notifying the terminal how wide frequency band range different CSI-RSs transmitted by the cell are transmitted over. It may be an absolute numerical value notifying of a reference point (lowest or highest frequency) and bandwidth in the frequency band, an absolute numerical value notifying of center point (ARFCN or center frequency or carrier number or carrier ID) and bandwidth in the frequency band, or a numerical value simply notifying of the frequency bandwidth.

Further, the csi-rs-TransmissionBW may be configured in CSI-ResourceSet-RRM by CSI-RS resource sets rather than by cells. In this case, csi-rs-TransmissionBW means that different CSI-RS resource sets transmitted in the corresponding cell may be transmitted with different transmission frequency bandwidth.

csi-rs-MeasurementBW is a numerical value notifying the terminal through what frequency bandwidth size the terminal can receive CSI-RSs transmitted by the cell. It may be an absolute numerical value notifying of a reference point (lowest or highest frequency) and bandwidth in the frequency band, an absolute numerical value notifying of center point (ARFCN or center frequency or carrier number or carrier ID) and bandwidth in the frequency band, or a numerical value simply notifying of the frequency bandwidth.

Further, if the csi-rs-MeasurementBW is a numerical value simply notifying that a certain terminal notifies of the frequency bandwidth for measuring the corresponding CSI-RS, the corresponding numerical value may be the maximum measurable frequency bandwidth that can be received by the terminal and is received from terminal capability information.

Further, if the csi-rs-MeasurementBW is a numerical value simply notifying of the frequency bandwidth for the terminal to measure the corresponding CSI-RS, and has a value that is smaller than the csi-rs-TransmissionBW, the network may tacitly indicate that the terminal measures the corresponding cell using a frequency band to the extent of the csi-rs-MeasurementBW size in the csi-rs-TransmissionBW transmitted by the cell. In this case, if the operating bandwidth of the terminal belongs to the csi-rs-TransmissionBW, the terminal may derive the cell measurement value by measuring the CSI-RS of the target cell to the extent of the csi-rs-MeasurementBW size in the operating bandwidth of the terminal itself. Further, the terminal may select the frequency band having the csi-rs-MeasurementBW size and having the best performance with respect to the whole frequency band of the target cell that is measurable using a gap, and may measure the CSI-RS of the target cell in the corresponding csi-rs-MeasurementBW to derive the cell measurement value. Further, if it is possible to know bandwidth part information of the target cell through the bandwidthpartsBitmap, the terminal may derive the cell measurement value by selecting the bandwidth part existing in the frequency location that is the same as or most similar to that of an active bandwidth part of a serving cell to which the terminal itself belongs and measuring the CSI-RS transmitted from the corresponding bandwidth part to the extent of the corresponding csi-rs-MeasurementBW frequency band.

Further, the csi-rs-MeasurementBW may be configured by CSI-RS resource sets rather than by cells in the CSI-ResourceSet-RRM. In this case, the terminal may receive and measure the CSI-RS with different frequency bandwidth with respect to the different CSI-RS resource sets, and may derive the cell measurement value.

Embodiment b2—Level Cells and Resources

The following embodiment is another embodiment in which all CSI-RS resources in a cell have the same CSI-RS transmission period, the same CSI-RS configuration offset, subcarrier spacing, CSI-RS transmission BW, and CSI-RS reception BW.

Table 2 below is according to this embodiment of the disclosure, and Table 2aa and Table 2ab are added for explanation of respective fields included in Table 2. It is preferable to understand that the contents of Table 2aa and Table 2ab are connected to each other.

In this case, CSI-RSs are configured by CSI-RS resources, and include CSI-RS scrambling IDs, sequence generation configuration, repetition, density, antenna ports, resource element mapping patterns, QCL information, and bandwidth part information by respective CSI-RS resources.

TABLE 2

```
-- ASN1START
MeasObjectNR ::=            SEQUENCE {
    carrierFreq                 ARFCN-ValueNR,
    referenceSignalConfig       ReferenceSignalConfig
                                OPTIONAL,
    ...
}
```

TABLE 2-continued

```
ReferenceSignalConfig::=            SEQUENCE {
    ssb-MeasurementTimingConfiguration    SSB-
MeasurementTimingConfiguration,                    OPTIONAL,
    csi-rs-ResourceConfig-Mobility    CSI-RS-ResourceConfig-
Mobility      OPTIONAL,
}
CSI-RS-ResourceConfig-Mobility ::=   SEQUENCE {
    csi-ConfigCells                  SEQUENCE (SIZE (1..maxNrofCSI-
ConfigCells)) OF CSI-ConfigCell       OPTIONAL,
}
CSI-ConfigCell::=                    SEQUENCE {
    csi-Resources-RRM                SEQUENCE (SIZE (1..maxNrofCSI-
Resources-RRM)) OF CSI-Resource-RRM      OPTIONAL,
    cellId                           PhysicalCellId,
    slotConfigPeriodicity            ENUMERATED {sf5, sf10, sf20, sf40,
[sf80, sf160]},
    slotConfigOffset                 INTEGER (0..XX),
    subcarrierSpacing                SubcarrierSpacing,
    csi-rs-TransmissionBW            TYPE_FFS!,
    csi-rs-MeasurementBW             TYPE_FFS!,
    repetition                       BOOLEAN,
    nrofRepeateadCSI-RS-Resources    ENUMERATED{X,...},
}
CSI-Resource-RRM ::=                 SEQUENCE {
    csi-rs-ResourceId-RRM            CSI-RS-ResourceId-RRM,
    scrambling_ID                    TYPE_FFS!,
    sequenceGenerationConfig         TYPE_FFS!,
    nrofAntennaPorts                 ENUMERATED{X,...},
    resourceElementMappingPattern    TYPE_FFS!,
    gcl_SSB_info                     TYPE_FFS!,
    density                          ENUMERATED{X,...},
    bandwidthparts                   ENUMERATED{X,...},
}
CSI-RS-ResourceId-RRM ::=            INTEGER (0..maxNrofCSI-RS-
ResourcesRRM – 1)
-- ASN1STOP
```

TABLE 2aa

```
-- ASN1START
MeasObjectNR ::=                     SEQUENCE {
    carrierFreq                      ARFCN-ValueNR,
    Configuration of a reference signal to be measured for the purpose of RRM
    referenceSignalConfig            ReferenceSignalConfig
                                     OPTIONAL,
    -- Hereinafter, variables are omitted: # of SS/CSI-RS beams to derive cell
quality, Thresholds, offsets, cell lists, ...
    ...
}
ReferenceSignalConfig::=             SEQUENCE {
    -- Sync signal measurement configuration : Sync Signal measurement timing
configuration (SMTC)
    ssb-MeasurementTimingConfiguration    SSB-
MeasurementTimingConfiguration,                    OPTIONAL,
    -- CSI-RS signal measurement configuration
    csi-rs-ResourceConfig-Mobility    CSI-RS-ResourceConfig-
Mobility      OPTIONAL,
}
CSI-RS-ResourceConfig-Mobility ::=   SEQUENCE {
    csi-ConfigCells                  SEQUENCE (SIZE (1..maxNrofCSI-
ConfigCells)) OF CSI-ConfigCell       OPTIONAL,
}
-- Configure one or more CSI-RS resource sets in one cell
CSI-ConfigCell::=                    SEQUENCE {
    csi-Resources-RRM                SEQUENCE (SIZE (1..maxNrofCSI-
Resources-RRM)) OF CSI-Resource-RRM          OPTIONAL,
    cellId                           PhysicalCellId,
    -- CSI-RS transmission period
    slotConfigPeriodicity            ENUMERATED {sf5, sf10, sf20, sf40,
[sf80, sf160]},
    -- CSI-RS transmission slot offset
    slotConfigOffset                 INTEGER (0..XX),
    -- CSI-RS subcarrier spacing numerical value (It may be a numerical value
representing numerology, and may have the same value as the value of a sync signal
and a data channel)
    subcarrierSpacing                SubcarrierSpacing,
```

TABLE 2aa-continued

```
-- CSI-RS transmission frequency bandwidth or specific band
csi-rs-TransmissionBW          TYPE_FFS!,
-- CSI-RS measurement frequency bandwidth or specific band
csi-rs-MeasurementBW           TYPE_FFS!,
repetition                     BOOLEAN,
nrofRepeateadCSI-RS-Resources  ENUMERATED{X,...},
}
```

TABLE 2ab

```
-- CSI-RS measurement unit resource information to be measured by
terminal
CSI-Resource-RRM ::=           SEQUENCE {
    csi-rs-ResourceId-RRM          CSI-RS-ResourceId-RRM,
    scrambling_ID                  TYPE_FFS!,
    sequenceGenerationConfig       TYPE_FFS!,
    -- The number of CSI-RS transmission antenna ports
    nrofAntennaPorts               ENUMERATED{X,...},
    -- CSI-RS Resource Element mapping pattern
    resourceElementMappingPattern  TYPE_FFS!,
    gcl_SSB_info                   TYPE_FFS!,
    density                        ENUMERATED{X,...},
    bandwidthparts                 ENUMERATED{X,...},
}
CSI-RS-ResourceId-RRM ::=      INTEGER (0..maxNrofCSI-RS-
ResourcesRRM - 1)
-- ASN1STOP
```

It is exemplified that the cell configures the terminal to transmit CSI-RS resources having the same period for the purpose of RRM and handover of many and unspecified terminals.

Further, the CSI-RS transmission period may be configured by CSI-RS resources rather than by cells in a CSI-Resource-RRM. In this case, the different CSI-RS resources transmitted in the corresponding cell may be transmitted in different periods, and accordingly, the terminal may receive the different CSI-RS resources in different periods.

The cell may transmit the CSI-RS resources having different transmission slot offsets (slotConfigOffset) by CSI-RS resources. Accordingly, the terminal may receive the different CSI-RS resources having different transmission slot offsets.

Further, the transmission slot offsets may be configured in a CSI-ConfigCell in the unit of a cell rather than in the unit of a CSI-RS resource. This case means that all the CSI-RS resources configured and transmitted in the corresponding cell have the same transmission slot offset, and the terminal may receive CSI-RSs transmitted by the corresponding cell with the same transmission slot offset.

If a repetition indicator is in an on state, the network may configure the CSI-RS resources in the corresponding set to transmit signals using the same antenna pattern and the same beam, and the terminal may measure a received signal strength of the corresponding CSI-RS beam for different received beams and may measure a channel quality while changing the received beams of the terminal in the cell. The corresponding indicator may be tacitly used as an indicator indicating that it is not necessary for the terminal to feed measurement information back to the base station.

If the repetition indicator is in an off state, the network may configure the CSI-RS resources in the corresponding cell to transmit signals using different antenna patterns and different beams, and the terminal may fix and receive the received beams of the terminal in the cell, may measure the received signal strength of the corresponding CSI-RS beam among different transmitted beams of the base station for the corresponding received beam, and may measure the channel quality. If the terminal tacitly feeds measurement information back to the base station, the corresponding indicator may be used as an indicator indicating to directly perform feedback of the CSI-RS resource ID (CSI-RS-ResourceId-RRM), or an implicit resource ID, for example, as an indicator indicating that the CSI-RS resource performs feedback of the configured order and the like.

Further, the repetition indicator may be configured in CSI-ConfigCell in the unit of a CSI-RS resource rather than in the unit of a cell. This case means that the CSI-RS resource including the corresponding repetition indicator is transmitted using the same antenna configuration and beam as those of the CSI-RS resource just previously configured.

nrofRepeateadCSI-RS-Resources indicates the number of repetition CSI-RS resources notifying whether it is configured in the corresponding cell how many CSI-RS resources are transmitted using the same antenna configuration and the same beam. The corresponding parameter may be configured and transmitted only when the repetition is in an on state.

nrofAntennaPorts is the number of antenna ports used by the CSI-RS resource transmitting in the corresponding cell or the configuration information.

Further, the nrofAntennaPorts may be configured in CSI-ConfigCell in the unit of a cell rather than in the unit of a CSI-RS resource. In this case, the nrofAntennaPorts may be the number of antenna ports used by the CSI-RS resources configured and transmitted in the corresponding cells or configuration information. If all resources in the cell use the same antenna port, it may be configured and transmitted as one piece of information, whereas if the CSI-RS resources use different antenna ports, an indicator indicating such configuration may be included, or different pieces of information may be transmitted in the form of a bitmap with respect to the antenna ports configured by CSI-RS resources without the indicator.

resourceElementMappingPattern is configuration information of resource elements used by the corresponding CSI-RS resource.

Further, the resourceElementMappingPattern may be configured in CSI-ConfigCell in the unit of a cell rather than in the unit of a CSI-RS resource. In this case, the resourceElementMappingPattern is configuration information of a resource element used by the CSI-RS resources transmitting in the corresponding cell. If all resources in the cell use the same resource element mapping pattern, it may be configured and transmitted as one piece of information, whereas if the resources in the cell use different resource element mapping patterns, different pieces of information may be transmitted in the form of a bitmap.

qcl_SSB_info is information used to inform QCL relevance with a synchronization signal block that is in time, frequency, and spatial QCL relationship with the corresponding CSI-RS resource, and an id of the corresponding SS block, QCL ID, or transmission config. ID may be used.

Further, the qcl_SSB_info may be configured in CSI-ConfigCell in the unit of a cell rather than in the unit of a CSI-RS resource. In this case, the qcl_SSB_info is information on synchronization signals that are in QCL relationship with the respective CSI-RS resources configured and transmitted in the corresponding cell. If all resources in the cell are in QCL relationship with the same SS block, it may be configured and transmitted as one piece of information, whereas if the CSI-RS resources are in QCL relationship with the same SS block, different pieces of SS block information may be transmitted in the form of a bitmap.

densityBitmap is a density in RE/port/PRB of the corresponding CSI-RS resources.

Further, the densityBitmap may be configured in CSI-ConfigCell in the unit of a cell rather than in the unit of a CSI-RS resource. In this case, the densityBitmap is density information used by the CSI-RS resources configured and transmitted in the corresponding cell. If all resources in the cell use the same density information, it may be configured and transmitted as one piece of information, whereas if the CSI-RS resources use different densities, such different density information may be transmitted in the form of a bitmap.

bandwidthparts is a parameter including information, such as a bandwidth part id, bandwidth, and frequency, of the CSI-RS resource.

Further, the bandwidthparts may be configured in CSI-ConfigCell in the unit of a cell rather than in the unit of a CSI-RS resource set. In this case, the bandwidthparts is bandwidthparts information used by the CSI-RS resources configured and transmitted in the corresponding cell. If all resources in the cell use the same bandwidthparts, it may be configured and transmitted as one piece of information, whereas if different bandwidthparts are used between the CSI-RS resources, such different pieces of bandwidthparts information may be transmitted in the form of a bitmap.

csi-rs-TransmissionBW is a numerical value of a bandwidth notifying the terminal how wide frequency band range different CSI-RSs transmitted by the cell are transmitted over. It may be an absolute numerical value notifying of a reference point (lowest or highest frequency) and bandwidth in the frequency band, an absolute numerical value notifying of center point (ARFCN or center frequency or carrier number or carrier ID) and bandwidth in the frequency band, or a numerical value simply notifying of the frequency bandwidth.

Further, the csi-rs-TransmissionBW may be configured in CSI-Resource-RRM by CSI-RS resources rather than by cells. In this case, csi-rs-TransmissionBW means that different CSI-RS resources transmitted in the corresponding cell may be transmitted with different transmission frequency bandwidths.

csi-rs-MeasurementBW is a numerical value notifying the terminal through what frequency bandwidth size the terminal can receive CSI-RSs transmitted by the cell. It may be an absolute numerical value notifying of a reference point (lowest or highest frequency) and bandwidth in the frequency band, an absolute numerical value notifying of center point (ARFCN or center frequency or carrier number or carrier ID) and bandwidth in the frequency band, or a numerical value simply notifying of the frequency bandwidth.

Further, if the csi-rs-MeasurementBW is a numerical value simply notifying that a certain terminal notifies of the frequency bandwidth for measuring the corresponding CSI-RS, the corresponding numerical value may be the maximum measurable frequency bandwidth that can be received by the terminal and is received from terminal capability information.

Further, if the csi-rs-MeasurementBW is a numerical value simply notifying of the frequency bandwidth for the terminal to measure the corresponding CSI-RS, and has a value that is smaller than the csi-rs-TransmissionBW, the network may tacitly indicate that the terminal measures the corresponding cell using a frequency band to the extent of the csi-rs-MeasurementBW size in the csi-rs-TransmissionBW transmitted by the cell. In this case, if the operating bandwidth of the terminal belongs to the csi-rs-TransmissionBW, the terminal may derive the cell measurement value by measuring the CSI-RS of the target cell to the extent of the csi-rs-MeasurementBW size in the operating bandwidth of the terminal itself. Further, the terminal may select the frequency band having the csi-rs-MeasurementBW size and having the best performance with respect to the whole frequency band of the target cell that is measurable using a gap, and may measure the CSI-RS of the target cell in the corresponding csi-rs-MeasurementBW to derive the cell measurement value. Further, if it is possible to know bandwidth part information of the target cell through the bandwidthpartsBitmap, the terminal may derive the cell measurement value by selecting the bandwidth part existing in the frequency location that is the same as or most similar to that of an active bandwidth part of a serving cell to which the terminal itself belongs and measuring the CSI-RS transmitted from the corresponding bandwidth part to the extent of the corresponding csi-rs-MeasurementBW frequency band.

Further, the csi-rs-MeasurementBW may be configured by CSI-RS resources rather than by cells in the CSI-Resource-RRM. In this case, the terminal may receive and measure the CSI-RS with different frequency bandwidth with respect to the different CSI-RS resources, and may derive the cell measurement value.

Embodiment b3—Level Sets and Resources

The following embodiment is still another embodiment in which all CSI-RS resource sets have the same CSI-RS transmission period, the same CSI-RS configuration offset, subcarrier spacing, CSI-RS transmission BW, and CSI-RS reception BW.

Table 3 below is according to this embodiment of the disclosure, and Table 3aa and Table 3ab are added for explanation of respective fields included in Table 3. It is preferable to understand that the contents of Table 3aa and Table 3ab are connected to each other.

In this case, CSI-RSs are configured by CSI-RS resources, and include CSI-RS scrambling IDs, sequence generation configuration, repetition, density, antenna ports, resource element mapping patterns, QCL information, and bandwidth part information by respective CSI-RS resources.

TABLE 3

```
-- ASN1START
MeasObjectNR ::=            SEQUENCE {
    carrierFreq                 ARFCN-ValueNR,
    referenceSignalConfig       ReferenceSignalConfig
                                OPTIONAL,
    ...
}
```

TABLE 3-continued

```
ReferenceSignalConfig::=           SEQUENCE {
   ssb-MeasurementTimingConfiguration   SSB-
MeasurementTimingConfiguration,                            OPTIONAL,
   csi-rs-ResourceConfig-Mobility    CSI-RS-ResourceConfig-
Mobility        OPTIONAL,
}
CSI-RS-ResourceConfig-Mobility ::=  SEQUENCE {
   csi-ResourceSets-RRM             SEQUENCE (SIZE (1..maxNrofCSI-
ResourceSets-RRM)) OF CSI-ResourceSet-RRM          OPTIONAL,
}
CSI-ResourceSet-RRM::=              SEQUENCE {
   csi-Resources-RRM                SEQUENCE (SIZE (1..maxNrofCSI-
Resources-RRM)) OF CSI-Resource-RRM             OPTIONAL,
   cellId                           PhysicalCellId,
   csi-rs-ResourcesetId-RRM         CSI-RS-ResourceSetId-RRM,
   slotConfigPeriodicity            ENUMERATED {sf5, sf10, sf20, sf40,
[sf80, sf160]},
   slotConfigOffset                 INTEGER (0..XX),
   subcarrierSpacing                SubcarrierSpacing,
   csi-rs-TransmissionBW            TYPE_FFS!,
   csi-rs-MeasurementBW             TYPE_FFS!,
repetition                         BOOLEAN,
nrofRepeateadCSI-RS-Resources      ENUMERATED{X,...},
}
CSI-RS-ResourceSetId-RRM ::=       INTEGER (0..maxNrofCSI-RS-
ResourceSetsRRM − 1)
CSI-Resource-RRM ::=                SEQUENCE {
   csi-rs-ResourceId-RRM            CSI-RS-ResourceId-RRM,
   scrambling_ID                    TYPE_FFS!,
   sequenceGenerationConfig         TYPE_FFS!,
   nrofAntennaPorts                 ENUMERATED{X,...},
   resourceElementMappingPattern    TYPE_FFS!,
   gcl_SSB_info                     TYPE_FFS!,
   density                          ENUMERATED{X,...},
   bandwidthparts                   ENUMERATED{X,...},
}
CSI-RS-ResourceId-RRM ::=          INTEGER (0..maxNrofCSI-RS-
ResourcesRRM − 1)
-- ASN1STOP
```

TABLE 3aa

```
-- ASN1START
MeasObjectNR ::=                    SEQUENCE {
   carrierFreq                      ARFCN-ValueNR,
   -- Configuration of a reference signal to be measured for the purpose of RRM
   referenceSignalConfig            ReferenceSignalConfig
                                    OPTIONAL,
   -- Hereinafter, variables are omitted: # of SS/CSI-RS beams to derive cell
quality, Thresholds, offsets, cell lists, ...
   ...
}
ReferenceSignalConfig::=           SEQUENCE {
   -- Sync signal measurement configuration: Sync Signal measurement timing
configuration (SMTC)
   ssb-MeasurementTimingConfiguration   SSB-
MeasurementTimingConfiguration,                            OPTIONAL,
   -- CSI-RS signal measurement configuration
   csi-rs-ResourceConfig-Mobility    CSI-RS-ResourceConfig-
Mobility        OPTIONAL,
}
CSI-RS-ResourceConfig-Mobility ::=  SEQUENCE {
   csi-ResourceSets-RRM             SEQUENCE (SIZE (1..maxNrofCSI-
ResourceSets-RRM)) OF CSI-ResourceSet-RRM          OPTIONAL,
}
-- Configure one or more CSI-RS resource sets in one cell
CSI-ResourceSet-RRM::=              SEQUENCE {
   csi-Resources-RRM                SEQUENCE (SIZE (1..maxNrofCSI-
Resources-RRM)) OF CSI-Resource-RRM             OPTIONAL,
   cellId                           PhysicalCellId,
   csi-rs-ResourcesetId-RRM         CSI-RS-ResourceSetId-RRM,
   -- CSI-RS transmission period
   slotConfigPeriodicity            ENUMERATED {sf5, sf10, sf20, sf40,
[sf80, sf160]},
   -- CSI-RS transmission slot offset
   slotConfigOffset                 INTEGER (0..XX),
```

TABLE 3aa-continued

```
-- CSI-RS subcarrier spacing numerical value (It may be a numerical value
representing numerology, and may have the same value as the value of a sync signal
and a data channel)
    subcarrierSpacing              SubcarrierSpacing,
    -- CSI-RS transmission frequency bandwidth or specific band
                    csi-rs-TransmissionBW         TYPE_FFS!,
    -- CSI-RS measurement frequency bandwidth or specific band)
    csi-rs-MeasurementBW           TYPE_FFS!,
    repetition                     BOOLEAN,
    nrofRepeateadCSI-RS-Resources  ENUMERATED{X,...},
}
CSI-RS-ResourceSetId-RRM ::=       INTEGER (0..maxNrofCSI-RS-
ResourceSetsRRM − 1)
```

TABLE 3ab

```
-- ASN1START
MeasObjectNR ::=                SEQUENCE {
    carrierFreq                 ARFCN-ValueNR,
    -- Configuration of a reference signal to be measured for the purpose of RRM
    referenceSignalConfig       ReferenceSignalConfig
                                OPTIONAL,
    -- Hereinafter, variables are omitted: # of SS/CSI-RS beams to derive cell
quality, Thresholds, offsets, cell lists, ...
    ...
}
ReferenceSignalConfig::=        SEQUENCE {
    -- Sync signal measurement configuration: Sync Signal measurement timing
configuration (SMTC)
    ssb-MeasurementTimingConfiguration    SSB-
MeasurementTimingConfiguration,                      OPTIONAL,
    -- CSI-RS signal measurement configuration
    csi-rs-ResourceConfig-Mobility    CSI-RS-ResourceConfig-
Mobility      OPTIONAL,
}
CSI-RS-ResourceConfig-Mobility ::=    SEQUENCE {
    csi-ResourceSets-RRM              SEQUENCE (SIZE (1..maxNrofCSI-
ResourceSets-RRM)) OF CSI-ResourceSet-RRM    OPTIONAL,
}
-- Configure one or more CSI-RS resource sets in one cell
CSI-ResourceSet-RRM::=            SEQUENCE {
    csi-Resources-RRM             SEQUENCE (SIZE (1..maxNrofCSI-
Resources-RRM)) OF CSI-Resource-RRM      OPTIONAL,
    cellId                        PhysicalCellId,
    csi-rs-ResourcesetId-RRM      CSI-RS-ResourceSetId-RRM,
    -- CSI-RS transmission period
    slotConfigPeriodicity         ENUMERATED {sf5, sf10, sf20, sf40,
[sf80, sf160]},
    -- CSI-RS transmission slot offset
    slotConfigOffset              INTEGER (0..XX),
    -- CSI-RS subcarrier spacing numerical value (It may be a numerical value
representing numerology, and may have the same value as the value of a sync signal
and a data channel)
    subcarrierSpacing             SubcarrierSpacing,
    -- CSI-RS transmission frequency bandwidth or specific band
            csi-rs-TransmissionBW             TYPE_FFS!,
    -- CSI-RS measurement frequency bandwidth or specific band)
    csi-rs-MeasurementBW          TYPE_FFS!,
    repetition                    BOOLEAN,
    nrofRepeateadCSI-RS-Resources  ENUMERATED{X,...},
}
CSI-RS-ResourceSetId-RRM ::=      INTEGER (0..maxNrofCSI-RS-
ResourceSetsRRM − 1)
```

It is exemplified that the CSI-RS resource set configures the terminal to transmit CSI-RS resources having the same period for the purpose of RRM and handover of many and unspecified terminals.

Further, the CSI-RS transmission period may be configured by CSI-RS resources rather than by CSI-RS resource set in a CSI-Resource-RRM. In this case, the different CSI-RS resources transmitted in the corresponding CSI-RS resource set may be transmitted in different periods, and accordingly, the terminal may receive the different CSI-RS resources in different periods.

The CSI-RS resource set may transmit the CSI-RS resources having different transmission slot offsets (slotConfigOffset) by CSI-RS resources. Accordingly, the terminal may receive the different CSI-RS resources having different transmission slot offsets.

Further, the transmission slot offsets may be configured in a CSI-ResourceSet-RRM in the unit of a CSI-RS resource set rather than in the unit of a CSI-RS resource. This case means that all the CSI-RS resources configured and transmitted in the corresponding CSI-RS resource set have the same transmission slot offset, and the terminal may receive CSI-RSs transmitted by the corresponding CSI-RS resource set with the same transmission slot offset.

If a repetition indicator is in an on state, the network may configure the CSI-RS resources in the corresponding CSI-RS resource set to transmit signals using the same antenna pattern and the same beam, and the terminal may measure a received signal strength of the corresponding CSI-RS beam for different received beams and may measure a channel quality while changing the received beams of the terminal in the CSI-RS resource set. The corresponding indicator may be tacitly used as an indicator indicating that it is not necessary for the terminal to feed measurement information back to the base station.

If the repetition indicator is in an off state, the network may configure the CSI-RS resources in the corresponding CSI-RS resource set to transmit signals using different antenna patterns and different beams, and the terminal may fix and receive the received beams of the terminal in the CSI-RS resource set, and may measure the received signal strength of the corresponding CSI-RS beam among different transmitted beams of the base station for the corresponding received beam to may measure the channel quality. If the terminal tacitly feeds measurement information back to the base station, the corresponding indicator may be used as an indicator indicating to directly perform feedback of the CSI-RS resource ID (CSI-RS-ResourceId-RRM), or an implicit resource ID, for example, as an indicator indicating that the CSI-RS resource performs feedback of the configured order and the like.

Further, the repetition indicator may be configured in CSI-ConfigCell in the unit of a CSI-RS resource rather than in the unit of a CSI-RS resource set. This case means that the CSI-RS resource including the corresponding repetition indicator is transmitted using the same antenna configuration and beam as those of the CSI-RS resource just previously configured.

nrofRepeateadCSI-RS-Resources indicates the number of repetition CSI-RS resources notifying whether it is configured in the corresponding CSI-RS resource set how many CSI-RS resources are transmitted using the same antenna configuration and the same beam. The corresponding parameter may be configured and transmitted only when the repetition is in an on state.

nrofAntennaPorts is the number of antenna ports used by the CSI-RS resource transmitting in the corresponding CSI-RS resource set or the configuration information.

Further, the nrofAntennaPorts may be configured in CSI-ResourceSet-RRM in the unit of a CSI-RS resource set rather than in the unit of a CSI-RS resource. In this case, the nrofAntennaPorts may be the number of antenna ports used by the CSI-RS resources configured and transmitted in the corresponding CSI-RS resource set or configuration information. If all resources in the CSI-RS resource set use the same antenna port, it may be configured and transmitted as one piece of information, whereas if the CSI-RS resources use different antenna ports, an indicator indicating such configuration may be included, or different pieces of information may be transmitted in the form of a bitmap with respect to the antenna ports configured by CSI-RS resources without the indicator.

resourceElementMappingPattern is configuration information of resource elements used by the corresponding CSI-RS resource.

Further, the resourceElementMappingPattern may be configured in CSI-ResourceSet-RRM in the unit of a CSI-RS resource set rather than in the unit of a CSI-RS resource. In this case, the resourceElementMappingPattern is configuration information of a resource element used by the CSI-RS resources transmitting in the corresponding CSI-RS resource set. If all resources in the CSI-RS resource set use the same resource element mapping pattern, it may be configured and transmitted as one piece of information, whereas if the resources in the CSI-RS resource set use different resource element mapping patterns, different pieces of information may be transmitted in the form of a bitmap.

qcl_SSB_info is information used to inform QCL relevance with a synchronization signal block that is in time, frequency, and spatial QCL relationship with the corresponding CSI-RS resource, and an id of the corresponding SS block, QCL ID, or transmission config. ID may be used.

Further, the qcl_SSB_info may be configured in CSI-ResourceSet-RRM in the unit of a CSI-RS resource set rather than in the unit of a CSI-RS resource. In this case, the qcl_SSB_info is information on synchronization signals that are in QCL relationship with the respective CSI-RS resources configured and transmitted in the corresponding CSI-RS resource set. If all resources in the CSI-RS resource set are in QCL relationship with the same SS block, it may be configured and transmitted as one piece of information, whereas if the CSI-RS resources are in QCL relationship with the same SS block, different pieces of SS block information may be transmitted in the form of a bitmap.

densityBitmap is a density in RE/port/PRB of the corresponding CSI-RS resources.

Further, the densityBitmap may be configured in CSI-ResourceSet-RRM in the unit of a CSI-RS resource set rather than in the unit of a CSI-RS resource. In this case, the densityBitmap is density information used by the CSI-RS resources configured and transmitted in the corresponding CSI-RS resource set. If all resources in the CSI-RS resource set use the same density information, it may be configured and transmitted as one piece of information, whereas if the CSI-RS resources use different densities, such different density information may be transmitted in the form of a bitmap.

bandwidthparts is a parameter including information, such as a bandwidth part id, bandwidth, and frequency, of the CSI-RS resource.

Further, the bandwidthparts may be configured in CSI-ResourceSet-RRM in the unit of a CSI-RS resource set rather than in the unit of a CSI-RS resource. In this case, the bandwidthparts is bandwidthparts information used by the CSI-RS resources configured and transmitted in the corresponding CSI-RS resource set. If all resources in the CSI-RS resource set use the same bandwidthparts, it may be configured and transmitted as one piece of information, whereas if the CSI-RS resources use different bandwidthparts, such different pieces of bandwidthparts information may be transmitted in the form of a bitmap.

csi-rs-TransmissionBW is a numerical value of a bandwidth notifying the terminal how wide frequency band range different CSI-RSs transmitted by the CSI-RS resource set are transmitted over. It may be an absolute numerical value notifying of a reference point (lowest or highest frequency) and bandwidth in the frequency band, an absolute numerical value notifying of center point (ARFCN or center frequency or carrier number or carrier ID) and bandwidth in the frequency band, or a numerical value simply notifying of the frequency bandwidth.

Further, the csi-rs-TransmissionBW may be configured in CSI-Resource-RRM by CSI-RS resources rather than by CSI-RS resource sets. In this case, csi-rs-TransmissionBW means that different CSI-RS resources transmitted in the corresponding CSI-RS resource set may be transmitted with different transmission frequency bandwidths.

csi-rs-MeasurementBW is a numerical value notifying the terminal through what frequency bandwidth size the terminal can receive CSI-RSs transmitted by the CSI-RS resource set. It may be an absolute numerical value notifying of a reference point (lowest or highest frequency) and bandwidth in the frequency band, an absolute numerical value notifying of center point (ARFCN or center frequency or carrier number or carrier ID) and bandwidth in the frequency band, or a numerical value simply notifying of the frequency bandwidth.

Further, if the csi-rs-MeasurementBW is a numerical value simply notifying that a certain terminal notifies of the frequency bandwidth for measuring the corresponding CSI-RS, the corresponding numerical value may be the maximum measurable frequency bandwidth that can be received by the terminal and is received from terminal capability information.

Further, if the csi-rs-MeasurementBW is a numerical value simply notifying of the frequency bandwidth for the terminal to measure the corresponding CSI-RS, and has a value that is smaller than the csi-rs-TransmissionBW, the network may tacitly indicate that the terminal measures the corresponding CSI-RS resource set using a frequency band to the extent of the csi-rs-MeasurementBW size in the csi-rs-TransmissionBW transmitted by the CSI-RS resource set. In this case, if the operating bandwidth of the terminal belongs to the csi-rs-TransmissionBW, the terminal may derive the CSI-RS resource set measurement value by measuring the CSI-RS of the target CSI-RS resource set to the extent of the csi-rs-MeasurementBW size in the operating bandwidth of the terminal itself. Further, the terminal may select the frequency band having the csi-rs-MeasurementBW size and having the best performance with respect to the whole frequency band of the target CSI-RS resource set that is measurable using a gap, and may measure the CSI-RS of the target CSI-RS resource set in the corresponding csi-rs-MeasurementBW frequency band to derive the CSI-RS resource set measurement value.

Further, if it is possible to know bandwidth part information of the target CSI-RS resource set through the bandwidthpartsBitmap, the terminal may derive the CSI-RS resource set measurement value by selecting the bandwidth part existing in the frequency location that is the same as or most similar to that of an active bandwidth part of a serving CSI-RS resource set to which the terminal itself belongs and measuring the CSI-RS transmitted from the corresponding bandwidth part to the extent of the corresponding csi-rs-MeasurementBW frequency band.

Further, the csi-rs-MeasurementBW may be configured by CSI-RS resources rather than by CSI-RS resource sets in the CSI-Resource-RRM. In this case, the terminal may receive and measure the CSI-RS with different frequency bandwidths with respect to the different CSI-RS resources, and may derive the CSI-RS resource set measurement value.

Embodiment c—Level Cells, Sets, and Resources

The following embodiment is still another embodiment in which all CSI-RS resources in a cell have the same CSI-RS transmission period, subcarrier spacing, CSI-RS transmission BW, and CSI-RS reception BW.

Table 4 below is according to this embodiment of the disclosure, and Table 4aa and Table 4ab are added for explanation of respective fields included in Table 4. It is preferable to understand that the contents of Table 4aa and Table 4ab are connected to each other.

In the cell, CSI-RS resource sets exist, and CSI-RS resources in one resource cell may have the same CSI-RS configuration offset, RS scrambling ID, sequence generation configuration, repetition, density, and bandwidth part information. In this case, CSI-RSs are configured by CSI-RS resources, and may have CSI-antenna ports, resource element mapping patterns, and QCL information by respective CSI-RS resources.

TABLE 4

```
-- ASN1START
MeasObjectNR ::=                     SEQUENCE {
    carrierFreq                          ARFCN-ValueNR,
    referenceSignalConfig                ReferenceSignalConfig
                                         OPTIONAL,
    ...
}
ReferenceSignalConfig::=             SEQUENCE {
    ssb-MeasurementTimingConfiguration   SSB-
MeasurementTimingConfiguration,                       OPTIONAL,
    csi-rs-ResourceConfig-Mobility       CSI-RS-ResourceConfig-
Mobility       OPTIONAL,
}
CSI-RS-ResourceConfig-Mobility ::=   SEQUENCE {
    csi-ConfigCells                      SEQUENCE (SIZE (1..maxNrofCSI-
ConfigCells)) OF CSI-ConfigCell          OPTIONAL,
}
CSI-ConfigCell::=                    SEQUENCE {
    csi-ResourceSets-RRM                 SEQUENCE (SIZE (1..maxNrofCSI-
ResourceSets-RRM)) OF CSI-ResourceSet-RRM    OPTIONAL,
    cellId                               PhysicalCellId,
    slotConfigPeriodicity                ENUMERATED {sf5, sf10, sf20, sf40,
[sf80, sf160]},
    subcarrierSpacing                    SubcarrierSpacing,
    csi-rs-TransmissionBW                TYPE_FFS!,
    csi-rs-MeasurementBW                 TYPE_FFS!,
}
CSI-ResourceSet-RRM ::=              SEQUENCE {
    csi-ResourceSetId-RRM                CSI-ResourceSetId-RRM,
    csi-rs-Resources-RRM                 SEQUENCE (1..maxNrofCSI-RS-
```

TABLE 4-continued

```
ResourcesPerSet-RRM)) OF CSI-RS-Resource-RRM    OPTIONAL,
    slotConfigOffset            INTEGER (0..XX),
    scrambling_ID               TYPE_FFS!,
    sequenceGenerationConfig    TYPE_FFS!,
    repetition                  BOOLEAN,
    nrofRepeateadCSI-RS-Resources  ENUMERATED{X,...},
    density                     ENUMERATED{X,...},
    bandwidthparts              ENUMERATED{X,...},
}
CSI-ResourceSetId-RRM ::=       INTEGER (0.. maxNrofCSI-
ResourceSets-RRM – 1)
CSI-RS-Resource-RRM ::=         SEQUENCE {
    csi-rs-ResourceId-RRM       CSI-RS-ResourceId-RRM,
    nrofAntennaPorts            ENUMERATED{X,...},
    resourceElementMappingPattern  TYPE_FFS!,
    gcl_SSB_info                TYPE_FFS!,
}
CSI-RS-ResourceId-RRM ::=       INTEGER (0.. maxNrofCSI-RS-
ResourcesRRM – 1)
-- ASN1STOP
```

TABLE 4aa

```
-- Configure one or more CSI-RS resources in one cell
CSI-ResourceSet-RRM ::=         SEQUENCE {
    csi-ResourceSetId-RRM       CSI-ResourceSetId-RRM,
    csi-rs-Resources-RRM        SEQUENCE (1..maxNrofCSI-RS-
ResourcesPerSet-RRM)) OF CSI-RS-Resource-RRM    OPTIONAL,
    -- CSI-RS transmission slot offset
    slotConfigOffset            INTEGER (0..XX),
    scrambling_ID               TYPE_FFS!,
    sequenceGenerationConfig    TYPE_FFS!,
    repetition                  BOOLEAN,
    nrofRepeateadCSI-RS-Resources  ENUMERATED{X,...},
    density                     ENUMERATED{X,...},
    bandwidthparts              ENUMERATED{X,...},
}
CSI-ResourceSetId-RRM ::=       INTEGER (0..maxNrofCSI-
ResourceSets-RRM – 1)
-- CSI-RS measurement unit resource information to be measured by
terminal
CSI-RS-Resource-RRM ::=         SEQUENCE {
    csi-rs-ResourceId-RRM       CSI-RS-ResourceId-RRM,
    -- The number of CSI-RS transmission antenna ports
    nrofAntennaPorts            ENUMERATED{X,...},
    -- CSI-RS Resource Element mapping pattern
    resourceElementMappingPattern  TYPE_FFS!,
    gcl_SSB_info                TYPE_FFS!,
}
CSI-RS-ResourceId-RRM ::=       INTEGER (0..maxNrofCSI-RS-
ResourcesRRM – 1)
-- ASN1STOP
```

TABLE 4ab

```
CSI-ResourceSetId-RRM ::=       INTEGER (0..maxNrofCSI-
ResourceSets-RRM – 1)
-- CSI-RS measurement unit resource information to be measured by
terminal
CSI-RS-Resource-RRM ::=         SEQUENCE {
    csi-rs-ResourceId-RRM       CSI-RS-ResourceId-RRM,
    -- The number of CSI-RS transmission antenna ports
    nrofAntennaPorts            ENUMERATED{X,...},
    -- CSI-RS Resource Element mapping pattern
    resourceElementMappingPattern  TYPE_FFS!,
    gcl_SSB_info                TYPE_FFS!,
}
CSI-RS-ResourceId-RRM ::=       INTEGER (0..maxNrofCSI-RS-
ResourcesRRM – 1)
-- ASN1STOP
```

It is exemplified that the cell configures the terminal to transmit CSI-RS resource sets having the same period for the purpose of RRM and handover of many and unspecified terminals.

Further, the CSI-RS transmission period may be configured by CSI-RS resource sets rather than by cells in a CSI-ResourceSet-RRM. In this case, the different CSI-RS resource sets transmitted in the corresponding cell may be transmitted in different periods, and accordingly, the terminal may receive the different CSI-RS resource sets in different periods.

Further, the CSI-RS transmission period may be configured by CSI-RS resources rather than by cells in a CSI-Resource-RRM. In this case, the different CSI-RS resources transmitted in the corresponding cell may be transmitted in different periods, and accordingly, the terminal may receive the different CSI-RS resources in different periods.

In the same CSI-RS resource set, the cell may transmit CSI-RSs having the same transmission slot offset (slotConfigOffset), and different transmission slot offset values may be provided by different CSI-RS resource sets in the cell. Using this, the CSI-RS resource sets having different CSI-RS transmission slot offsets and the same period may be transmitted by a bundle of transmission/reception antennas existing in different physical locations, for example, by transmission/reception points (TRP or TRxP), and the terminal may receive the CSI-RS resource sets by applying the same reception period as the different reception slot offset.

Further, if the CSI-RS resource sets have different frequency characteristics, for example, center frequencies, frequency bandwidths, and carrier frequencies, the cell may transmit CSI-RS resources having different transmission slot offsets and the same period between the CSI-RS resource sets, and the terminal may be made to receive the transmitted CSI-RS resources.

Further, the transmission slot offsets may be configured in a CSI-ConfigCell in the unit of a cell rather than in the unit of a CSI-RS resource set. This case means that all the CSI-RS resources and the CSI-RS resource sets configured and transmitted in the corresponding cell have the same transmission slot offset, and the terminal may receive CSI-RSs transmitted by the corresponding cell with the same transmission slot offset.

Further, the cell may transmit the CSI-RS resources having different transmission slot offset (slotConfigOffset) by CSI-RS resources. Accordingly, the terminal may receive the different CSI-RS resources with different transmission slot offsets.

If a repetition indicator is in an on state, the network may configure the CSI-RS resources in the corresponding set to transmit signals using the same antenna pattern and the same beam, and the terminal may measure a received signal strength of the corresponding CSI-RS beam for different received beams and may measure a channel quality while changing the received beams of the terminal in the CSI-RS resource set. If the terminal feeds measurement information back to the base station, the corresponding indicator may be tacitly used as an indicator indicating to perform feedback of a CSI-RS resource set ID (CSI-RS-ResourceSetId-RRM).

If the repetition indicator is in an off state, the network may configure the CSI-RS resources in the corresponding CSI-RS resource set to transmit signals using different antenna patterns and different beams, and the terminal may fix and receive the received beams of the terminal in the CSI-RS resource set, and may measure the received signal strength of the corresponding CSI-RS beam among different transmitted beams of the base station for the corresponding received beam to measure the channel quality. If the terminal feeds measurement information back to the base station, the corresponding indicator may be tacitly used as an indicator indicating to perform feedback of not only the CSI-RS resource set ID (CSI-RS-ResourceSetId-RRM) but also a resource ID, for example, the bitmap order of RE mapping patterns to which the feedback resource has been configured, and the bitmap order of antenna ports.

Further, the repetition indicator may be configured in CSI-ConfigCell in the unit of a cell rather than in the unit of a CSI-RS resource set. This case means that all the CSI-RS resources and the CSI-RS resource sets configured and transmitted in the corresponding cell are transmitted in accordance with the same repetition indicator. If the repetition is in an on state and several CSI-RS resource sets are provided, it may be configured that signals are to be transmitted using the same antenna pattern and the same beam in the respective CSI-RS resource sets, and it may be tacitly configured that the signals are to be transmitted using different antenna patterns and different beams between the CSI-RS resource sets. In this case, the terminal may receive CSI-RSs transmitted by the corresponding cell while changing the received beams by different CSI-RS resources in one CSI-RS resource set. Further, if the repetition is in an on state and several CSI-RS resource sets are configured, the repetition indicator may be an indicator configuring all CSI-RS resource sets and CSI-RS resources in the sets to transmit signals using the same antenna pattern and the same analog beam. In this case, the terminal may receive CSI-RSs transmitted by the corresponding cell while changing the received beams by different CSI-RS resources in one CSI-RS resource set.

Further, the repetition indicator may be configured in CSI-Resource-RRM in the unit of a CSI-RS resource rather than in the unit of a cell. This case means that the CSI-RS resource including the corresponding repetition indicator is transmitted using the same antenna configuration and beam as those of the CSI-RS resource just previously configured.

nrofRepeateadCSI-RS-Resources indicates the number of repetition CSI-RS resources notifying whether it is configured in the corresponding CSI-RS resource set how many CSI-RS resources are transmitted using the same antenna configuration and the same beam. The corresponding parameter may be configured and transmitted only when the repetition is in an on state.

Further, the nrofRepeateadCSI-RS-Resources may be configured in CSI-ConfigCell in the unit of a cell rather than in the unit of a CSI-RS resource set. In this case, several CSI-RS resources existing in the CSI-RS resource sets configured and transmitted in the corresponding cell may be tied to be transmitted using the same antenna configuration and the same beam.

nrofAntennaPorts is the number of antenna ports used by the CSI-RS resource transmitting in the corresponding cell or the configuration information.

Further, the nrofAntennaPorts may be configured in CSI-ConfigCell in the unit of a cell rather than in the unit of a CSI-RS resource. In this case, the nrofAntennaPorts may be the number of antenna ports used by the CSI-RS resources configured and transmitted in the corresponding cell or configuration information. If all resources in the cell use the same antenna port, it may be configured and transmitted as one piece of information, whereas if the CSI-RS resources use different antenna ports, an indicator indicating such configuration may be included, or different pieces of information may be transmitted in the form of a bitmap with respect to the antenna ports configured by CSI-RS resources without the indicator.

Further, the nrofAntennaPorts may be configured in CSI-ResourceSet-RRM in the unit of a CSI-RS resource set rather than in the unit of a CSI-RS resource. The nrofAntennaPorts may be the number of antenna ports used by the CSI-RS resources transmitted in the corresponding CSI-RS resource set. If all resources in the CSI-RS resource set use the same antenna port, it may be configured and transmitted as one piece of information, whereas if the CSI-RS resources in the set use different antenna ports, different pieces of information may be transmitted in the form of a bitmap.

resourceElementMappingPattern is configuration information of resource elements used by the corresponding CSI-RS resource.

Further, the resourceElementMappingPattern may be configured in CSI-ResourceSet-RRM in the unit of a CSI-RS resource set rather than in the unit of a CSI-RS resource. The resourceElementMappingPattern is configuration information of a resource element used by the CSI-RS resources transmitting in the corresponding CSI-RS resource set. If all resources in the CSI-RS resource set use the same resource element mapping pattern, it may be configured and transmitted as one piece of information, whereas if the resources in the CSI-RS resource set use different resource element mapping patterns, different pieces of information may be transmitted in the form of a bitmap.

Further, the resourceElementMappingPattern may be configured in CSI-ConfigCell in the unit of a cell rather than in the unit of a CSI-RS resource. In this case, the resourceElementMappingPattern is resource element mapping pattern information or configuration information used by the CSI-RS resources configured and transmitted in the corresponding cell or the CSI-RS resources existing in the respective CSI-RS resource sets. If all resources in the cell use the same resource element mapping pattern information, it may be configured and transmitted as one piece of information, whereas if the CSI-RS resources in the CSI-RS resource set use the same resource element mapping pattern information, but different resource element mapping patterns are used between the CSI-RS resource sets, an indicator indicating such configuration may be included, or different pieces of information may be transmitted in the form of a bitmap with respect to the resource element mapping patterns configured by sets without the indicator. If the CSI RS resources in the CSI-RS resource set use different resource element mapping patterns, different RE mapping pattern information may be transmitted in the form of a bitmap.

qcl_SSB_info is information used to inform QCL relevance with a synchronization signal block that is in time, frequency, and spatial QCL relationship with the CSI-RS resources, and an id of the corresponding SS block, QCL ID, or transmission config. ID may be used.

Further, the qcl_SSB_info_Bitmap may be configured in CSI-ResourceSet-RRM in the unit of a CSI-RS resource set rather than in the unit of a CSI-RS resource. The qcl_SSB_info_Bitmap is information used for the CSI-RS resources transmitted in the corresponding CSI-RS resource set to notify of QCL relationship with synchronization signal blocks that are in time, frequency, and spatial QCL relationship with the CSI-RS resource, and an ID of the corresponding SS block, QCL ID, or transmission config. ID may be used. If all resources in the CSI-RS resource set are in QCL relationship with the same SS blocks, it may be configured and transmitted as one piece of information, whereas if the CSI-RS resources in the CSI-RS resource set are in QCL relationship with different SS blocks, different pieces of information may be transmitted in the form of a bit map.

Further, the qcl_SSB_info may be configured in CSI-ConfigCell in the unit of a cell rather than in the unit of a CSI-RS resource. In this case, the qcl_SSB_info is information on synchronization signals that are in QCL relationship with the CSI-RS resources configured and transmitted in the corresponding cell or the CSI-RS resources existing in the respective CSI-RS resource sets. If all resources in the cell are in QCL relationship with the same SS block, it may be configured and transmitted as one piece of information, whereas if the CSI-RS resources in the CSI-RS resource set are in QCL relationship with the same SS block, but different SS blocks are in QCL relationship between the CSI-RS resource sets, an indicator indicating such configuration may be included, or different pieces of information may be transmitted in the form of a bitmap with respect to the SS blocks that are in QCL relationship by sets without the indicator. If the CSI_RS resources in the CSI-RS resource set are in QCL relationship with different SS blocks, different pieces of SS block information may be transmitted in the form of a bitmap.

Density is a density in RE/port/PRB of CSI-RS resources transmitted in the corresponding CSI-RS resource set. If all resources in the CSI-RS resource set use the same antenna port, it may be configured and transmitted as one piece of information, whereas if the resources in the CSI-RS resource set use different densities, it may be transmitted in the form of a bitmap of different pieces of information.

Further, the density may be configured in CSI-ConfigCell in the unit of a cell rather than in the unit of a CSI-RS resource set. In this case, the density is density information used by the CSI-RS resource sets configured and transmitted in the corresponding cell or the CSI-RS resources existing in the respective CSI-RS resource sets. If all resources in the cell use the same density information, it may be configured and transmitted as one piece of information, and the CSI-RS resources in the CSI-RS resource set use the density, whereas if different densities are used between the CSI-RS resource sets, an indicator indicating such configuration may be included, or different pieces of information may be transmitted in the form of a bitmap with respect to the density configured by sets without the indicator. If the CSI_RS resources in the CSI-RS resource set use different densities, different pieces of density information may be transmitted in the form of a bitmap.

Further, the density may be configured in CSI-Resource-RRM in the unit of a CSI-RS resource rather than in the unit of a CSI-RS resource set.

Bandwidthparts information is a parameter including information, such as a bandwidth part id, bandwidth, and frequency, of the CSI-RS resources transmitted in the corresponding CSI-RS resource set. If all resources in the CSI-RS resource set use the same bandwidth part, it may be configured and transmitted as one piece of information, whereas if the resources in the CSI-RS resource set use different bandwidth parts, it may be transmitted in the form of a bitmap of different pieces of information.

Further, the bandwidthparts may be configured in CSI-ConfigCell in the unit of a cell rather than in the unit of a CSI-RS resource set. In this case, the bandwidthparts is bandwidthparts information used by the CSI-RS resource sets configured and transmitted in the corresponding cell or the CSI-RS resources existing in the respective CSI-RS resource sets. If all resources in the cell use the same bandwidthparts, it may be configured and transmitted as one piece of information, and the CSI-RS resources in the CSI-RS resource set use the bandwidthparts, whereas if different bandwidthparts are used between the CSI-RS resource sets, an indicator indicating such configuration may be included, or different pieces of information may be transmitted in the form of a bitmap with respect to the bandwidthparts configured by sets without the indicator. If the CSI_RS resources in the CSI-RS resource set use different bandwidthparts, different bandwidthparts information may be transmitted in the form of a bitmap.

Further, the bandwidthparts may be configured in the CSI-Resource-RRM in the unit of a CSI-RS resource rather than in the unit of a CSI-RS resource set.

csi-rs-TransmissionBW is a numerical value of a bandwidth notifying the terminal how wide frequency band range different CSI-RSs transmitted by the cell are transmitted over. It may be an absolute numerical value notifying of a reference point (lowest or highest frequency) and bandwidth in the frequency band, an absolute numerical value notifying of a center point (ARFCN or center frequency or carrier number or carrier ID) and bandwidth in the frequency band, or a numerical value simply notifying of the frequency bandwidth.

Further, the csi-rs-TransmissionBW may be configured in CSI-ResourceSet-RRM by CSI-RS resource sets rather than by cells. In this case, csi-rs-TransmissionBW means that different CSI-RS resource sets transmitted in the corresponding cell may be transmitted with different transmission frequency bandwidth.

csi-rs-MeasurementBW is a numerical value notifying the terminal through what frequency bandwidth size the terminal can receive CSI-RSs transmitted by the cell. It may be an absolute numerical value notifying of a reference point (lowest or highest frequency) and bandwidth in the frequency band, an absolute numerical value notifying of a center point (ARFCN or center frequency or carrier number or carrier ID) and bandwidth in the frequency band, or a numerical value simply notifying of the frequency bandwidth.

Further, if the csi-rs-MeasurementBW is a numerical value simply notifying that a certain terminal notifies of the frequency bandwidth for measuring the corresponding CSI-RS, the corresponding numerical value may be the maximum measurable frequency bandwidth that can be received by the terminal and is received from terminal capability information.

Further, if the csi-rs-MeasurementBW is a numerical value simply notifying of the frequency bandwidth for the terminal to measure the corresponding CSI-RS, and has a value that is smaller than the csi-rs-TransmissionBW, the network may tacitly indicate that the terminal measures the corresponding cell using a frequency band to the extent of the csi-rs-MeasurementBW size in the csi-rs-TransmissionBW transmitted by the cell. In this case, if the operating bandwidth of the terminal belongs to the csi-rs-TransmissionBW, the terminal may derive the cell measurement value by measuring the CSI-RS of the target cell to the extent of the csi-rs-MeasurementBW size in the operating bandwidth of the terminal itself. Further, the terminal may select the frequency band having the csi-rs-MeasurementBW size and having the best performance with respect to the whole frequency band of the target cell that is measurable using a gap, and may measure the CSI-RS of the target cell in the corresponding csi-rs-MeasurementBW frequency band to derive the cell measurement value. Further, if it is possible to know bandwidth part information of the target cell through the bandwidthpartsBitmap, the terminal may derive the cell measurement value by selecting the bandwidth part existing in the frequency location that is the same as or most similar to that of an active bandwidth part of a serving cell to which the terminal itself belongs and measuring the CSI-RS transmitted from the corresponding bandwidth part to the extent of the corresponding csi-rs-MeasurementBW frequency band.

Further, the csi-rs-MeasurementBW may be configured by CSI-RS resource sets rather than by cells in the CSI-ResourceSet-RRM. In this case, the terminal may receive and measure the CSI-RS with different frequency bandwidth with respect to the different CSI-RS resource sets, and may derive the cell measurement value.

Further, the csi-rs-MeasurementBW may be configured by CSI-RS resources rather than by cells in the CSI-Resource-RRM. In this case, the terminal may receive and measure the CSI-RS with different frequency bandwidth with respect to the different CSI-RS resources, and may derive the cell measurement value.

Figure 18A:
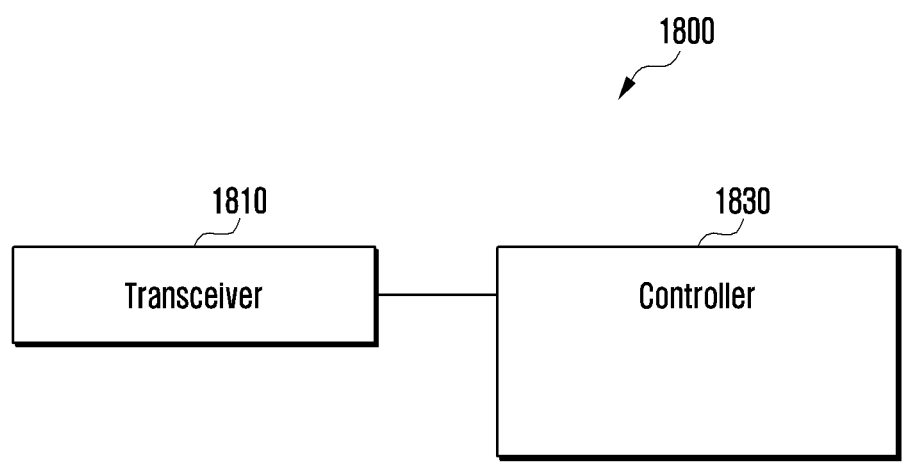
FIGS. 18A, 18B, and 18C are block diagrams illustrating a structure of a terminal according to various embodiments of the disclosure.

FIG. 18A is a diagram illustrating a terminal according to an embodiment of the disclosure.

Referring to FIG. 18A, a terminal 1800 may include a transceiver 1810 configured to transmit and receive signals and a controller 1830. Through the transceiver 1810, the terminal 1800 may transmit and/or receive signals, information, and messages. The controller 1830 may control the overall operation of the terminal 1800. The controller 1830 may include at least one processor. The controller 1830 may control the operation of the terminal as described above through FIGS. 1 to 4, 5A to 5C, 6 to 10, 11A and 11B, 12 to 17.

Further, the controller 1830 receives RS configuration information transmitted by a base station, specifies resources on which an RS is to be transmitted in accordance with the configuration information, and measures the RS on the corresponding resource. Further, if it is determined that the measurement of the RS satisfies a certain condition, the controller may transmit, for example, the measurement report result to a serving base station, or may request the serving base station or adjacent base station to configure another RS based on the subsequent operation triggered by the corresponding condition.

Figure 18B:
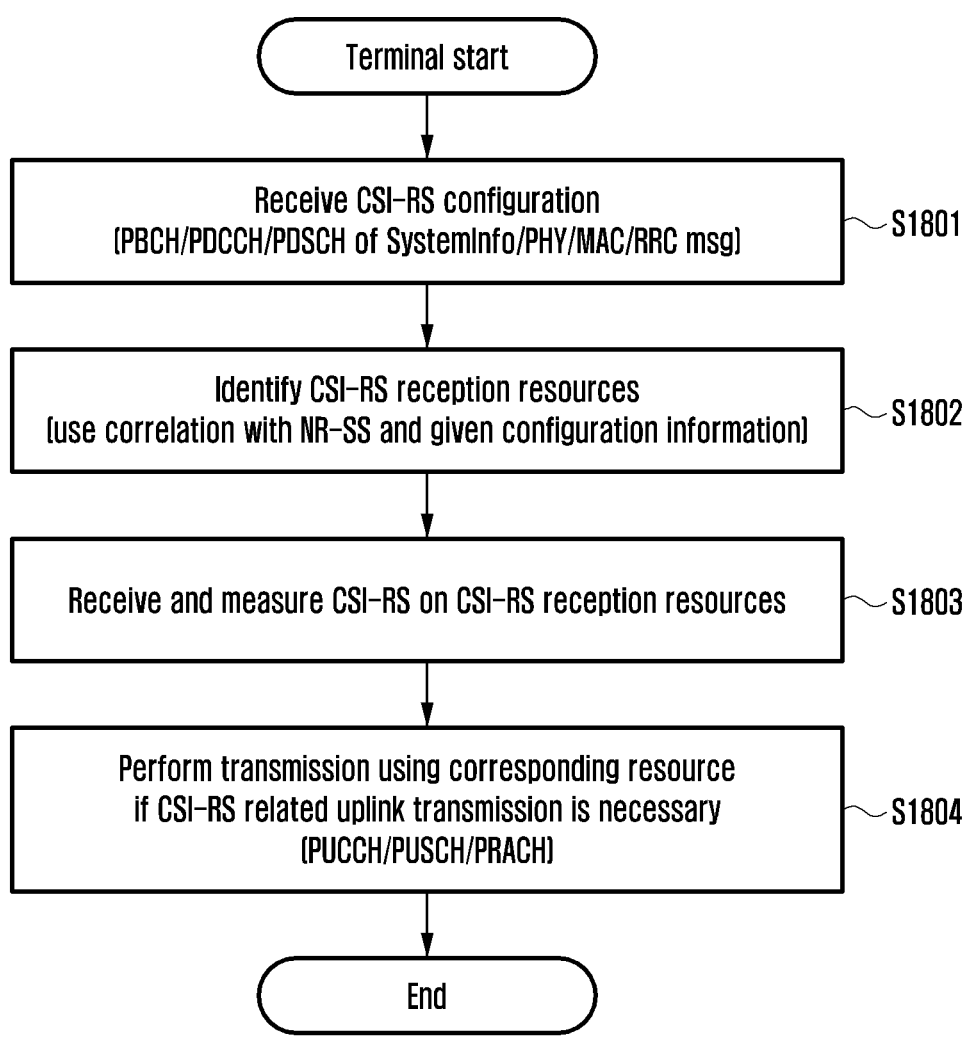

FIG. 18B is a diagram illustrating an operation of a terminal according to an embodiment of the disclosure.

Referring to FIG. 18B, a terminal may receive CSI-RS configuration information in the form of SystemInfo or messages (PHY/MAC/RLC/RRC) through a PBCH, control channel (PDCCH), and data channel (PDSCH) at operation S1801. The terminal having received the corresponding CSI-RS information may identify CSI-RS reception resources using various information, such as offset information, periodicity, measurement gap, and window included in the received information at operation S1802.

The terminal having identified the CSI-RS reception resources may receive and measure the CSI-RS information from the corresponding resource at operation S1803, and if the result of the reception and measurement satisfy a predetermined condition, it may perform an uplink transmission using the corresponding configuration resources (PUCCH/PUSCH/PRACH) at operation S1804.

Figure 18C:
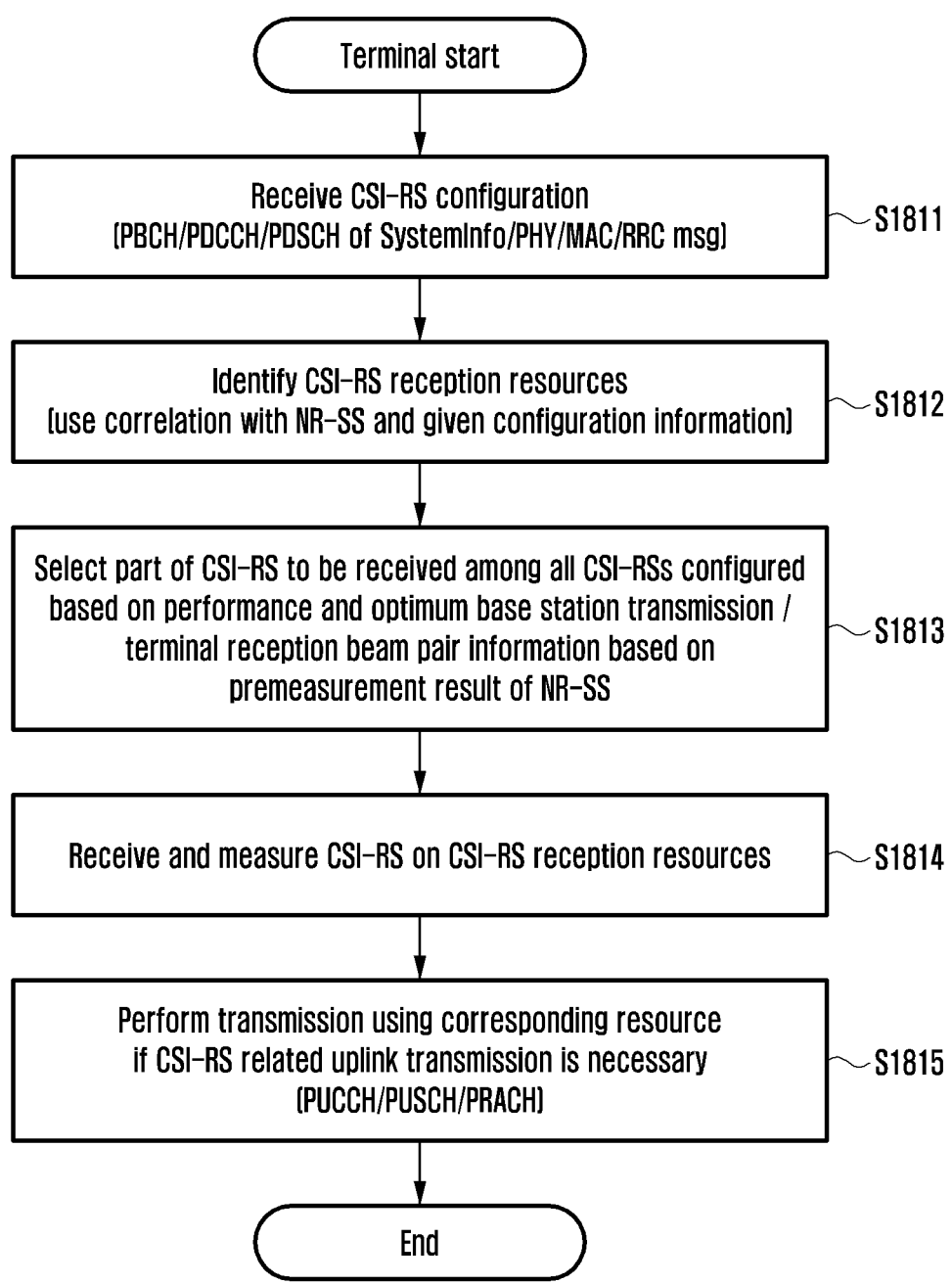

FIG. 18C is a diagram illustrating an operation of a terminal according to an embodiment of the disclosure.

Referring to FIG. 18C, a terminal may receive CSI-RS configuration information in the form of SystemInfo or messages (PHY/MAC/RLC/RRC) through a PBCH, control channel (PDCCH), and data channel (PDSCH) at operation S1811. The terminal having received the corresponding CSI-RS information may identify CSI-RS reception resources using various information, such as offset information, periodicity, measurement gap, and window included in the received information at operation S1812.

The terminal having identified the CSI-RS reception resources may determine to select and receive parts (one or more) of all CSI-RSs securing the performance (e.g., when received signal RSRP/RSRQ/CQI/SNR/SINR is equal to or larger than a specific threshold value, or CSI-RS reception performance having the best performance is included in an opposite threshold performance), and may determine terminal reception beams to be used to receive the corresponding CSI-RSs as beams having the optimum performance based on NR-SS measurement at operation S1813. In this case, the terminal may select optimum CSI-RSs only for specific terminal reception beams, for example, terminal reception beams having the best performance or the best beam pair for all NR-SS measurements, so that the terminal can maintain the same reception beams based on the terminal reception beams during the CSI-RS selection.

The CSI-RS information can be received from the corresponding resource, and if the result of the reception and measurement at operation S1814 satisfies a predetermined condition, uplink transmission can be performed using the corresponding configuration resources PUCCH/PUSCH/PRACH at operation S1815.

Figure 19:
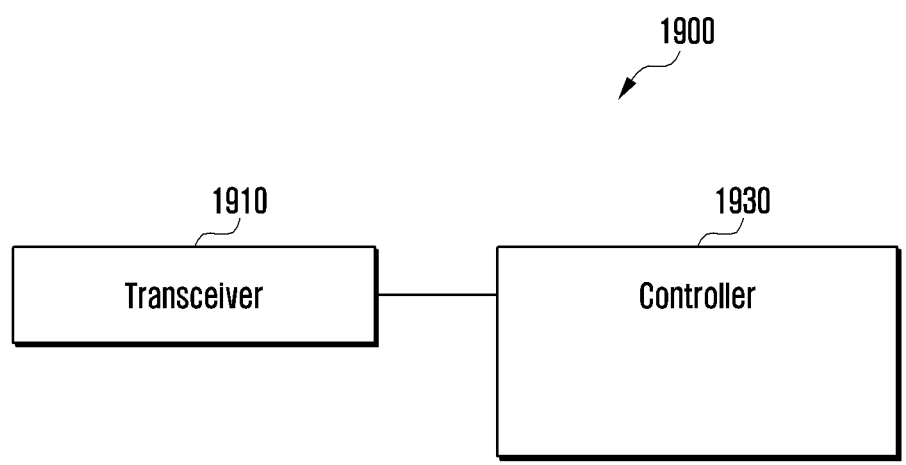
FIG. 19 is a block diagram illustrating a structure of a base station according to an embodiment of the disclosure.

FIG. 19 is a block diagram illustrating a structure of a base station according to an embodiment of the disclosure.

Referring to FIG. 19, a base station 1900 may include a transceiver 1910 configured to transmit and receive signals and a controller 1930. Through the transceiver 1910, the base station 1900 may transmit and/or receive signals, information, and messages. The controller 1930 may control the overall operation of the base station 1900. The controller 1930 may include at least one processor. The controller 1930 may control the operation of the terminal as described above through FIGS. 1 to 4, 5A to 5C, 6 to 10, 11A and 11B, 12 to 17.

Further, the controller 1930 transmits RS configuration information to the terminal, and transmits the RS on the corresponding resource. Further, if the terminal transmits a certain measurement report result or certain RS configuration request information, the controller having received this information may configure the RS, transmit the corresponding configuration information and the corresponding RS to terminals, or request another adjacent base station to provide RS configuration for the corresponding terminal.

If certain RS configuration information for a specific terminal (or many and unspecified terminals) is received from the adjacent base station, such configuration information can be transmitted to the terminals in the network.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method by a base station in a wireless communication system, the method comprising:
   determining configuration information on at least one reference signal related to radio resource management (RRM);
   transmitting a configuration message including the determined configuration information to a terminal; and
   transmitting the at least one reference signal based on the determined configuration information,
   wherein the configuration message includes first information on a cell on which the at least one reference signal is transmitted, and second information on resources to which the at least one reference signal is transmitted on the cell,
   wherein the first information includes information on an ID of the cell and information on measurement bandwidths,
   wherein the second information includes information for indicating that a synchronization signal block is quasi co-located with the at least one reference signal and an index of the synchronization signal block, and
   wherein a timing of the at least one reference signal is identified based on the synchronization signal block, in case that the synchronization signal block is configured to be quasi co-located with the at least one reference signal.

2. The method of claim 1, wherein common information of the resources among information on the resources is included in the first information.

3. The method of claim 2,
   wherein, in case that measurement bandwidths of the at least one reference signal for each of the resources are equal to each other, the information on the measurement bandwidths is included in the first information,
   wherein, in case that the measurement bandwidths of the at least one reference signal for each of the resources are different from each other, the information on the measurement bandwidths is included in the second information, and
   wherein, the information on the measurement bandwidth includes at least one of a number of physical resource blocks (PRBs) included in the measurement bandwidth or an index of the PRB corresponding to a start point of the measurement bandwidth.

4. The method of claim 2,
   wherein, in case that reference signal density information for each of the resources are equal to each other, the density information is included in the first information, and
   wherein, in case that the reference signal density information for each of the resources are different from each other, the density information is included in the second information.

5. The method of claim 1,
   wherein the at least one reference signal is a channel state information-reference signal (CSI-RS).

6. The method of claim 1,
   wherein the configuration information further includes at least one of transmission time offset information or transmission frequency offset information between the at least one reference signal and the synchronization signal block.

7. A method by a terminal in a wireless communication system, the method comprising:
   receiving, from a base station, a configuration message including configuration information of at least one reference signal related to radio resource management (RRM);
   identifying the configuration information of the at least one reference signal related to the RRM;
   receiving the at least one reference signal based on the configuration message;
   performing measurement based on the configuration message; and
   reporting the result of the measurement to a base station,
   wherein the configuration message includes first information on a cell on which the at least one reference signal is transmitted, and second information on resources to which the at least one reference signal is transmitted on the cell,
   wherein the first information includes information on an ID of the cell and information on measurement bandwidths,
   wherein the second information includes information for indicating an index of a synchronization signal block quasi co-located with the at least one reference signal, and
   wherein a timing of the at least one reference signal is identified based on the synchronization signal block, in case that the synchronization signal block is configured to be quasi co-located with the at least one reference signal.

8. The method of claim 7, wherein common information of the resources among information on the resources is included in the first information.

9. A base station in a wireless communication system, the base station comprising:
   a transceiver; and
   at least one processor configured to:
      control the transceiver to determine configuration information on at least one reference signal related to radio resource management (RRM),
      control the transceiver to transmit a configuration message including the determined configuration information to a terminal, and
      control the transceiver to transmit the at least one reference signal based on the determined configuration information,
   wherein the configuration message includes first information on a cell on which the at least one reference signal is transmitted, and second information on each of resources to which the at least one reference signal is transmitted on the cell,
   wherein the first information includes information on an ID of the cell and information on measurement bandwidths,
   wherein the second information includes information for indicating an index of a synchronization signal block quasi co-located with the at least one reference signal, and
   wherein a timing of the at least one reference signal is identified based on the synchronization signal block, in case that the synchronization signal block is configured to be quasi co-located with the at least one reference signal.

10. The base station of claim 9, wherein common information of the resources among information on the resources is included in the first information.

11. The base station of claim 10,
wherein, in case that measurement bandwidths of the at least one reference signal for each of the resources are equal to each other, the at least one processor is further configured to determine the configuration information to include the information on the measurement bandwidths in the first information,
wherein, in case that the measurement bandwidths of the at least one reference signal for each of the resources are different from each other, the at least one processor is further configured to determine configuration information include the information on the measurement bandwidths in the second information, and
wherein, the information on the measurement bandwidth includes at least one of a number of physical resource blocks (PRBs) included in the measurement bandwidth or an index of the PRB corresponding to a start point of the measurement bandwidth.

12. The base station of claim 10,
wherein, in case that reference signal density information for each of the resources are equal to each other, the at least one processor is configured to determine the configuration information to include the density information in the first information, and
wherein, in case that the reference signal density information for each of the resources are different from each other, the at least one processor is further configured to determine the configuration information to include the density information in the second information.

13. The base station of claim 9,
wherein the at least one reference signal is a channel state information-reference signal (CSI-RS).

14. The base station of claim 13,
wherein the configuration information further includes at least one of transmission time offset information or transmission frequency offset information between the at least one reference signal and the synchronization signal block.

15. A terminal in a wireless communication system, the terminal comprising:
a transceiver; and
at least one processor configured to:
control the transceiver to receive, from a base station, a configuration message including configuration information of at least one reference signal related to radio resource management (RRM),
identify the configuration information of the at least one reference signal related to the RRM,
control the transceiver to receive the at least one reference signal based on the configuration message,
perform measurement based on the configuration message, and control the transceiver to report the result of the measurement to a base station,
wherein the configuration message includes first information on a cell on which the at least one reference signal is transmitted, and second information on respective resources to which the at least one reference signal is transmitted on the cell,
wherein the first information includes information on an ID of the cell and information on measurement bandwidths,
wherein the second information includes information for indicating an index of a synchronization signal block quasi co-located with the at least one reference signal, and
wherein a timing of the at least one reference signal is identified based on the synchronization signal block, in case that the synchronization signal block is configured to be quasi co-located with the at least one reference signal.

16. The terminal of claim 15, wherein common information of the resources among information on the resources is included in the first information.

* * * * *